(12) United States Patent  
Kobayashi et al.

(10) Patent No.: US 8,625,953 B2  
(45) Date of Patent: Jan. 7, 2014

(54) OPTICAL FIBER RIBBON HOLDING MEMBER, OPTICAL FIBER RIBBON HOLDING METHOD, OPTICAL FIBER RIBBON BUNDLE AND HOLDING MEMBER FIXTURE

(75) Inventors: Terutake Kobayashi, Sakura (JP); Kunihiko Fujiwara, Sakura (JP); Tetsuo Nozawa, Sakura (JP)

(73) Assignee: Fujikura Ltd., Tokyo (JP)

( * ) Notice: Subject to any disclaimer, the term of this patent is extended or adjusted under 35 U.S.C. 154(b) by 289 days.

(21) Appl. No.: 13/032,423

(22) Filed: Feb. 22, 2011

(65) Prior Publication Data

US 2011/0206340 A1    Aug. 25, 2011

Related U.S. Application Data

(60) Provisional application No. 61/306,683, filed on Feb. 22, 2010.

(51) Int. Cl.  
*G02B 6/00* (2006.01)

(52) U.S. Cl.  
USPC ........... 385/137; 385/134; 385/136; 385/138; 385/139

(58) Field of Classification Search  
USPC .......................... 385/134, 136, 137, 138, 139  
See application file for complete search history.

(56) References Cited

U.S. PATENT DOCUMENTS 7,756,373 B2 *   7/2010   Cody et al. ..................... 385/113  
8,267,596 B2 *   9/2012   Theuerkorn ..................... 385/81

FOREIGN PATENT DOCUMENTS

| JP | 10-133050 A | 5/1998 |
|---|---|---|
| JP | 2001-157345 A | 6/2001 |
| JP | 2003-021730 A | 1/2003 |
| JP | 2004-069862 A | 3/2004 |
| JP | 2007-113639 A | 5/2007 |

OTHER PUBLICATIONS

Notice of Allowance mailed Mar. 5, 2013 in related Japanese Patent Application 2012-500688. English Translation.  
International Search Report of PCT/JP2011/053787, mailing date Mar. 22, 2011.

* cited by examiner

*Primary Examiner* — Jennifer Doan  
(74) *Attorney, Agent, or Firm* — Westerman, Hattori, Daniels & Adrian, LLP

(57) ABSTRACT

An optical fiber ribbon holding member capable of readjusting a position of an optical fiber ribbon without requiring a heating operation is provided. A holding member main body that has a U-shaped cross section and a space to which a plurality of optical fiber ribbons can be accommodate in a laminated state, and a lid body an opening surface of which has a reverse U-shaped cross section are employed. A latch structure is formed on wall portions of a lid body and a holding member main body, and engages to each other when the lid body covers the holding member main body. Heating operation is not required, and the optical fiber ribbons are held by only a simple operation of covering the lid body, so that the operation of holding the optical fiber ribbons is easily performed and readjustment of the position of the optical fiber ribbons can be performed.

6 Claims, 50 Drawing Sheets

OPTICAL FIBER RIBBON HOLDING MEMBER, OPTICAL FIBER RIBBON HOLDING METHOD, OPTICAL FIBER RIBBON BUNDLE AND HOLDING MEMBER FIXTURE

CROSS-REFERENCE TO RELATED APPLICATION

This application is a non-provisional application claiming priority to and the benefit of U.S. provisional application 61/306,683, filed Feb. 22, 2010. The entire contents of which are incorporated herein by reference.

BACKGROUND

1. Field of the Invention

The present invention relates to an optical fiber ribbon holding member that holds an optical fiber ribbon in which an optical connector mounted on a substrate is attached to a tip thereof, and also relates to an optical fiber ribbon holding method, an optical fiber ribbon bundle, and a holding member fixture.

2. Description of Related Art

For example, in the case where a plurality of optical fiber ribbons are held in a laminated state, conventionally, a heat shrinkable tube is used as the optical fiber ribbon holding member that holds the optical fiber ribbons (hereinafter referred to as the ribbons according to the case), in which an optic path change type optical connector, which is mounted on an photoelectric composite substrate, is attached to a tip of the optical fiber ribbon.

In a case where the optical fiber ribbons are laminated and held by the heat shrinkable tube, when the heat shrinkable tube covers the laminated optical fiber ribbons and heated at a high temperature of 100 degree or more, the heat shrinkable tube is shrunk to tighten and hold the laminated optical fiber ribbons.

As described above, the optical fiber ribbons held by the heat shrinkable tube are fixed at a device bedplate side by fixing a part of the heat shrinkable tube with, for example, a holding member fixture for fixing the holding member that is fixed at the periphery portion of the photoelectric composite substrate.

Each of the optical connectors attached to the tip of each of the optical fiber ribbons must be positioned and arranged on the photoelectric composite substrate accurately. However, when the position of the optical fiber ribbons that are laminated and held by the heat shrinkable tube is misaligned in a longitudinal direction, the optical connector at the tip of the misaligned optical fiber ribbon is misaligned with the position to be mounted on the substrate. As a result, the accurate positioning and arrangement cannot be performed.

Once the heat shrinkable tube has been shrunk, the heat shrinkable tube cannot be returned to the original state. Therefore, when the optical fiber ribbons are shipped as being held by the heat shrinkable tube at the time of shipping, there is a problem that a user cannot move and readjust the position of each of the optical fiber ribbons to the proper position.

Meanwhile, as described above, it is required to heat the heat shrinkable tube to a high temperature in order to hold the optical fiber ribbons by the heat shrinkable tube, so there is also a problem that the user who receives the product cannot easily perform the operation.

Accordingly, an optical fiber ribbon holding member is desired in which the heating operation by the user is not required and readjustment of the position of the optical fiber ribbons can be performed.

SUMMARY

The present invention was conceived in view of the above described circumstances and it is an object thereof to provide an optical fiber ribbon holding member which can easily hold the optical fiber ribbons and a heating operation is not required, or the position of the optic fiber ribbons can be readjusted, when a plurality of optical fiber ribbons are held mainly in a laminated state. Further more, the present invention aims to provide an optical fiber ribbon holding method, an optical fiber ribbon bundle and a holding member fixture.

Exemplary aspect 1 of the present invention relates to an optical fiber ribbon holding member that holds a plurality of optical fiber ribbons, in which an optical connector mounted on a substrate is attached to a tip of each optical fiber ribbon, in a laminated state and in a state in which a position of an optical connector at a tip of an optical fiber ribbon is misaligned in a longitudinal direction of a ribbon, and is fixed to a holding member fixture for fixing a holding member that is fixed to a device bedplate on which the substrate is attached, the optical fiber ribbon holding member comprises: a holding member main body that has a U-shaped cross section with a bottom portion and both side wall portions, and has a space to which a plurality of optical fiber ribbons can be accommodated in a laminated state; a lid body that has a reverse U-shaped cross section with a bottom portion and both side wall portions, an opening surface of the lid body is in a reverse direction with respect to an opening surface of an U-shaped cross section of a holding member main body, and covers an opening surface side of a holding member main body; and a latch structure that is formed on a wall portion of a lid body and a wall portion of a holding member main body, and an engaging click and an engaging recess engage to each other when a lid body covers a holding member main body.

Exemplary aspect 2 relates to the optical fiber ribbon holding member according to exemplary aspect 1, in which the latch structure engages a holding member main body and a lid body so that an accommodated optical fiber ribbon is loosely pressed by a lid body in a sate in which a movement of an optical fiber ribbon can be adjusted along a longitudinal direction.

Exemplary aspect 3 relates to an optical fiber ribbon holding member which comprises: a holding member main body that has a U-shaped cross section with a bottom portion and both side wall portions, and has a space to which an optical fiber ribbon can be accommodated; a lid body that has a reverse U-shaped cross section with a bottom portion and both side wall portions, an opening surface of the lid body is in a reverse direction with respect to an opening surface of an U-shaped cross section of a holding member main body, and covers an opening surface side of a holding member main body; and a latch structure that is formed on a wall portion of a lid body and a wall portion of a holding member main body, and an engaging click and an engaging recess engage to each other when a lid body covers a holding member main body.

Exemplary aspect 4 relates to the optical fiber ribbon holding member according exemplary aspect 1 or 3, in which a protecting boot that protects an optical fiber ribbon by passing through the optical fiber ribbon is provided at a rear portion of the holding member main body.

Exemplary aspect 5 relates to the optical fiber ribbon holding member according to exemplary aspect 4, in which the holding member main body and a protecting boot are integrally resin molded.

Exemplary aspect 6 relates to the optical fiber ribbon holding member according to exemplary aspect 5, in which materials of the holding member main body and a protecting boot have a hardness lower than a hardness of a material of a lid body.

Exemplary aspect 7 relates to the optical fiber ribbon holding member according to exemplary aspect 4, in which the protecting boot is detachably provided to a rear portion of a holding member main body.

Exemplary aspect 8 relates to an optical fiber ribbon holding member that holds a plurality of optical fiber ribbons, in which an optical connector mounted on a substrate is attached to a tip of each optical fiber ribbon, in a laminated state and in a state in which a position of an optical connector at a tip of an optical fiber ribbon is misaligned in a longitudinal direction of a ribbon, and is fixed to a holding member fixture for fixing a holding member that is fixed to a device bedplate on which the substrate is attached, the optical fiber ribbon holding member comprises: a first member that has a base portion having an optical fiber ribbon passing through hole to which a plurality of optical fiber ribbons are passed through in a laminated state, and a pair of upper and lower cantilever shape pinch pieces that are extended from an upper portion and a lower portion of a surface of the base portion that is orthogonal to a passing through direction of an optical fiber ribbon respectively and that pinch an inserted optical fiber ribbon from an upper and lower side; and a second member that has a through hole to which a pair of the pinch pieces can be inserted, wherein at least one of a pair of the pinch pieces is a flexible pinch piece; a first surface of the flexible pinch piece at a side for pinching an optical fiber ribbons is a surface parallel with a passing through direction of an optical fiber ribbon, and a second surface at an opposite side to the first surface is a tapered surface in which a thickness of a pinch piece becomes thinner toward a tip of a pinch piece; an inner surface of the through hole is a tapered surface to which a tapered surface of the flexible pinch piece can be contacted; and a latch structure is provided at the flexible pinch piece and an inner surface of the through hole, and an engaging click and an engaging recess engage to each other when a pinch piece is inserted in a through hole.

Exemplary aspect 9 relates to an optical fiber ribbon holding member which comprises: a first member that has a base portion having an optical fiber ribbon passing through hole to which an optical fiber ribbon is passed through, and a pair of upper and lower cantilever shape pinch pieces that are extended from an upper portion and a lower portion of a surface of the base portion that is orthogonal to a passing through direction of an optical fiber ribbon respectively and that pinch an inserted optical fiber ribbon from an upper and lower side; and a second member that has a through hole to which a pair of the pinch pieces can be inserted, wherein at least one of a pair of the pinch pieces is a flexible pinch piece; a first surface of the flexible pinch piece at a side for pinching an optical fiber ribbon is a surface parallel with a passing through direction of an optical fiber ribbon, and a second surface at an opposite side to the first surface is a tapered surface in which a thickness of a pinch piece becomes thinner toward a tip of a pinch piece; an inner surface of the through hole is a tapered surface to which a tapered surface of the flexible pinch piece can be contacted; and a latch structure is provided at the flexible pinch piece and an inner surface of the through hole, and an engaging click and an engaging recess engage to each other when a pinch piece is inserted in a through hole.

Exemplary aspect 10 relates to the optical fiber ribbon holding member according to exemplary aspect 8 or 9, in which a lateral surface of the second member in which the lateral surface is opposite to a lateral surface of the first member at the base portion side is a downward decline surface.

Exemplary aspect 11 relates to an optical fiber ribbon holding member that holds a plurality of optical fiber ribbons, in which an optical connector mounted on a substrate is attached to a tip of each optical fiber ribbon, in a state in which the optical fiber ribbons are overlapped vertically, and in a state in which a position of an optical connector that is mounted at a tip of an optical fiber ribbon is misaligned along a longitudinal direction of a ribbon, and is fixed to a holding member fixture for fixing a holding member that is fixed to a device bedplate on which the substrate is attached, wherein the optical fiber ribbon holding member has an approximate rectangular parallelepiped shape in overall outline; the optical fiber ribbon holding member is an integrally rubber molded product that has a cross section shape having two upper and lower laterally long rectangular holes in which a partition plate portion is pinched therebetween; and the two laterally long rectangular holes are an optical fiber ribbon passing through portion, and have a height dimension in which each group of the optical fiber ribbons which are divided in two groups are fitted in the optical fiber ribbon passing through portion so that light friction force can be generated.

Exemplary aspect 12 relates to an optical fiber ribbon holding member that holds a plurality of optical fiber ribbons, in which an optical connector mounted on a substrate is attached to a tip of each optical fiber ribbon, in a state in which the optical fiber ribbons are overlapped vertically, and in a state in which a position of an optical connector that is mounted at a tip of an optical fiber ribbon is misaligned along a longitudinal direction of a ribbon, and is fixed to a holding member fixture for fixing a holding member that is fixed to a device bedplate on which the substrate is attached, wherein the optical fiber ribbon holding member has an approximate rectangular parallelepiped shape in overall outline; the optical fiber ribbon holding member is an integrally rubber molded product that has an approximate S-shaped cross section shape having two upper and lower laterally long U-shaped grooves in which a partition plate portion is pinched therebetween, and openings of the U-shaped grooves are opposite to each other; and the two laterally long U-shaped grooves are an optical fiber ribbon passing through portion, and have a height dimension in which each group of the optical fiber ribbons which are divided in two groups are fitted in the optical fiber ribbon passing through portion so that light friction force can be generated.

Exemplary aspect 13 relates to an optical fiber ribbon holding member that holds a plurality of optical fiber ribbons, in which an optical connector mounted on a substrate is attached to a tip of each optical fiber ribbon, in a state in which the optical fiber ribbons are overlapped vertically, and in a state in which a position of an optical connector that is mounted at a tip of an optical fiber ribbon is misaligned along a longitudinal direction of a ribbon, and is fixed to a holding member fixture for fixing a holding member that is fixed to a device bedplate on which the substrate is attached, wherein the optical fiber ribbon holding member has an approximate rectangular parallelepiped shape in overall outline; the optical fiber ribbon holding member is an integrally rubber molded product that has an approximate B-shaped cross section shape having two upper and lower laterally long U-shaped grooves in which a partition plate portion is pinched therebetween, and openings of the U-shaped grooves have the same orientation; and the two laterally long U-shaped grooves are an optical fiber ribbon passing through portion, and have a height dimension in which each group of the optical fiber ribbons which are divided in two groups are fitted in the optical fiber ribbon passing through portion so that light friction force can be generated.

Exemplary aspect 14 relates to an optical fiber ribbon holding method that holds an optical fiber ribbon using an optical fiber ribbon holding member of exemplary aspect 1 or 3, in which when an optical fiber ribbon is held by an optical fiber ribbon holding member, soft rubber members are inserted between an optical fiber ribbon that is accommodated nearest to a bottom portion of a holding member main body and a bottom portion of a holding member main body, between an optical fiber ribbon that is accommodated nearest to a bottom portion of a lid body and a bottom portion of a lid body, and between the optical fiber ribbons.

Exemplary aspect 15 relates to an optical fiber ribbon holding method that holds an optical fiber ribbon using an optical fiber ribbon holding member of exemplary aspect 8 or 9, in which when an optical fiber ribbon is held by an optical fiber ribbon holding member, soft rubber members are inserted between an optical fiber ribbon that is accommodated nearest to a lower side pinch piece of a first member and the lower side pinch piece, between an optical fiber ribbon that is accommodated nearest to an upper side pinch piece of a first member and the upper side pinch piece, and between the optical fiber ribbons.

Exemplary aspect 16 relates to an optical fiber ribbon holding method that holds an optical fiber ribbon using an optical fiber ribbon holding member of any one of exemplary aspects 11 to 13, in which when an optical fiber ribbon is held by an optical fiber ribbon holding member, a soft rubber member is inserted between adjacent upper and lower optical fiber ribbons.

Exemplary aspect 17 relates to the optical fiber ribbon holding method according to exemplary aspect 14, in which the rubber member is a rubber tube which covers an optical fiber ribbon.

Exemplary aspect 18 relates to an optical fiber ribbon bundle that is held by an optical fiber ribbon holding member according to exemplary aspect 1, and includes a plurality of optical fiber ribbons having an optical connector which is attached to a tip of an optical fiber ribbon.

Exemplary aspect 19 relates to the optical fiber ribbon bundle according to exemplary aspect 18, in which when an optical fiber ribbon is held by an optical fiber ribbon holding member, soft rubber members are inserted between an optical fiber ribbon that is accommodated nearest to a bottom portion of a holding member main body and a bottom portion of a holding member main body, between an optical fiber ribbon that is accommodated nearest to a bottom portion of a lid body and a bottom portion of a lid body, and between the optical fiber ribbons.

Exemplary aspect 20 relates to an optical fiber ribbon bundle that is held by an optical fiber ribbon holding member according to exemplary aspect 8 or 9, and includes a plurality of optical fiber ribbons having an optical connector which is attached to a tip of an optical fiber ribbon.

Exemplary aspect 21 relates to the optical fiber ribbon bundle according to exemplary aspect 20, in which when an optical fiber ribbon is held by an optical fiber ribbon holding member, soft rubber members are inserted between an optical fiber ribbon that is accommodated nearest to a lower side pinch piece of a first member and the lower side pinch piece, between an optical fiber ribbon that is accommodated nearest to an upper side pinch piece of a first member and the upper side pinch piece, and between the optical fiber ribbons.

Exemplary aspect 22 relates to optical fiber ribbon bundle that is held by an optical fiber ribbon holding member according to any one of exemplary aspects 11 to 13, and includes a plurality of optical fiber ribbons having an optical connector which is attached to a tip of an optical fiber ribbon.

Exemplary aspect 23 relates to the optical fiber ribbon bundle according to exemplary aspect 22, in which when an optical fiber ribbon is held by an optical fiber ribbon holding member, a soft rubber member is inserted between adjacent upper and lower optical fiber ribbons.

Exemplary aspect 24 relates to the optical fiber ribbon bundle according to exemplary aspect 19, 21 or 23, in which the rubber member is a rubber tube which covers an optical fiber ribbon.

Exemplary aspect 25 relates to a holding member fixture for fixing a holding member that fixes an optical fiber ribbon holding member of exemplary aspect 10 that holds an optical fiber ribbon on a device bedplate, the holding member fixture comprises: a base portion that has a holding member mounting portion that positions and arranges an optical fiber ribbon holding member in a state in which a base portion of a first member is restricted; and a lid portion that covers an upper surface of an optical fiber ribbon holding member and is fixed to the base portion side of the holding member fixture, wherein the lid portion comprises: a lateral portion that is parallel to an upper surface of a second member and can be fixed to a lid fixing portion of a base portion of the holding member fixture; and a vertical portion that has a decline surface that can contact with the decline surface of the second member.

Exemplary aspect 26 relates to the holding member fixture for fixing the holding member according to exemplary aspect 25, in which the holding member mounting portion is formed by arranging a plurality of ribs with a gap in a width direction of a base portion of the holding member fixture; grooves are formed in both side surfaces of the ribs in the width direction of the base portion of the holding member fixture; and end portions of a base portion of the first member of the optical fiber ribbon holding member in the width direction of the base portion of the first member, are fitted between the adjacent grooves.

Exemplary aspect 27 relates to a holding member fixture for fixing a holding member that fixes an optical fiber ribbon holding member according to any one of exemplary aspects 11 to 13 on a device bedplate, the holding member fixture comprises: a base portion on which an optical fiber ribbon holding member is mounted; a lid portion that is fixed to the base portion side so that to press an upper surface of an optical fiber ribbon holding member on a base portion; and projections for anti-slip of optical fiber ribbons that are arranged at an upper surface of the base portion and a lower surface of a lid portion.

According to the optical fiber ribbon holding member of the aspect of the present invention, the optical fiber ribbons can be easily held and a heating operation is not required, or the position of the optic fiber ribbons can be readjusted, when a plurality of optical fiber ribbons are held mainly in a laminated state.

DETAILED DESCRIPTION OF THE INVENTION

Hereinafter, the optical fiber ribbon holding member, the optical fiber ribbon holding method, the optical fiber ribbon bundle and the holding member fixture for fixing the holding member of the embodiments of the invention will be described with reference to drawings.

First Embodiment

Figure 1:
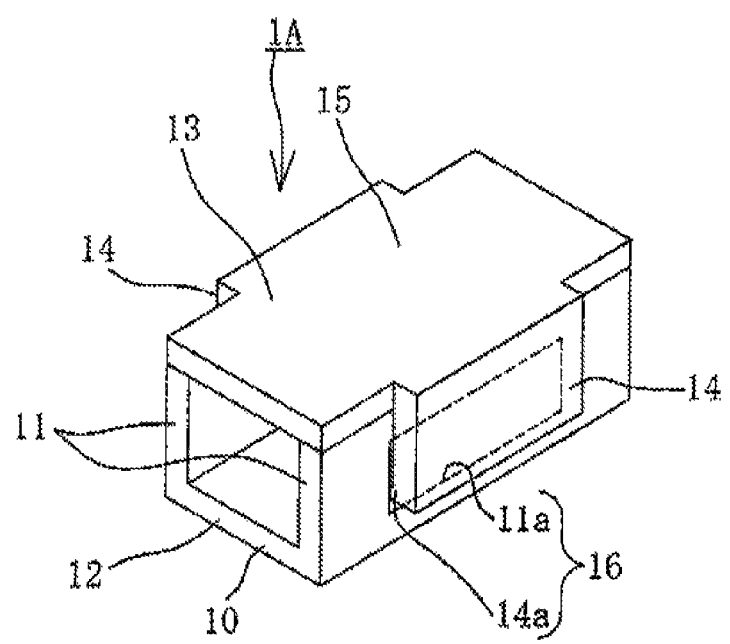
FIG. 1 is a perspective view illustrating an optical fiber ribbon holding member of a first embodiment of the invention.

FIG. 1 is a perspective view illustrating an optical fiber ribbon holding member 1A of the first embodiment of the invention.

Figure 7:
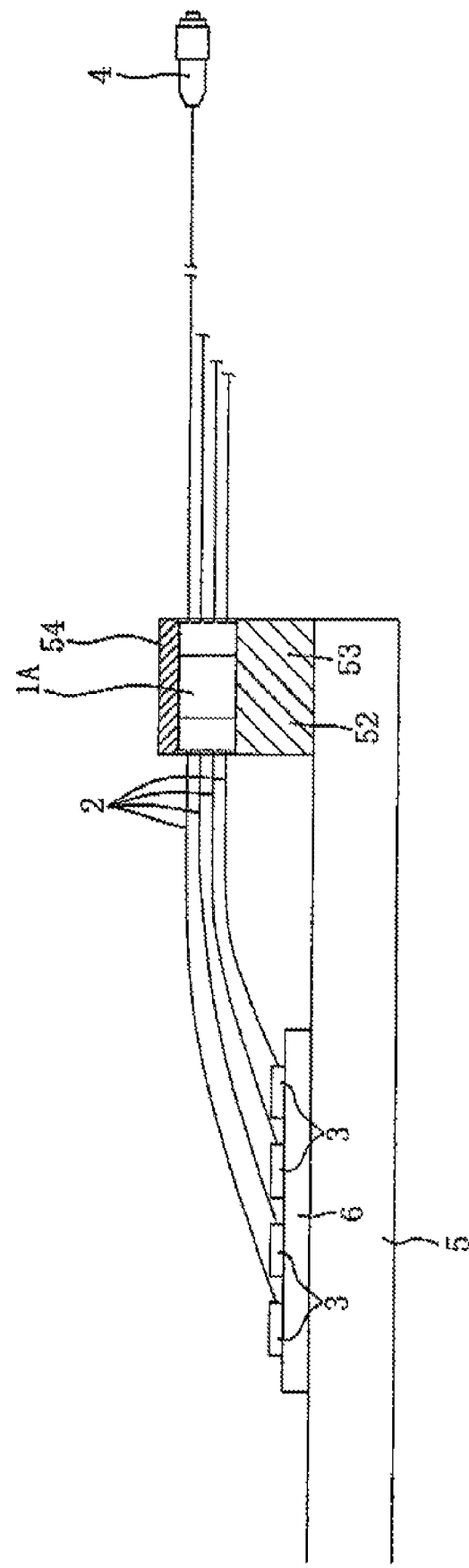
FIG. 7 is a view illustrating a state in which the optical fiber ribbon holding member shown in FIG. 1 that holds the laminated optical fiber ribbons is fixed to the holding member fixture for fixing the holding member that is fixed on a device bedplate.
Figure 8:
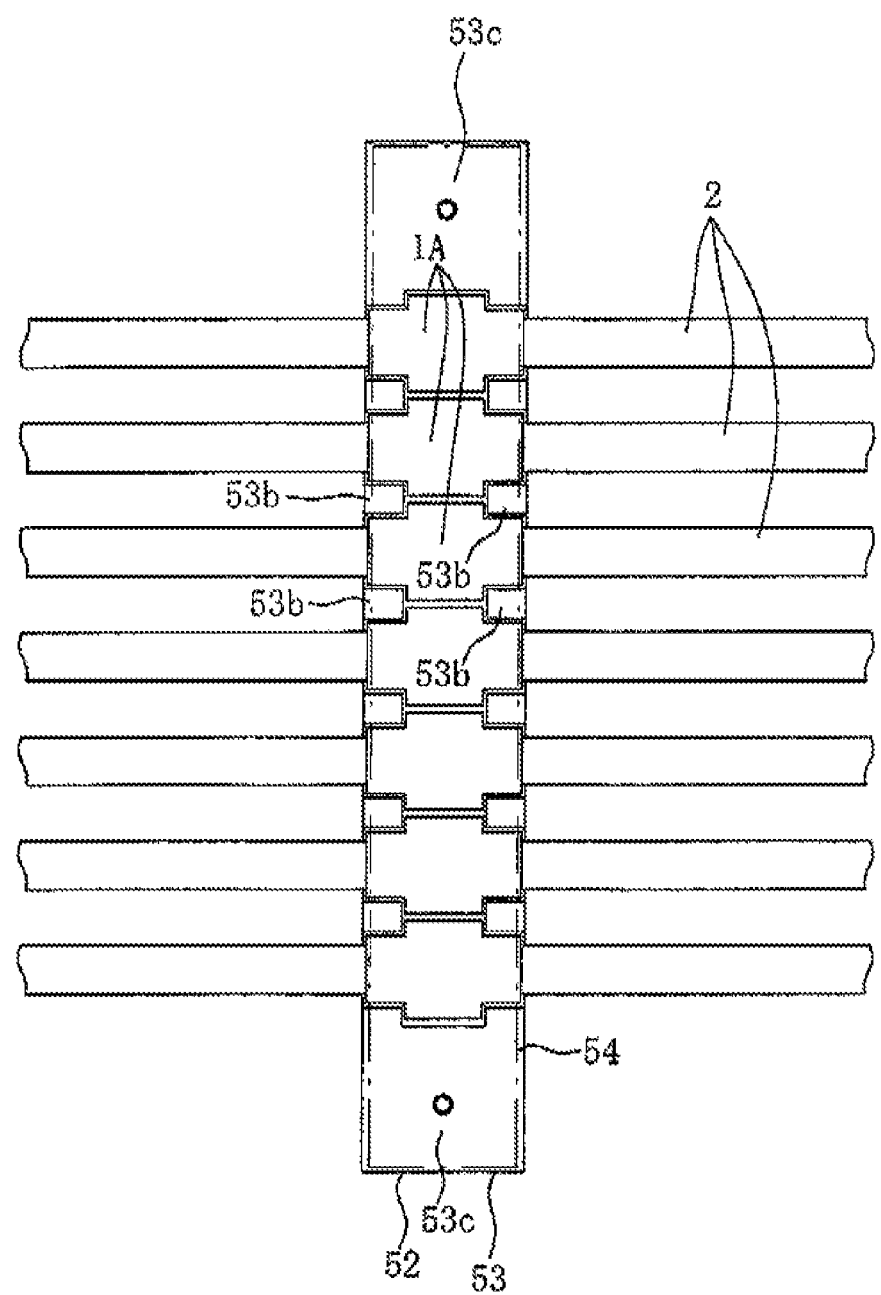
FIG. 8 is an enlarged plan view of a portion of the holding member fixture shown in FIG. 7.
Figure 9A:
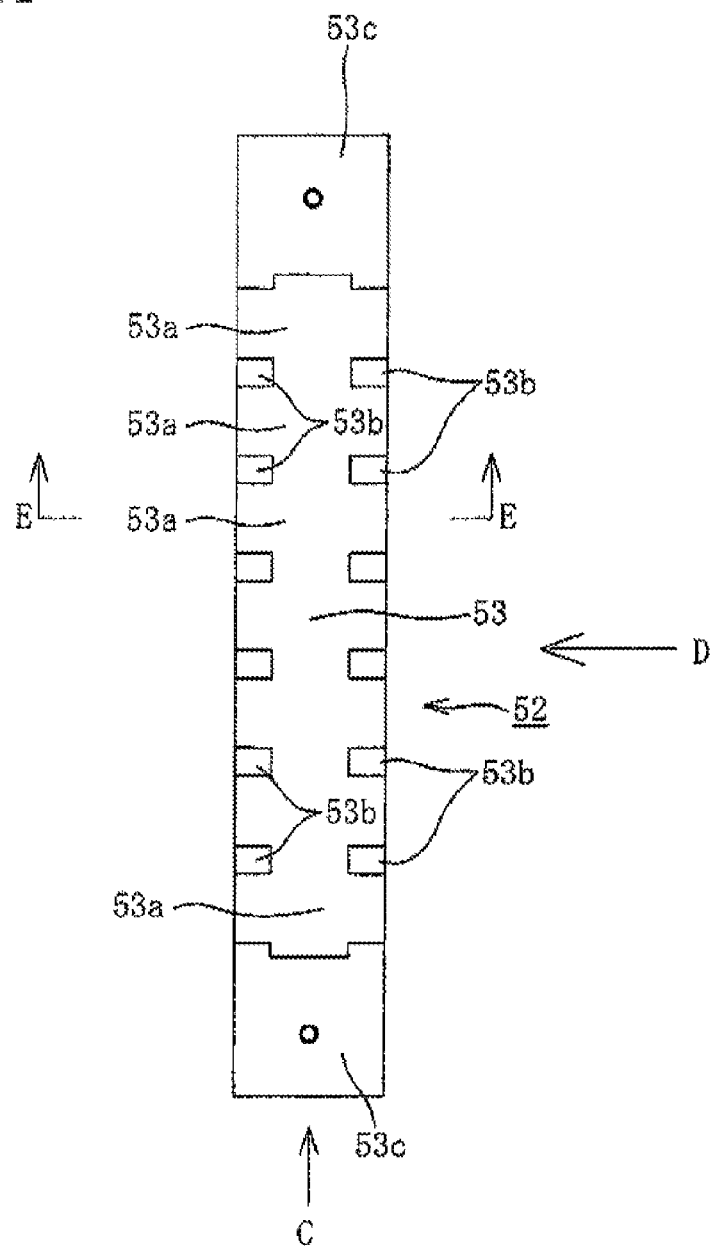
FIG. 9A is a plan view illustrating the holding member fixture shown in FIGS. 7 and 8.
Figure 9B:
FIG. 9B is a drawing seen from arrow mark C of FIG. 9A.
Figure 10:
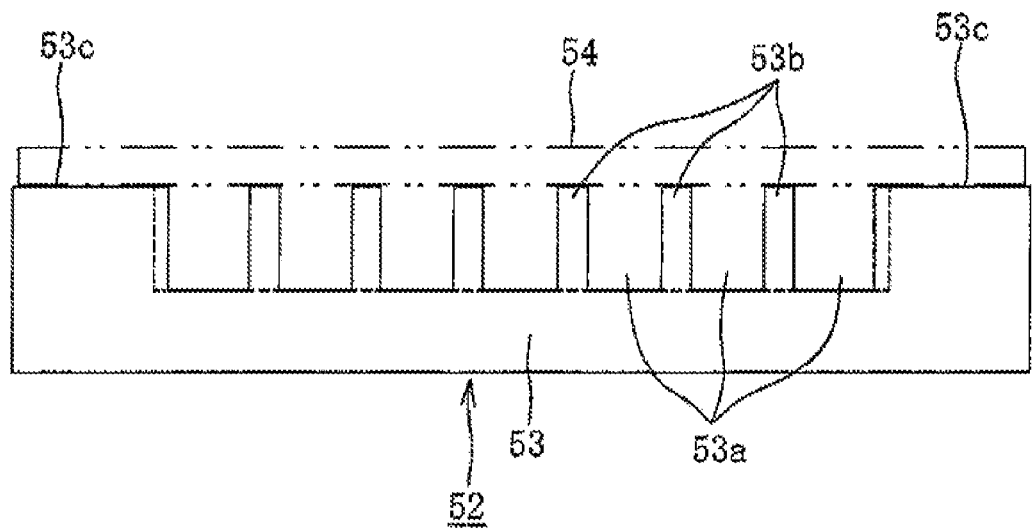
FIG. 10 is a drawing seen from arrow mark D of FIG. 9A.
Figure 11:
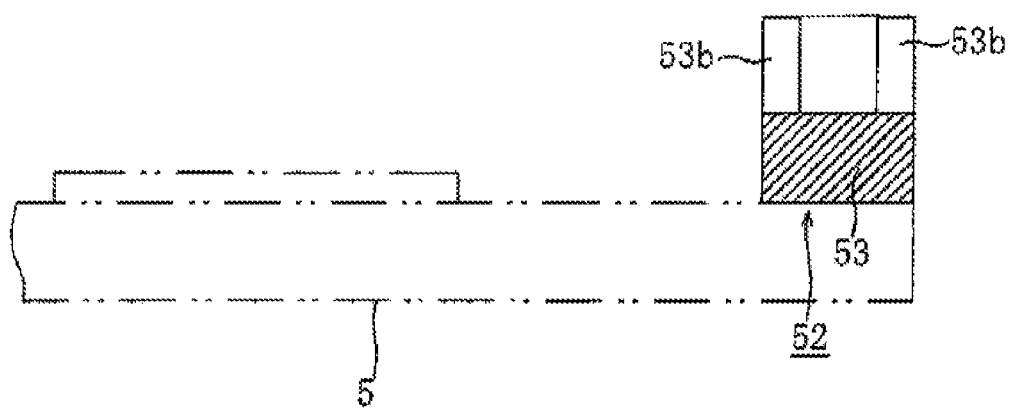
FIG. 11 is a cross section view taken along E-E of FIG. 9A.

As shown in FIG. 7, an optical path change type optical connector 3, which is mounted on an photoelectric composite substrate 6 at a device bed plate 5 in a computer device and the like, is attached to a tip (first end portion) of each of optical fiber ribbons (optical fiber tape core wires) 2. The optical fiber ribbon holding member 1A holds a plurality of the optical fiber ribbons 2 in a laminated state and in a state in which the positions of the optical connectors 3 at the tips of the optical fiber ribbons 2 are misaligned with each other in a length direction of the ribbon. The optical fiber ribbon holding member 1A is fixed in a holding member fixture 52 for fixing the holding member that is fixed in a peripheral portion of the device bedplate 5.

The optical connector 3 changes and performs optical coupling between the optical fibers that are inputted parallel to the substrate 6 and optical elements (not shown) that are mounted on the surface of the substrate 6.

In this embodiment, a so-called MPO optical connector 4 is attached to the other end (second end portion) of each of the optical fiber ribbons 2. The reference numeral 53 is a base portion of a holding member fixture 52, and the reference numeral 54 is a lid portion. The base portion 53 of the holding part fixture 52 is fixed on the device bedplate 5 with bolts (not shown).

Figure 2A:
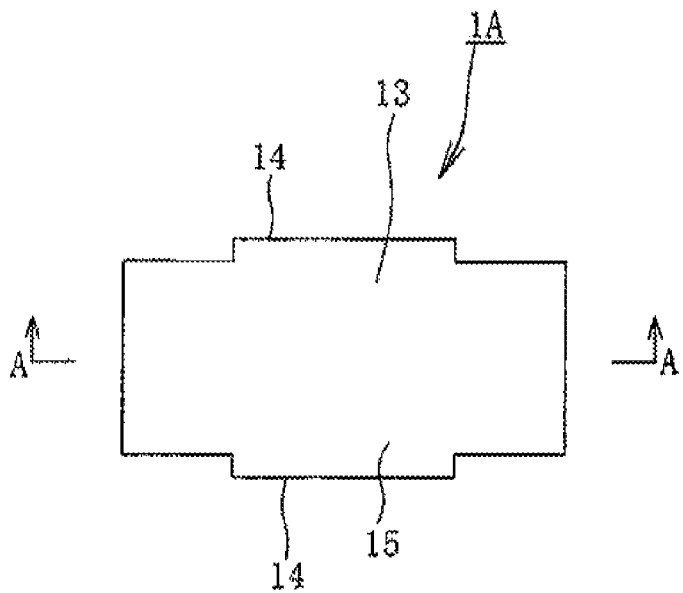
FIG. 2A is a plan view of the optical fiber ribbon holding member shown in FIG. 1.
Figure 2B:
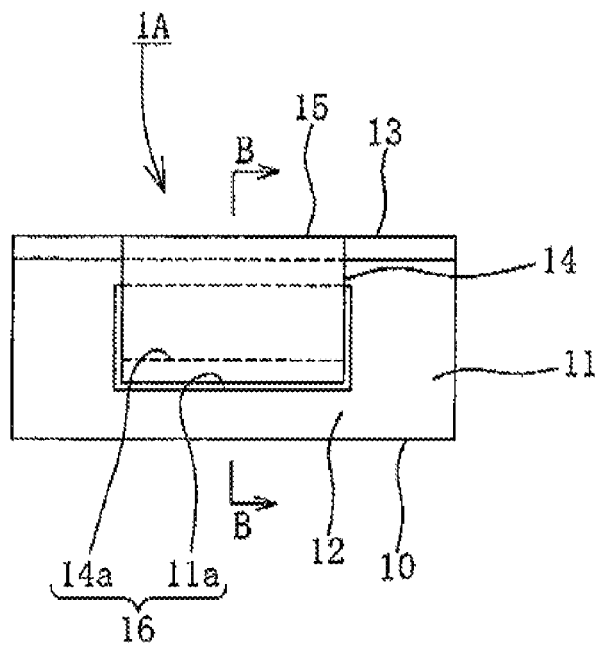
FIG. 2B is a side view of the optical fiber ribbon holding member shown in FIG. 1.
Figure 3:
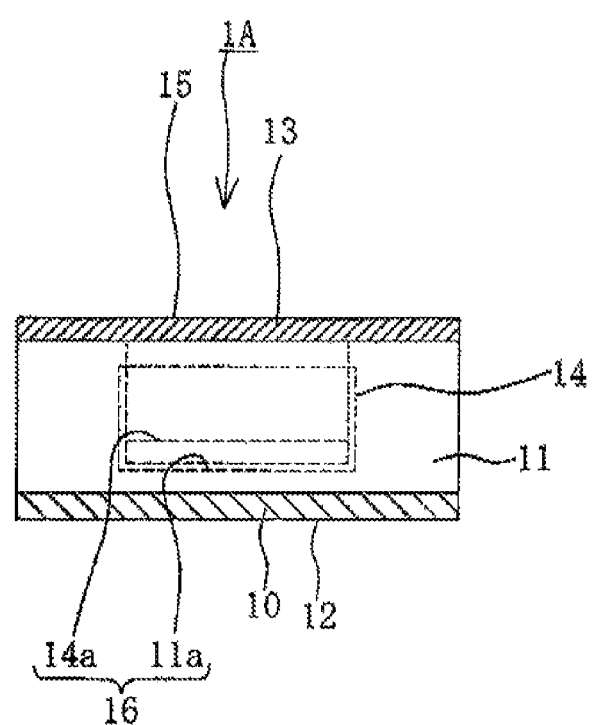
FIG. 3 is a cross section view taken along A-A in FIG. 2A.
Figure 4:
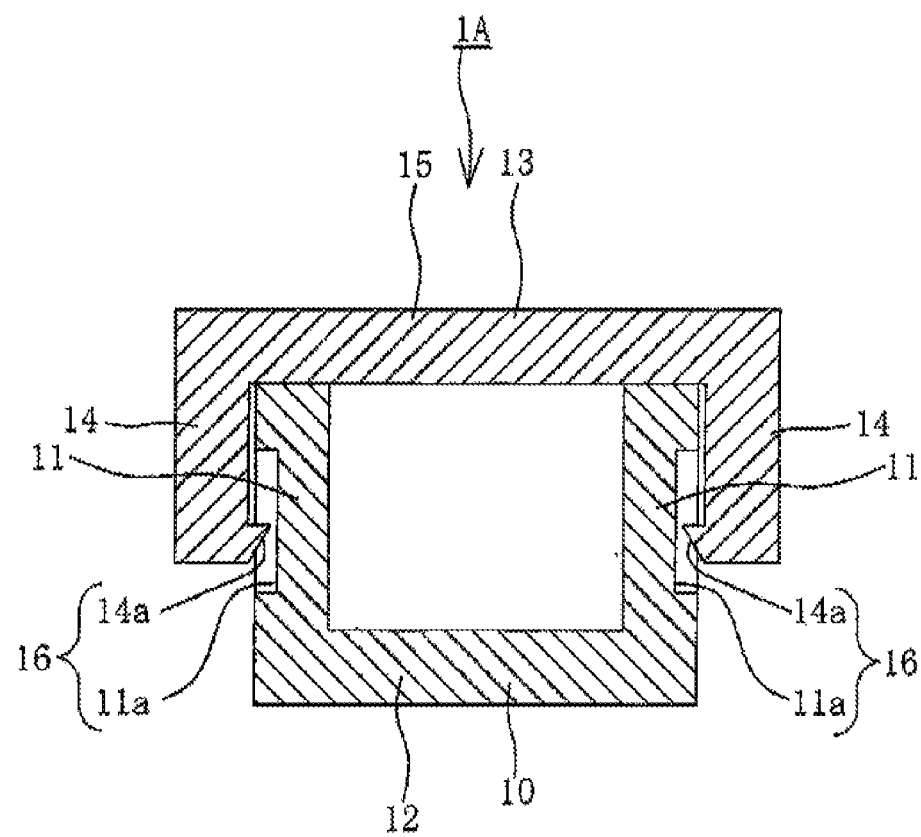
FIG. 4 is an enlarged cross section view taken along B-B in FIG. 2B.

FIG. 2A is a plan view of the optical fiber ribbon holding member 1A and FIG. 2B is a side view of the same. FIG. 3 is a cross section view taken along A-A in FIG. 2A and FIG. 4 is an enlarged cross section view taken along B-B in FIG. 2B.

As shown in the drawings, the optical fiber ribbon holding member 1A includes a holding member main body 12 to which a plurality of optical fiber ribbons can be laminated and accommodated, and a lid body 15 which covers the holding member main body 12. The holding member main body 12 has a U-shaped cross section with a bottom portion 10 and both side of wall portions 11. The lid body 15 has a reverse U-shaped cross section with a bottom portion 13 and both side of wall portions 14. The opening surface of the lid body 15 facing to an opening surface of the U-shaped cross section of the holding member main body 12, and the lid body 15 covers the opening surface of the holding member main body 12.

The holding member main body 12 may be made of resin, or may be made of metal. The lid body 15 may also be made of resin or metal.

A latch structure 16 is arranged at the wall portion 14 of the lid body 15 and the wall portion 11 of the holding member main body 12. An engaging click and an engaging recess of the latch structure 16 engage to each other when the lid body 15 covers the holding member main body 12.

As shown in FIG. 4, the latch structure 16 includes an engaging click 14a that is protruded to the inside side at a lower end portion of both side wall portions 14 of the lid body 15, and a rectangular shape engaging recess 11a that is formed at the outside surface of both side wall portions 11 of the holding member main body 12 and to which the engaging click 14a is engaged.

Figure 5:
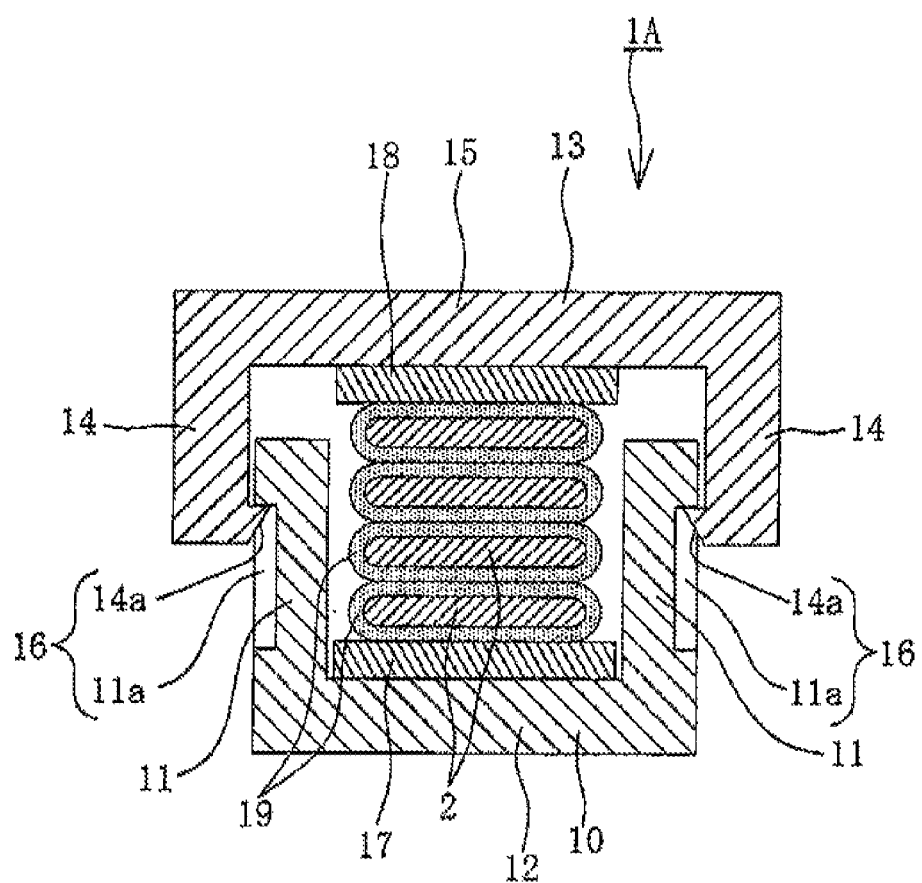
FIG. 5 is a drawing illustrating a state in which the optical fiber ribbon holding member holds optical fiber ribbons in FIG. 4.

A longitudinal length of the rectangular shape engaging recess 11a has a length in which the engaging click 14a is movable vertically in a constant distance (a distance in which the lid body 15 is movable from the position shown in FIG. 4 at least to the height shown in FIG. 5) within, the engaging recess 11a.

FIG. 5 is a cross section view illustrating a state in which a plurality of (four in the illustrated embodiment) laminated optical fiber ribbons (optical fiber ribbon bundle) 2 are held in the optical fiber ribbon holding member 1A.

In the embodiment, spacers 17 and 18 are fixed in the bottom surface of the holding member main body 12 and the inside surface of the lid body 15 respectively as height adjusting bed of a laminated ribbon accommodating space so that a proper pressing force is applied to the laminated optical fiber ribbons 2.

A way to hold four optical fiber ribbons 2 in the optical fiber ribbon holding member 1A is described. Four optical fiber ribbons 2 are laminated on the spacer 17 at the bottom of the holding member main body 12. Next, the lid body 15 covers and pushes down until the engaging click 14a of the lid body 15 is entered into the engaging recess 11a of the holding member main body 12. As shown in FIG. 5, the engaging click 14a is in an engaged state in which the engaging click 14a is in contact with the upper end surface of the engaging recess 11a, and the lid body 15 lightly presses the laminated optical fiber ribbons 2 to such a degree that the position of the laminated optical fiber ribbons 2 are not widely misaligned.

Accordingly, in a state in which the lid body 15 is engaged to the holding member main body 12 with the latch structure 16, the position of the optical fiber ribbons 2 can be adjusted.

In FIG. 5, rubber tubes 19 are shown as tightly contacted to the optical fiber ribbons 2 without a gap and the rubber tubes 19 that are vertically adjacent to each other are shown as tightly contacted to each other without a gap. However, the rubber tubes 19 are in a slightly expanded state, so that a gap is present between the optical fiber ribbon 2 and the rubber tube 19 in practice. Even if the optical fiber ribbons 2 are laminated in a state in which the optical fiber ribbons 2 are simply positioned (not pressed), the optical fiber ribbon 2 is light so that the vertically positioned optical fiber ribbons 2 are not in a state of being laminated in tight contact with each other throughout the entire longitudinal direction, but are in a loosely laminated state, and the lamination has a slight partial gap even between the rubber tubes 19 that vertically cover the optical fiber ribbons 2. Accordingly, in a holding state of FIG. 5 in which the lid body 15 is engaged to the holding member main body 12 with the latch structure 16, the optical fiber ribbons 2 are loosely held to such a degree that the position of the optical fiber ribbons 2 is not widely misaligned and the position can be adjusted as described above.

Also, if an inner depth of the holding member main body 12 is lower than the depth thereof shown in the FIGS (FIGS. 4 to 6), one or both of the spacers 17 and 18 can be omitted.

When the depth is lower than the depth shown in the FIGS and one or both of the spacers 17 and 18 are arranged, the rubber tube 19 can be removed from some (one of the optical fiber ribbons 2 that are vertically adjacent) of the four optical fiber ribbons 2.

When the depth is the same as the depth shown in the FIGS and one or both of the spacers 17 and 18 are removed, more than four optical fiber ribbons can be laminated.

Figure 6:
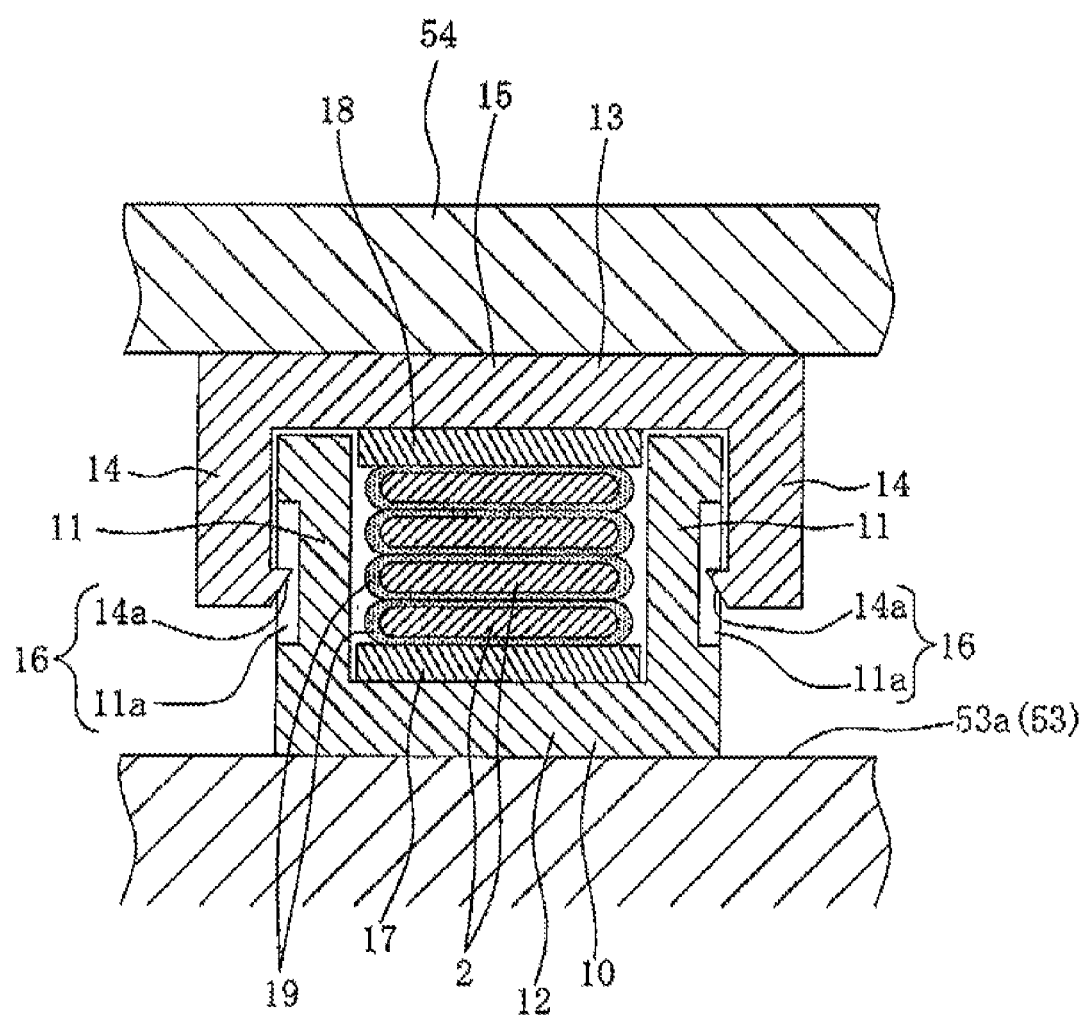
FIG. 6 is a cross section view illustrating a state in which the optical fiber ribbon holding member shown in FIG. 1 that holds the laminated optical fiber ribbons is fixed by a lid portion of a holding member fixture for fixing the holding member.

In the embodiment, as shown in FIGS. 5 and 6, the rubber tube 19 is covered over each of the optical fiber ribbons 2. The rubber tube 19 has an anti-slip function among the optical fiber ribbons 2, and has also an anti-slip function between the lowermost optical fiber ribbon (the optical fiber ribbon that is accommodated nearest to the bottom portion 10 of the holding member main body 12) 2 or the uppermost optical fiber ribbon (the optical fiber ribbon that is accommodated nearest to the bottom portion 13 of the lid body 15) 2 and the bottom portion 10 of the holding member main body 12 or the bottom portion 13 of the lid body 15.

In the illustrated embodiment, the rubber tubes 19 cover all of the optical fiber ribbons 2 respectively. However, if one of the optical fiber ribbons 2 that are vertically adjacent is covered by the rubber tube 19 with respect to the middle optical fiber ribbon 2 except the uppermost and the lowermost optical fiber ribbons, the anti-slip function is effected, so that the rubber tubes 19 can be omitted every other. In the embodiment, if the spacers 17 and 18 are made from rubber, the rubber has the anti-slip function so that the rubber tubes 19 can be omitted at the optical fiber ribbons 2 of the uppermost layer and the lowermost layer.

Also, it is not limited to be the rubber tube. Rubber material such as a simple rubber sheet may be inserted between the optical fiber ribbons, between the lowermost layer of the optical fiber ribbon and the bottom portion 10 and between the uppermost layer of the optical fiber ribbon and the bottom portion 13 of the lid body 15.

The product is shipped in a state shown in FIG. 5 when shipping. In this state, as described above, the optical fiber ribbons 2 are loosely held to such a degree that the position of the optical fiber ribbons 2 is not widely misaligned with the optical fiber ribbon holding member 1A and the position thereof can be adjusted.

If a force that holds the optical fiber ribbon 2 is excessively strong or excessively weak, the thickness of the spacers 17 and 18 are adjusted (exchange the spacers with spacers having proper thickness) so that the proper holding force may be obtained.

When a user fixes the optical fiber ribbon holding member 1A in which the laminated optical fiber ribbons 2 are held, to the holding member fixture 52 that is fixed on the device bedplate 5, as shown in FIGS. 7 to 9B, each of optical fiber ribbon holding members 1A is set to a holding member mounting portion 53a that is arranged to the base portion 53 of the holding member fixture 52.

The holding member mounting portion 53a is formed in the base portion 53 of the holding member fixture 52 as a space between four posts 53b having a quadrangular cross section that is erected to be upright so that it can be engaged in both ends, at the longitudinal direction, of both side wall portions 14 of the lid body 15 of the optical fiber ribbon holding member 1A.

Four posts 53b that surround one optical fiber ribbon holding member 1A pinch and restrain both ends of the wall portions 11 of the holding member main body 12 and both ends of the bottom portion 13 of the lid body 15 in the width direction of the optical fiber ribbon holding member 1A. In the longitudinal direction, the four posts 53b pinch both ends in the longitudinal direction of wall portions 14 of the lid body 15 in a longitudinal direction, so that the optical fiber ribbon holding member 1A is positioned.

Next, as shown in FIG. 6, when the lid portion 54 of the holding member fixture 52 is loaded and tightened by screws on the lid fixing portion 53c of the base portion 53, in a state in which the lid body 15 is pushed down by the lid portion 54 and the rubber tubes 19 are compressed, the laminated optical fiber ribbons 2 are tightly held in the optical fiber ribbon holding member 1A and the optical fiber ribbon holding member 1A is fixed to the holding member fixture 52.

In a loose holding state before shipment as shown in FIG. 5, even though the optical fiber ribbons 2 that are vertically adjacent with the rubber tubes 19 are closely contacted without a gap in the drawing, as described above, the gap is present in practice so that the optical fiber ribbons 2 are loosely held in the holding state in which the latch structure 16 shown in FIG. 5 is engaged, even if the rubber tubes 19 are not present. When the optical fiber ribbon 2 is pushed down and fixed by the lid portion 54 of the holding member fixture 52, the strong pressing force is operated to tightly fix the optical fiber ribbons 2 without a gap.

At this time, the optical connector 3 that is attached to each of the optical fiber ribbons 2 that are held in the optical fiber ribbon holding member 1A can be precisely positioned at the position in which the optical connector 3 is to be mounted on the substrate 6.

Furthermore, in a case where the position of the optical connector 3 is misaligned from the position at which the optical connector 3 is to be mounted, the latch structure 16 loosely engages to such a degree that the optical fiber ribbons 2 can be adjusted, so that the optical fiber ribbon holding member 1A is separated from the holding member fixture 52 and the position of the laminated optical fiber ribbons 2 with the lid body 15 may be readjusted (without removing the lid body 15).

As described above, according to the optical fiber ribbon holding member 1A, the holding of the optical fiber ribbons 2 can be performed by a simple operation of covering the lid body 15 so that the operation of laminating and holding the optical fiber ribbons can be easily performed.

The latch structure 16 are loosely engaged, and the position of the optical fiber ribbons 2 can be readjusted wherein the lid body 15 that is engaged with the latch structure 16 is attached, so that readjustment operation of the optical fiber ribbons can be easily performed.

Since a heating operation as in the conventional heat shrinkable tube is not required, the operation is easily performed and the lid is detachably mounted and the position of the optical fiber ribbons can be readjusted, so that when shipping, even though the optical fiber ribbons are not positioned with high precision, the user can easily and precisely adjust the position and then the optical fiber ribbons can be laminated and held.

Figure 12A:
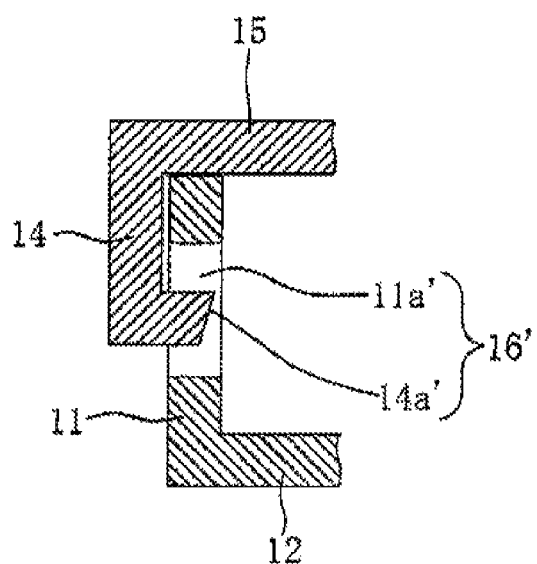
FIG. 12A is a cross section view of a main portion (corresponding to the latch structure shown in FIG. 5) of another embodiment of a latch structure in the optical fiber ribbon holding member shown in FIG. 1.

The latch structure 16 in the above described embodiment employs a recess portion that does not penetrate the wall portion 11 of the holding member main body 12 as the engaging recess 11a to which the engaging click 14a is engaged. However, as a latch structure 16' shown in FIG. 12A, an engaging recess 11a' that is a hole that penetrates the wall portion 11 may also be used. An engaging click of the lid body 15 side is shown in an engaging click 14a'.

Figure 12B:
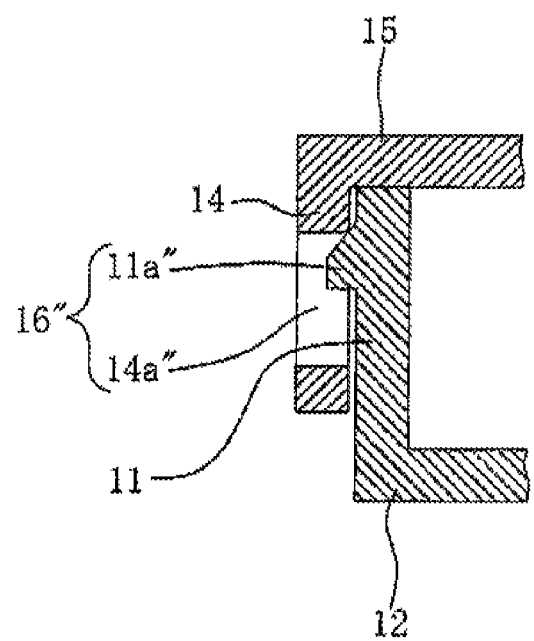
FIG. 12B is a cross section view of a main portion (corresponding to the latch structure shown in FIG. 5) of the other embodiment of a latch structure in the optical fiber ribbon holding member shown in FIG. 1.

As a latch structure 16" shown in FIG. 12B, an engaging recess 11a" may be arranged at the outer surface of the wall portion 11 of the holding member main body 12 and an engaging recess 14a" that is a penetrating hole may be arranged at the wall portion 14 of the lid body 15.

Second Embodiment

Figure 13A:
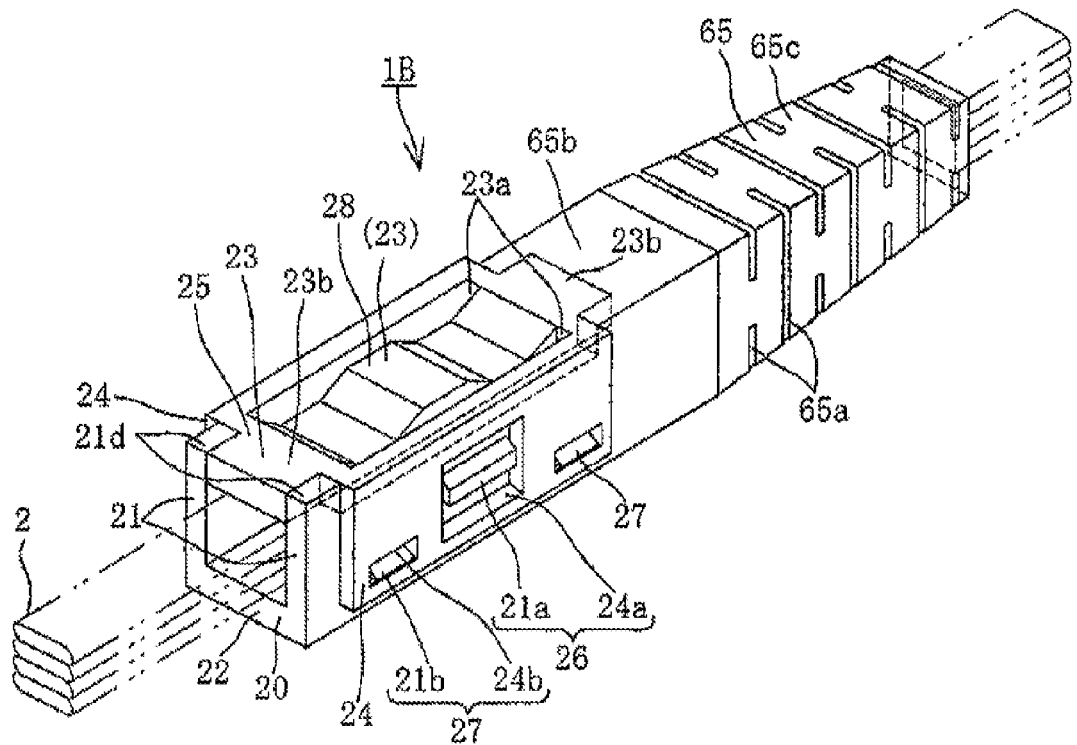
FIG. 13A is a perspective view illustrating an optical fiber ribbon holding member of a second embodiment of the invention.
Figure 13B:
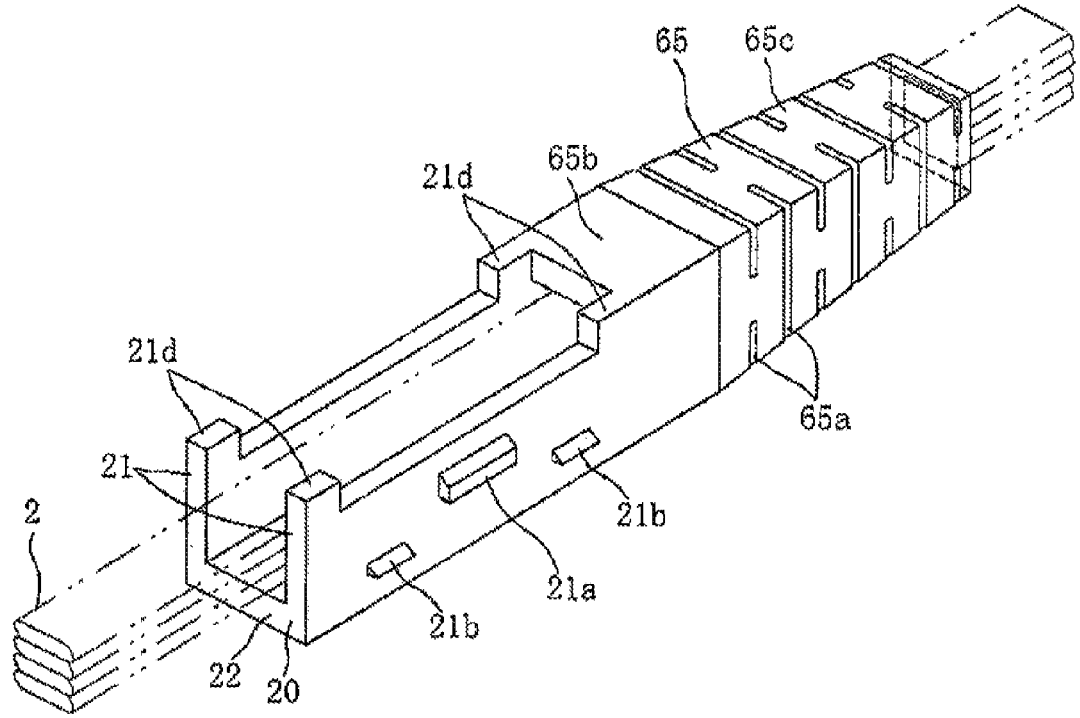
FIG. 13B is a perspective view illustrating a state in which a lid body is removed in FIG. 13A.

FIG. 13A is a perspective view illustrating an optical fiber ribbon holding member 1B of a second embodiment of the invention. FIG. 13B is a perspective view illustrating a state in which a lid body 25 (described below) is removed.

Figure 19:
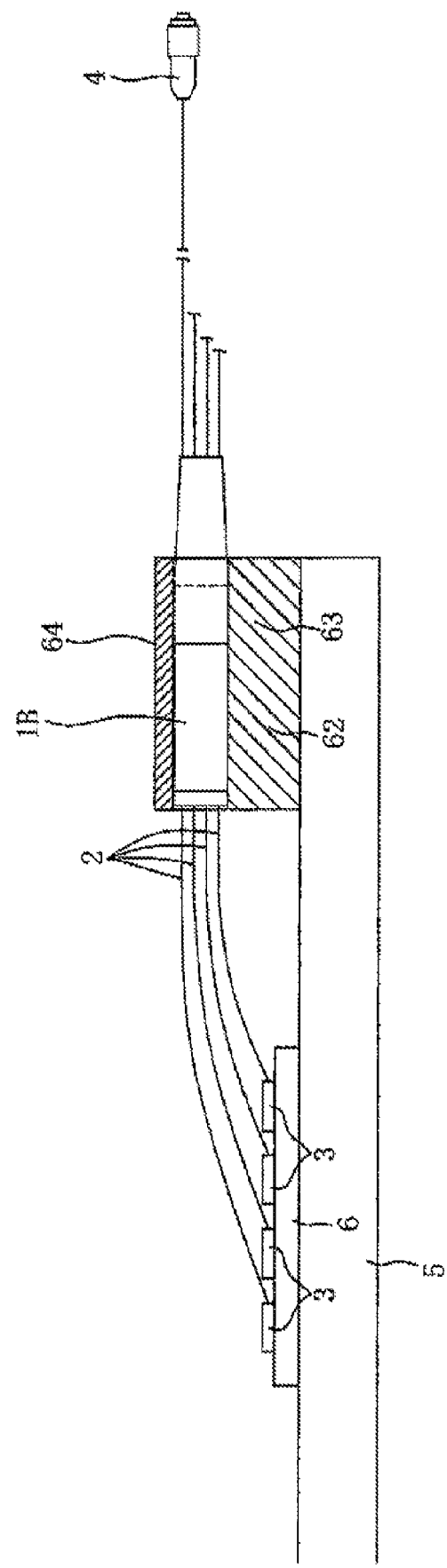
FIG. 19 is a view illustrating a state in which the optical fiber ribbon holding member shown in FIG. 13A that holds the laminated optical fiber ribbons is fixed to the holding member fixture for fixing the holding member that is fixed on a device bedplate.

As shown in FIG. 19, an optical path change type optical connector 3, that is mounted on a photoelectric composite substrate 6 at a device bedplate 5 in a computer device and the like, is attached to a tip (first end portion) of the optical fiber ribbon (optical fiber tape core wire) 2. The optical fiber ribbon holding member 1B holds a plurality of optical fiber ribbons 2 in a laminated state, and in a state in which the positions of the optical connectors 3 of the tips of the optical fiber ribbons 2 are misaligned with each other in a longitudinal direction of the ribbon. In addition, the optical fiber ribbon holding member 1B is fixed in a holding member fixture 62 for fixing the holding member that is fixed in a peripheral portion of the device bedplate 5.

The optical connector 3 changes the optical path and performs optical coupling between an optical fiber that is introduced parallel to the substrate 6 and an optical element (not shown) that is mounted on the surface of the substrate 6.

In the embodiment, a so-called MPO optical connector 4 is attached to the other end (a second end portion) of each of the optical fiber ribbons 2. The reference number 63 is a base portion of the holding member fixture 62, and the reference number 64 is a lid portion. The base portion 63 of the holding part fixture 62 is fixed to the device bedplate S with bolts (not shown).

Figure 14A:
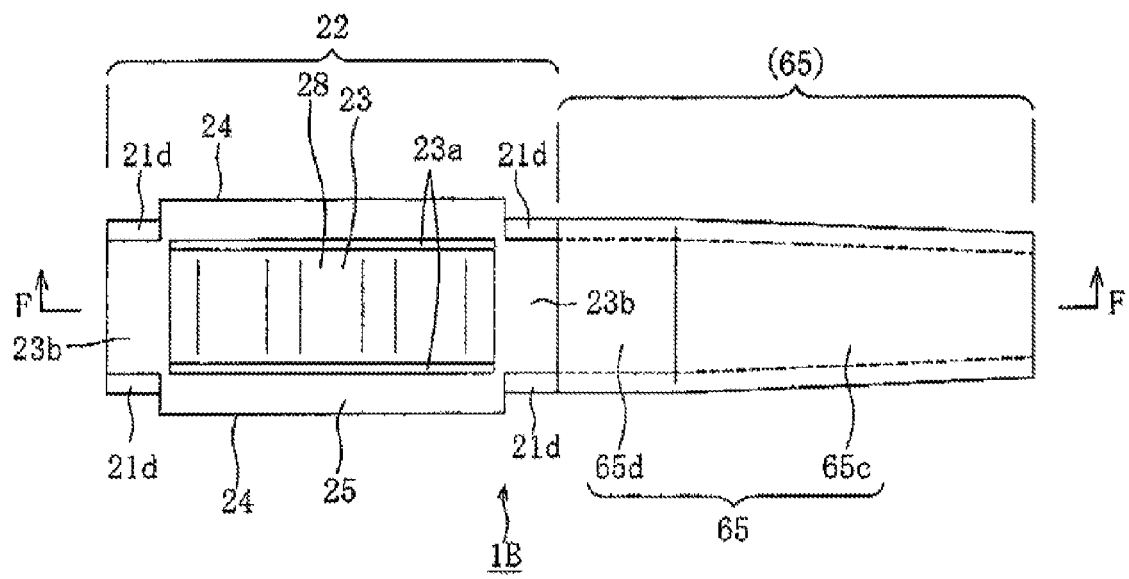
FIG. 14A is a plan view of the optical fiber ribbon holding member shown in FIG. 13A.
Figure 14B:
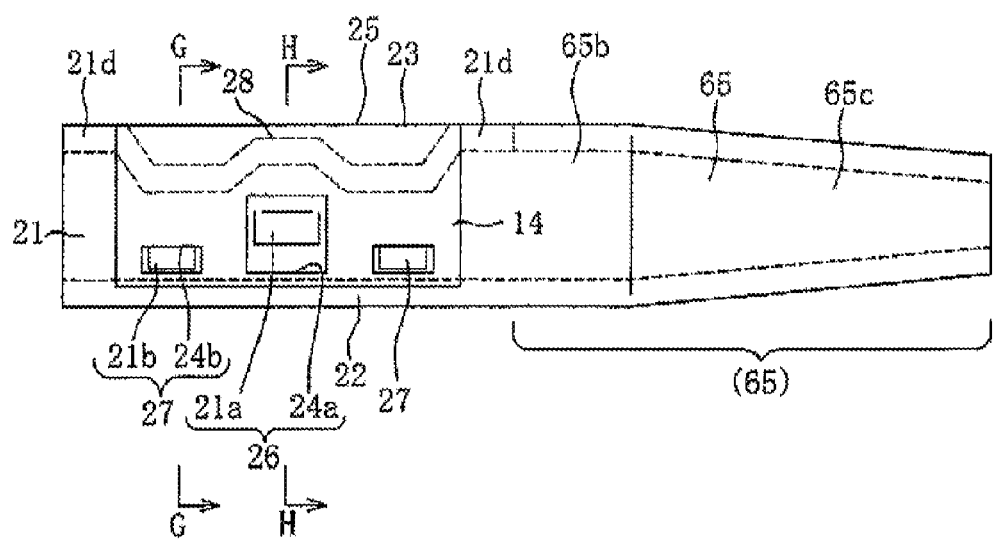
FIG. 14B is a side view of the optical fiber ribbon holding member shown in FIG. 13A.
Figure 15:
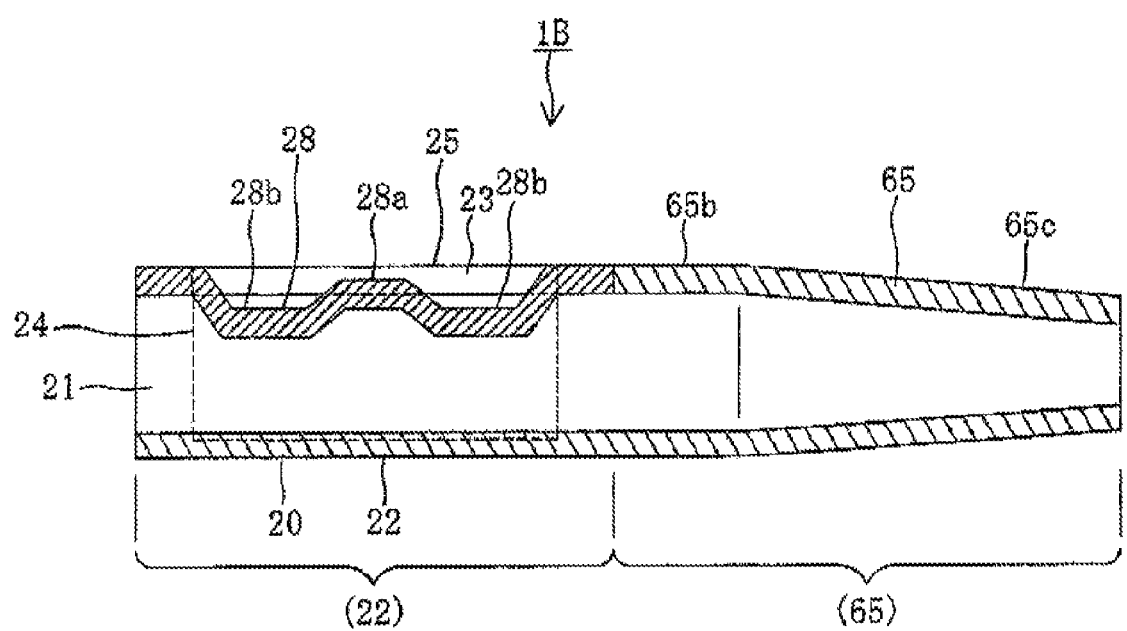
FIG. 15 is a cross section view taken along F-F in FIG. 14A.

FIG. 14A is a plan view of the optical fiber ribbon holding member 1B. FIG. 14B is a side view of the optical fiber ribbon holding member 1B. FIG. 15 is a cross section view taken along the line F-F in FIG. 14A. FIGS. 16 and 17 are cross section views illustrating a state in which a plurality (four in the illustrated embodiment) of optical fiber ribbons 2 are held in the optical fiber ribbon holding member 1B.

As shown in the drawings, the optical fiber ribbon holding member 1B includes a holding member main body 22, a protecting boot 65 that protects the optical fiber ribbons 2, and a lid body 25 that covers an opening surface of the holding member main body 22. The holding member main body 22 has a U-shaped cross section with a bottom portion 20 and both side wall portions 21, and a space that can laminate and accommodate a plurality of optical fiber ribbons. The protecting boot 65 is integrally arranged in the rear portion of the holding member main body 22, and protects the optical fiber ribbons 2 by making the optical fiber ribbons 2 be inserted through the protecting boot 65. The lid body 25 has a reverse U-shaped cross section with a bottom portion 23 and both side wall portions 24 with respect to the U-shaped cross section of the holding member main body 22.

The holding member main body 22 and the protecting boot 65 are integrally formed by resin molding. The protecting boot 65 is a tube shape and grooves 65a are formed at the outer periphery portion in the circumferential direction so that the protecting boot 65 has flexibility. The protecting boot 65 is substantially a rectangular tube shape. The front portion of the rectangular tube of the protecting boot 65 is parallel (a parallel tube portion 65b), and the rear portion of the rectangular tube of the protecting boot 65 is slightly tapered (a tapered tube portion 65c). In the drawing, angular portions of the rectangular shape are illustrated as acute angles; however, in practice, round shapes are slightly formed. Materials of the holding member main body 22 and the protecting boot 65 are formed of materials having a lower hardness than that of the lid body 25 considering the required flexibility of the protecting boot 65. As the materials of the holding member main body 22 and the protecting boot 65, for example, thermoplastic elastomer or the like may be used. The material of the lid body 25 can be selected from metal or for example, PEI (polyetherimide) having a higher hardness than that of the holding member main body 22 and the protecting boot 65.

In both ends of the both sides wall portions 21 of the holding member main body 22 in the longitudinal direction, projecting portions 21d that are projected to the upper direction so as to not interfere with the bottom portion 23 of the lid body 25 is respectively arranged.

Both ends of the bottom portion 23 of the lid body 25 in a longitudinal direction are narrow in width and a narrow portions 23b can be inserted between both right and left side of projecting portions 21d of both side wall portions 21 of the holding member main body 22 so that the narrow portion 23b does not interfere with the projecting portions 21d.

The lid body 25 may be made of a metal plate or may be made of resin.

Two types of latch structures 26 and 27 are provided at the wall portions 24 of the lid body 25 and the wall portions 21 of the holding member main body 22, in which an engaging click and an engaging recess engage to each other when the lid body 25 coves the holding member main body 22. The two types of the latch structures 26 and 27 function in different steps as described below and are two-step type latch structure.

The lid body 25 has an optical fiber ribbon pressing portion 28 that presses the laminated optical fiber ribbons 2 accommodated in the holding member main body 22.

The optical fiber ribbons pressing portion 28 has a structure such that the bottom portion 23 of the lid body 25 has a plate spring shape. In other words, the optical fiber ribbon pressing portion 28 includes slits 23a which are provided at both sides of the bottom portion 23, and edges of the middle part thereof in the width direction are cut (trimmed) from both side portions. As shown also in FIG. 13A, the cross section shape between two slits 23a is formed in a wavelike such that center portion is a mount 28a and both sides are valleys 28b and then the plate spring function is present.

The optical fiber ribbon pressing portion 28 as shown in the drawing is formed such that the upper surface of the mount 28a in the center is slightly lower than the upper surface of the bottom portion 23.

A first latch structure 26 of the two step latch structures 26 and 27 includes engaging clicks 21a and engaging recesses 24a in which the engaging clicks 21a are provided in the center portion of the both side wall portions 21 of the holding member main body 22, and the engaging recesses 24a are provided in the center portion of the both side wall portions 24 of the lid body 25 and is engaged with the engaging clicks 21a.

Figure 17A:
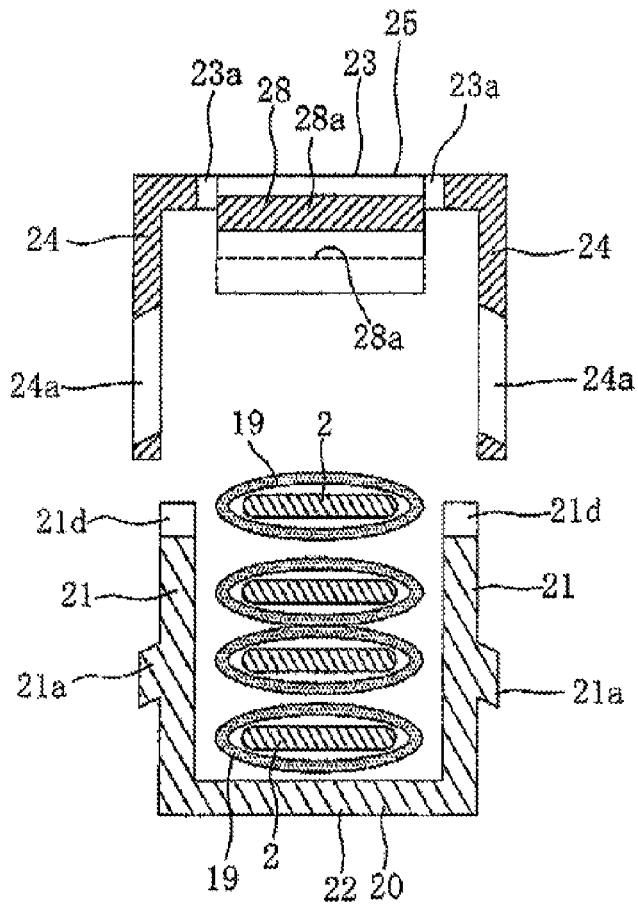
FIG. 17A is a cross section view taken along H-H of FIG. 14B illustrating a state in which the lid body is removed and four optical fiber ribbons are simply laminated and accommodated within the holding member main body.
Figure 17B:
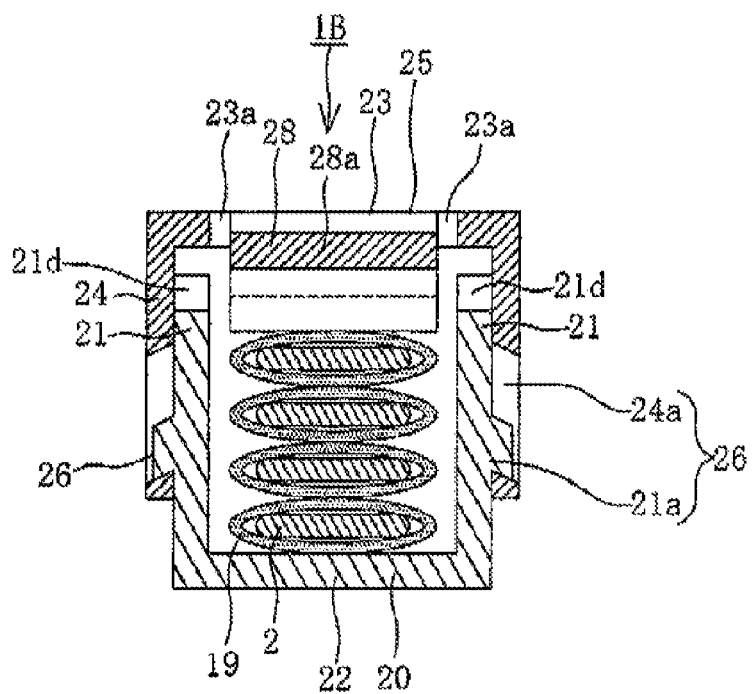
FIG. 17B is a cross section view taken along H-H of FIG. 14B illustrating a state in which the lid body is covered and is mounted on the holding member main body by a first latch structure in FIG. 17A.

The first latch structure 26 is a first step latch structure which functions in an engaged state shown in FIG. 17B. In this state shown in FIG. 17B, the optical fiber ribbon pressing portion 28 that is also the bottom portion 23 of the lid body 25 is slightly elastically deformed so that lightly presses the laminated optical fiber ribbons 2.

As shown in FIGS. 16A, 16B, 17A, 17B, 18A and 18B, in this embodiment, the rubber tube 19 covers each of the optical fiber ribbons 2 and the optical fiber ribbon pressing portion 28 of the optical fiber ribbon holding member 1B does not press the optical fiber ribbon 2 directly but presses the portion of the rubber tube 19 that covers the optical fiber ribbon 2. The rubber tube 19 has an anti-slip function between the optical fiber ribbons 2 and between the lowermost optical fiber ribbon (the optical fiber ribbon that is accommodated nearest to the bottom portion 20 of the holding member main body 22) 2 or the uppermost optical fiber ribbon (the optical fiber ribbon that is accommodated nearest to the bottom portion 23 of the lid body 25) 2 and the bottom portion 20 of the holding member main body 22 or the optical fiber ribbon pressing portion 28 of the lid body 25.

In the illustrated embodiment, the rubber tubes 19 cover all of the optical fiber ribbons 2 respectively. However, when one of the optical fiber ribbons 2 that are vertically adjacent is covered by the rubber tube 19 with respect to the middle optical fiber ribbon 2 except the uppermost and the lowermost optical fiber ribbons, the anti-slip function is effectively operated so that the rubber tube 19 can be omitted alternately.

Also, the invention is not limited to the rubber tube, rubber material such as a simple rubber sheet may be inserted between the optical fiber ribbons, between the lowermost layer of the optical fiber ribbon and the bottom portion 20 of the holding member main body 22, and between the uppermost layer of the optical fiber ribbon and the bottom portion 23 of the lid body 25.

Figure 18A:
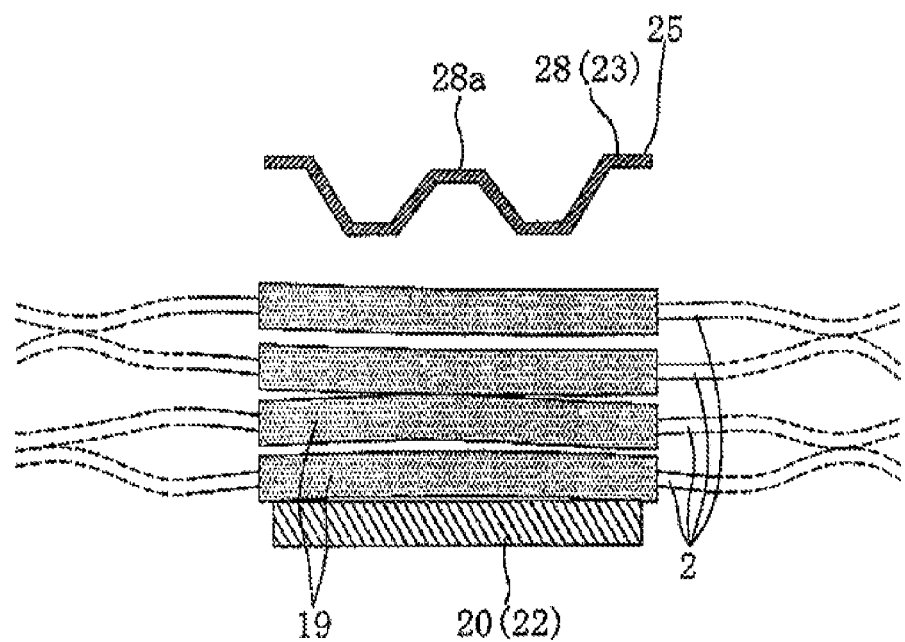
FIG. 18A is a view for describing an operation for fixing the optical fiber ribbon holding member shown in FIG. 13A that holds the laminated optical fiber ribbons by the lid portion of the holding member fixture for fixing the holding member, and is a vertical cross section view schematically illustrating a state before fixing by the lid portion of the holding member fixture.

When the rubber tube 19 covers the optical fiber ribbon 2, the rubber tube 19 does not cover the optical fiber ribbon 2 in a state in which the rubber tube 19 tightly contacts the outer peripheral surface of the optical fiber ribbon 2 but covers the optical fiber ribbon 2 in an expanded state in which a gap is present with the optical fiber ribbons 2 as shown in FIG. 17A, so that the height (the thickness) becomes large. For example, even though four optical fiber ribbons 2 are simply laminated and positioned, since the optical fiber ribbons 2 are light, the optical fiber ribbons 2 are in the laminated state in which the vertically adjacent optical fiber ribbons 2 are not perfectly tightly contacted to each other overall in the longitudinal direction. As shown in FIG. 18A, when the state of the optical fiber ribbons 2 is illustrated by dashed lines in a deformed manner, some portion of the optical fiber ribbons 2 are contacted to each other in a longitudinal direction and the height of the lamination becomes large.

As described above, since the rubber tube 19 is in an expanded state and the lamination height becomes large while a plurality of the optical fiber ribbons 2 are simply laminated, as shown in FIG. 17A, in a step in which portions of the optical fiber ribbons 2 that covered with the rubber tube 19 are simply laminated in the holding member main body 22, the expanded rubber tubes 19 are laminated with the vertical gap, and then the height becomes large.

Thus, when the height of the wall portion 21 of the holding member main body 22 is low, a lateral misalignment (lateral slip) cannot be prevented when the uppermost optical fiber ribbon 2 is slightly deviated laterally along with the rubber tube 19. Accordingly, when the lid body 25 covers and pushes down the holding member main body 22, the uppermost optical fiber ribbon 2 is misaligned laterally so that the optical fiber ribbon 2 may be easily loaded on the wall portion 21 of the holding member main body 22 or fall to the outside.

However, in the optical fiber ribbon holding member 1B, the projecting portions 21*d* that are projected to the upper direction at the both ends of the both side wall portions 21 of the holding member main body 22 in a longitudinal direction are present. So that the projecting portions 21*d* can prevent the optical fiber ribbons 2 from being misaligned laterally and the uppermost optical fiber ribbon 2 can also be reliably accommodated within the holding member main body 22 when the lid body 25 covers and pushes down the holding member main body 22.

In this embodiment, the projecting portions 21*d* of the wall portions 21 of the holding member main body 22 are provided at both end portions in the longitudinal direction. However, the projecting portions 21*d* need not be at both ends, and for example, may be provided at a position near to the center from the both ends, or may be provide only one projecting portion in the center.

In the engaged state by the first latch structure 26 as shown in FIG. 17B, the rubber tubes 19 are compressed at some level and the rubber tubes 19 are laminated in a state in which the gap between the rubber tubes 19 is absent or slightly present. However, the rubber tubes 19 are not completely tightly contacted and restrained on the outer periphery of the optical fiber ribbons 2 and the optical fiber ribbons 2 can be slid by a light force with respect to the rubber tubes 19. In other words, the optical fiber ribbon pressing portion 28 lightly presses the laminated optical fiber ribbons 2 to such a degree that the laminated optical fiber ribbons 2 are not widely misaligned. Accordingly, in a state in which the lid body 25 is engaged with the holding member main body 22 by the latch structure 26, the position of the optical fiber ribbons 2 can be adjusted.

The second latch structures 27 are provided at both sides of the first latch structure 26, and include engaging clicks 21*b* and engaging recesses 24*b* wherein the engaging clicks 21*b* are provided at both sides of the both side wall portions 21 of the holding member main body 22 respectively in the longitudinal direction, and the engaging recesses 24*b* are provided at both sides of the both side wall portions 24 of the lid body 25 in the longitudinal direction and engaged with the engaging clicks 21*b*.

Figure 16A:
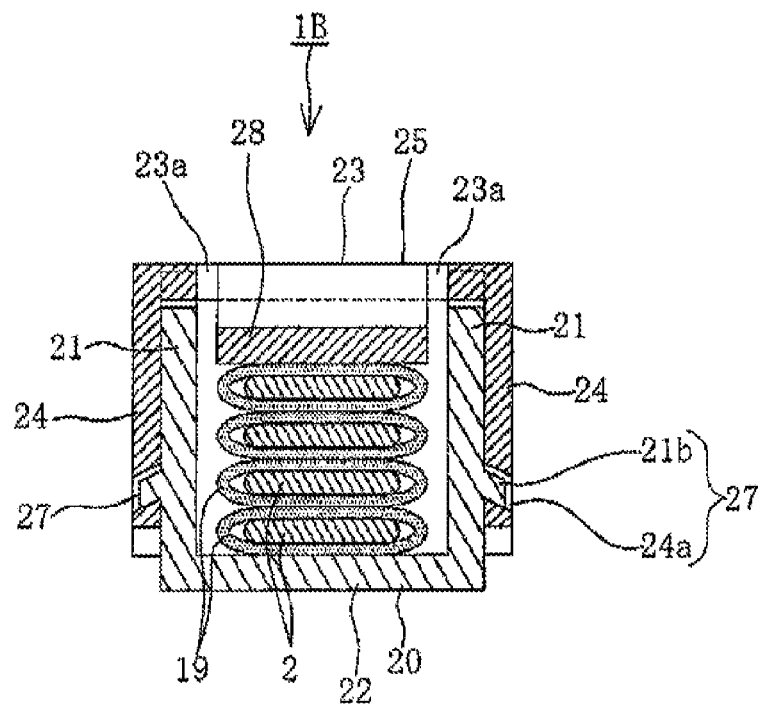
FIG. 16A is a cross section view taken along G-G of FIG. 14B illustrating the optical fiber ribbon holding member shown in FIG. 13A in a state in which the optical fiber ribbons are held and the lid body is mounted to the holding member main body by the second latch structure.
Figure 16B:
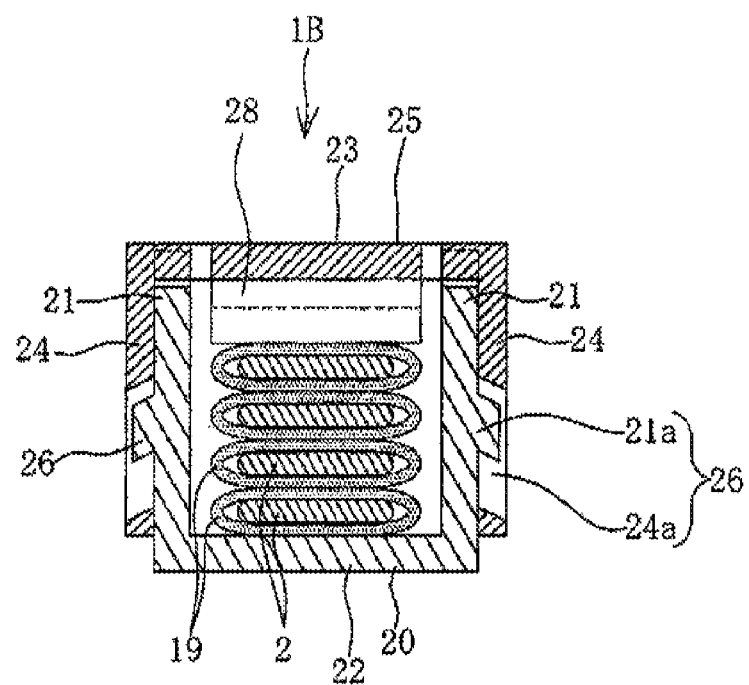
FIG. 16B is a cross section view taken along H-H of FIG. 14B illustrating the optical fiber ribbon holding member shown in FIG. 13A in a state in which the optical fiber ribbons are held and the lid body is mounted to the holding member main body by the second latch structure.
Figure 18B:
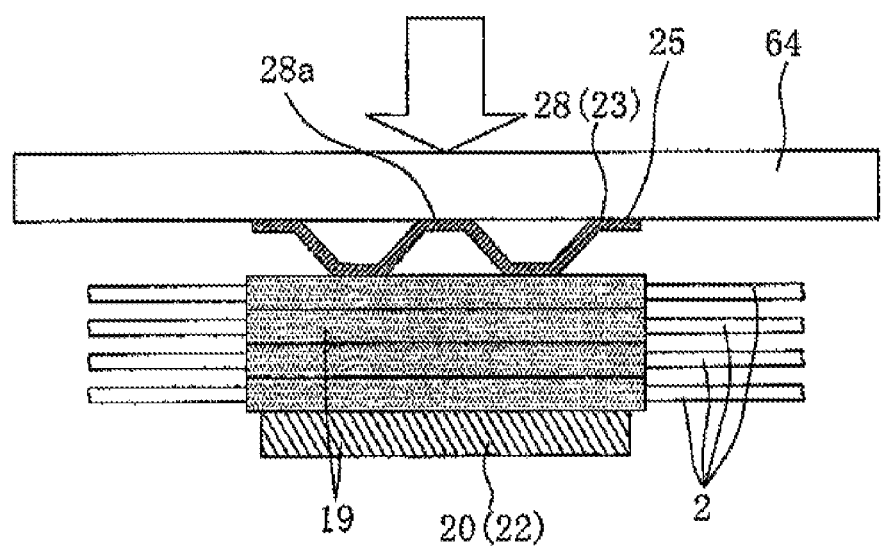
FIG. 18B is a view for describing an operation for fixing the optical fiber ribbon holding member shown in FIG. 13A that holds the laminated optical fiber ribbons by the lid portion of the holding member fixture for fixing the holding member, and is a vertical cross section view schematically illustrating a state after fixing by the lid portion of the holding member fixture.
Figure 20:
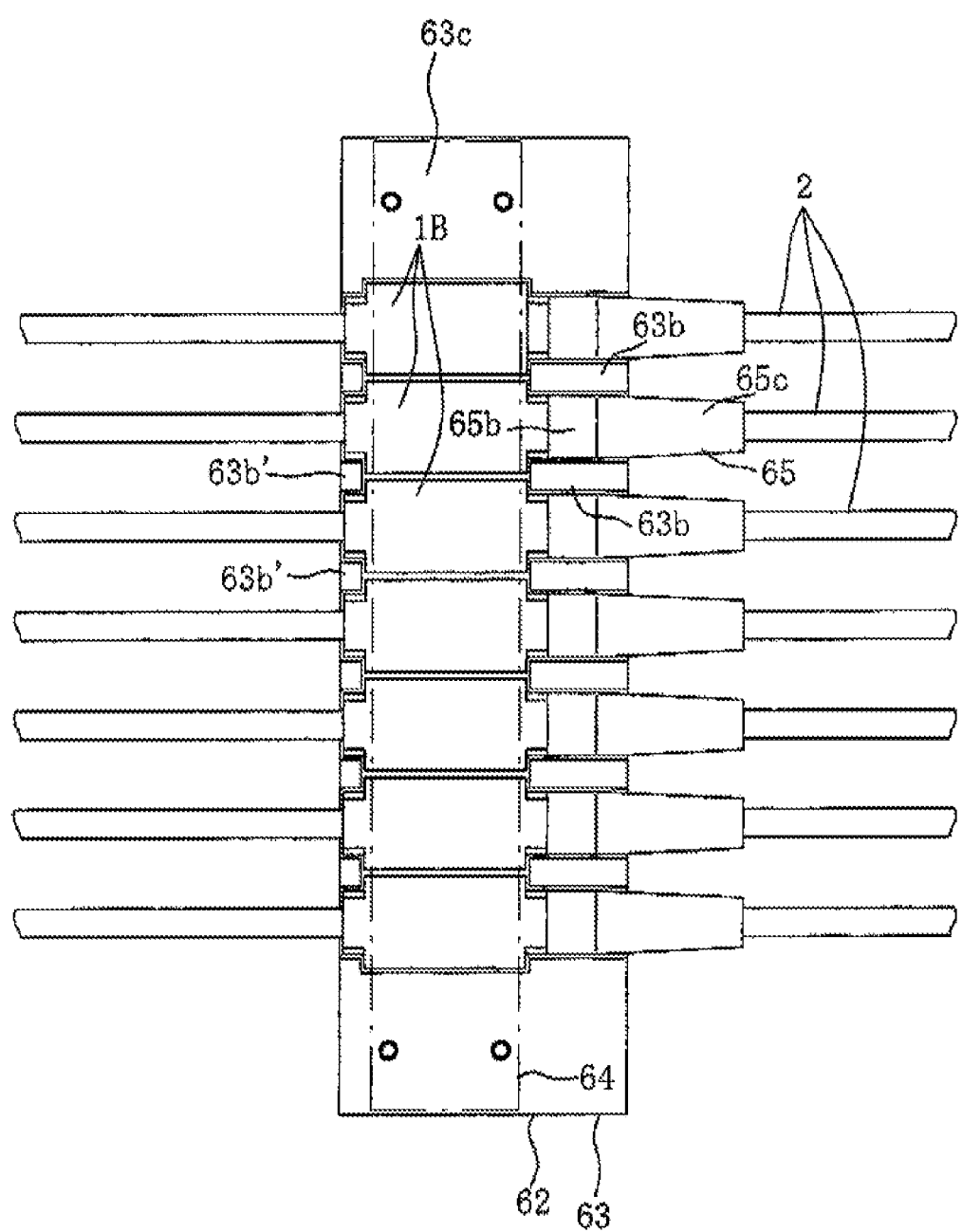
FIG. 20 is an enlarged plan view of a portion of the holding member fixture shown in FIG. 19.

The second latch structures 27 function when the lid body 25 is further pushed down from the state as shown in FIG. 17B. In other words, the second latch structures 27 are a second step latch structure that functions in the engaged state as shown in FIG. 16A. As shown in FIGS. 18B, 19 and 20, the state is when the lid portion 64 of the holding member fixture 62 is tightened by screws to both sides of a lid fixture portion 63*c* of the base portion 63 of the holding member fixture 62, and the lid body 25 of the optical fiber ribbon holding member 1B is further pushed down by the lid portion 64, and the optical fiber ribbon posing portion 28 presses down the laminated optical fiber ribbons 2 with a stronger elastic force and fixes the optical fiber ribbons 2 tightly. At this time, as shown in FIGS. 16A and 16B, the rubber tubes 19 are further compressed so that the rubber tubes 19 substantially tightly contact the outer periphery of the optical fiber ribbon 2, and become a state in which then movement of the optical fiber ribbons 2 are restrained.

When shipping, the lid body 25 is not deeply pressed and the first latch structure 26 is in the engaging state. At this state, the optical fiber ribbons 2 are held such that the optical fiber ribbons 2 are not widely misaligned in the optical fiber ribbon holding member 1B, and the optical fiber ribbons 2 are loosely held to such a degree that the optical fiber ribbons 2 can be adjusted.

When a user fixes the optical fiber ribbon holding member 1B holding the laminated optical fiber ribbons 2 to the holding member fixture 62 that is fixed on the device bedplate 5, as shown in FIGS. 19 and 20, each of optical fiber ribbon holding members 1B is set to a holding member mounting portion that is provided at the base portion 63 of the holding member fixture 62. A holding member fixture portion is illustrated as reference numeral 63*a* in FIG. 21A.

Figure 21A:
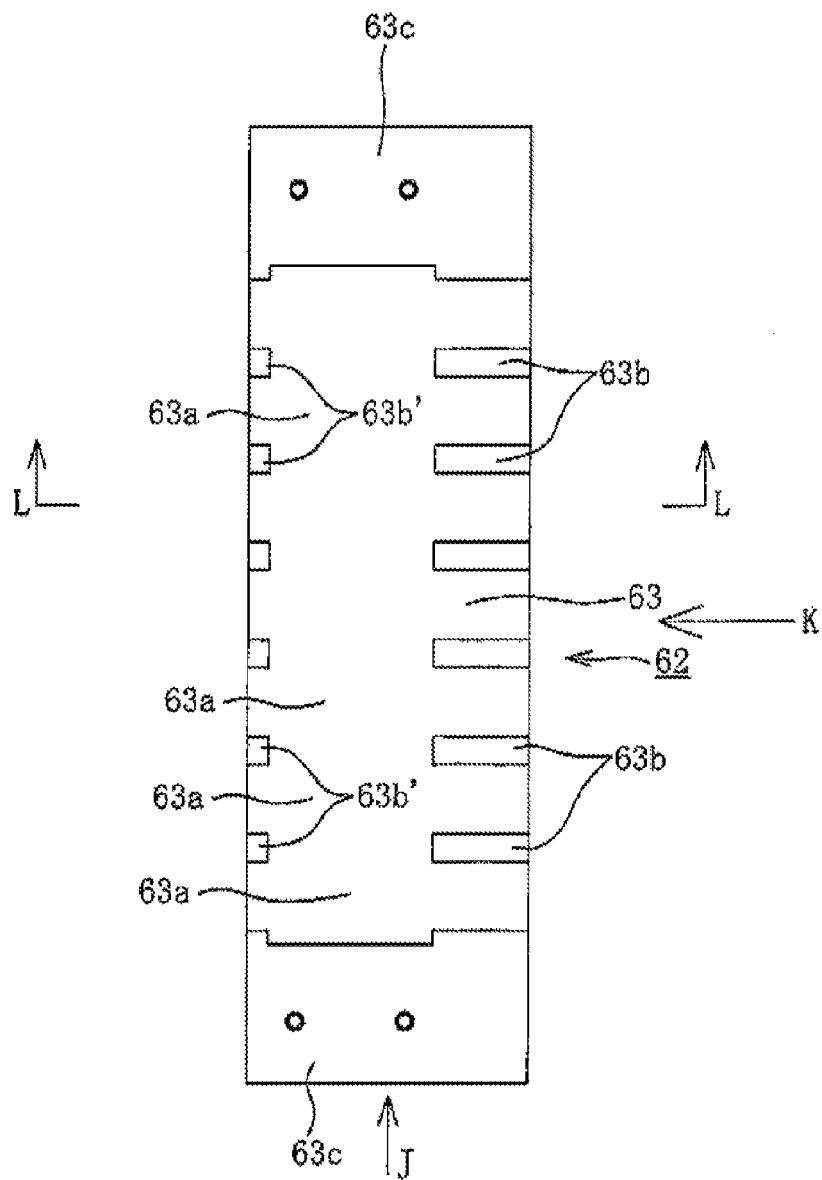
FIG. 21A is a plan view illustrating the holding member fixture shown in FIGS. 19 and 20.
Figure 21B:
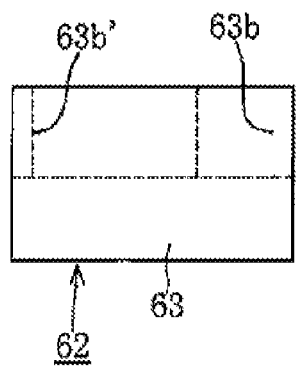
FIG. 21B is a drawing seen from arrow mark J of FIG. 21A.
Figure 22:
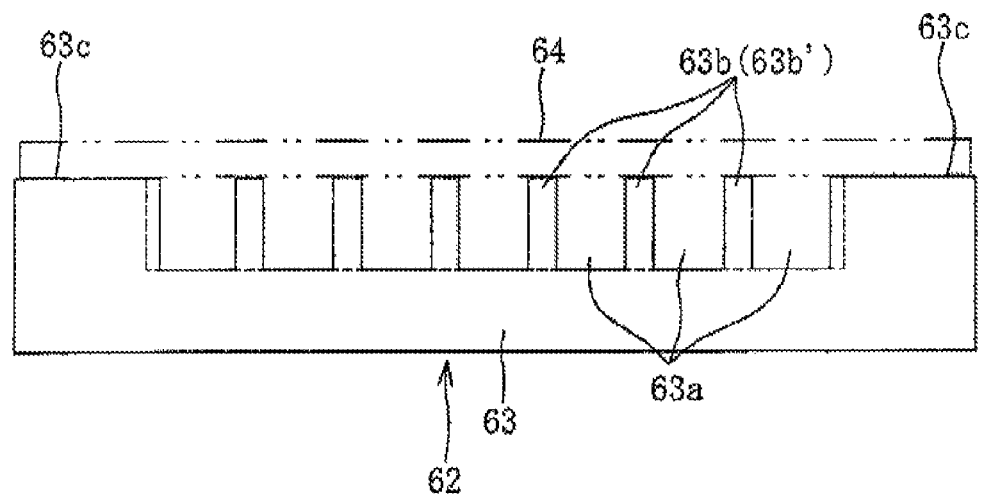
FIG. 22 is a drawing seen from arrow mark K of FIG. 21A.
Figure 23:
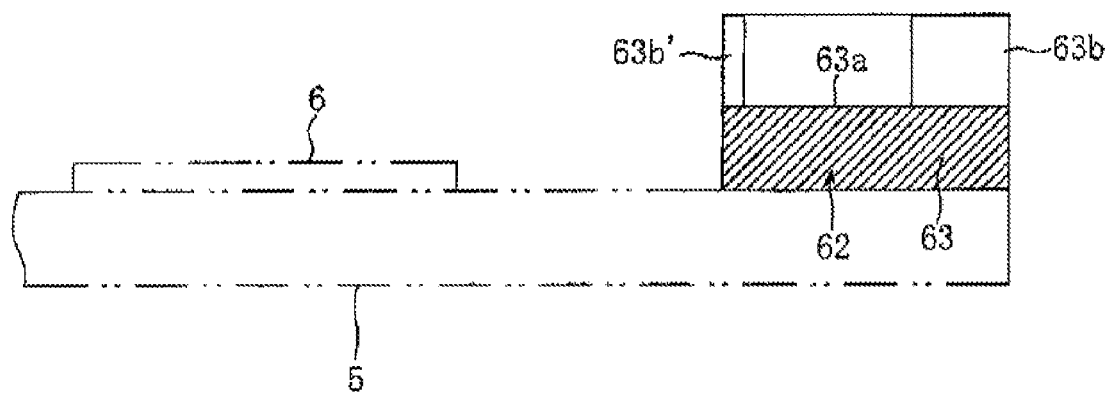
FIG. 23 is a cross section view taken along L-L of FIG. 21A.

As shown in FIGS. 20 and 21A, the holding member mounting portion 63*a* is formed at the base portion 63 of the holding member fixture 62 as a space between four posts 63*b* and 63*b'* having a quadrangular cross section that is erected to be upright so that the holding member mounting portion 63*a* is engaged with both ends, in the longitudinal direction, of the optical fiber ribbon holding member 1B in both sides in the width direction. Two posts 63*b* at the protecting tube side (right side in FIG. 21A) have a long slender quadrangular cross section, and two posts 63*b'* at the base side (left side in FIG. 21A) have a short quadrangular cross section.

Regarding the width direction of the optical fiber ribbon holding member 1B, four posts 63*b* and 63*b'* that surround one optical fiber ribbon holding member 1B pinch and restrain both ends of the wall portions 21 of the holding member main body 22 in the width direction. Regarding the longitudinal direction, four posts 63*b* and 63*b'* pinch and restrain the both ends of wall portions 24 of the lid body 25 in a longitudinal direction, and thus the optical fiber ribbon holding member 1B is restrained and positioned.

At this time, the parallel rectangular tube portion 65*b* at the holding member main body 22 side is pinched between the posts 63*b* having the long slender quadrangular cross section illustrated on right in FIG. 20, so that the protecting boot 65 which are integrated with the holding member main body 22 are held in a stable state. On the other hand, a tapered rectangular tube portion 65*c* has flexibility without being restrained and has a proper function as a protecting boot that protects the optical fiber ribbons 2.

Next, the lid portion 64 of the holding member fixture 62 is tightened by screws to the lid fixture portion 63*c* of the base portion 63, so that the optical fiber ribbon holding member 1B is fixed to the holding member fixture 62.

At this time, the optical connector 3 that is attached to each of the optical fiber ribbons 2 that are held in the optical fiber ribbon holding member 1B can be precisely positioned at the position to be mounted on the substrate 6.

Furthermore, in a case where the position of the optical connector 3 is misaligned from the position to be mounted, the first step latch structure 26 loosely engages to such a degree that the optical fiber ribbons 2 can be adjusted, so that the optical fiber ribbon holding member 1B is separated from the holding member fixture 62 and the position of the laminated optical fiber ribbons 2 may be readjusted in a state in which the second step latch structure 27 is released, the first step latch structure 26 is engaged and the lid body 25 is attached.

As described above, according to the optical fiber ribbon holding member 1B, the holding of the optical fiber ribbons 2 can be performed by a simple operation of covering the lid body 25, so that the operation of laminating and holding the optical fiber ribbons can be easily performed.

The position of the optical fiber ribbons 2 can be readjusted in a state in which the second step latch structure 27 is released, the first step latch structure 26 is engaged and the lid body 25 is attached, so that the optical fiber ribbons are easily readjusted.

Since a heating operation is not required unlike the conventional heat shrinkable tube, the lid body is detachably mounted and the position of the optical fiber ribbons can be readjusted, so that even though the optical fiber ribbons are not positioned with high precision when shipping, the user can easily and precisely adjust the position and then the optical fiber ribbons can be laminated and held.

Since the protecting boot 65 is employed, so when the optical fiber ribbons are routed from the rear side of the optical fiber ribbon holding member 1B after the optical fiber ribbon holding member 1B is fixed to the holding member fixture 62, the optical fiber ribbons 2 can be prevented from generating sharp bending, and the optical fiber can be prevented from being damaged or increasing optic loss.

In this embodiment, the protecting boot 65 is integrally formed with the holding member main body 22 so that the operation for covering the protecting boot is not separately required, and the operation of assembly is good. Some (parallel rectangular tube portion 65b) of the protecting boot 65 is also fixed to the holding member fixture 62 so that the protecting boot effectively performs the protection of the optical fiber.

The optical fiber ribbons pressing portion 28 has a structure such that the bottom portion 23 of the lid body 25 has a plate spring shape. However, the invention is not limited to the structure and another structure, for example, a rubber sheet attached to the inner surface of the bottom portion of the flat lid body may be employed.

Figure 24:
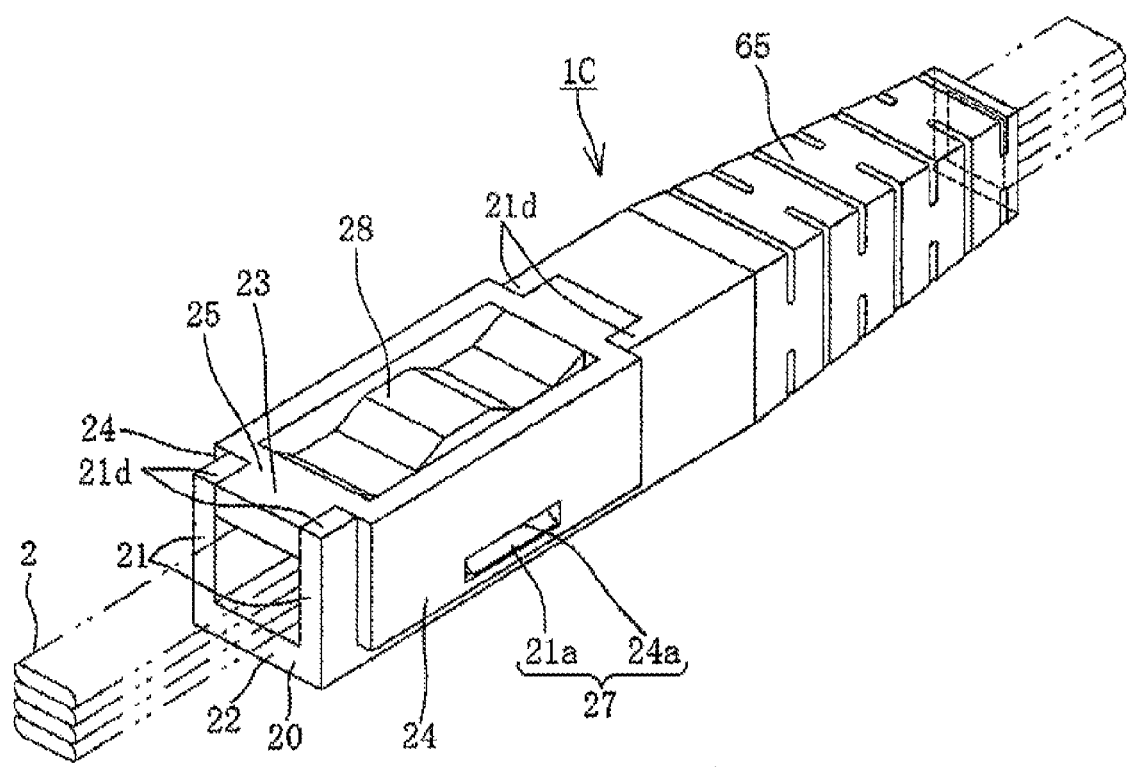
FIG. 24 is a perspective view of the optical fiber ribbon holding member which illustrating another example of a latch structure in the optical fiber ribbon holding member shown in FIG. 13A.

In the above-described embodiment, two steps of latch structures 26 and 27 are arranged. However, as an optical fiber ribbon holding member 1C shown in FIG. 24, only the latch structure 27 that tightly holds the laminated optical fiber ribbons 2 may be arranged.

In other words, the latch structure 27 has the same structure as that of the second latch structure 27 of the optical fiber ribbon holding member 1B of the second embodiment, and includes the engaging clicks 21b that are provided at the both side wall portions 21 of the holding member main body 22, and the engaging recesses 24b that are provided at the both side wall portions 24 of the lid body 25.

The other configurations are the same as the optical fiber ribbon holding member 1B of the second embodiment and similar reference numerals are given, thus description thereof will be omitted.

Figure 25:
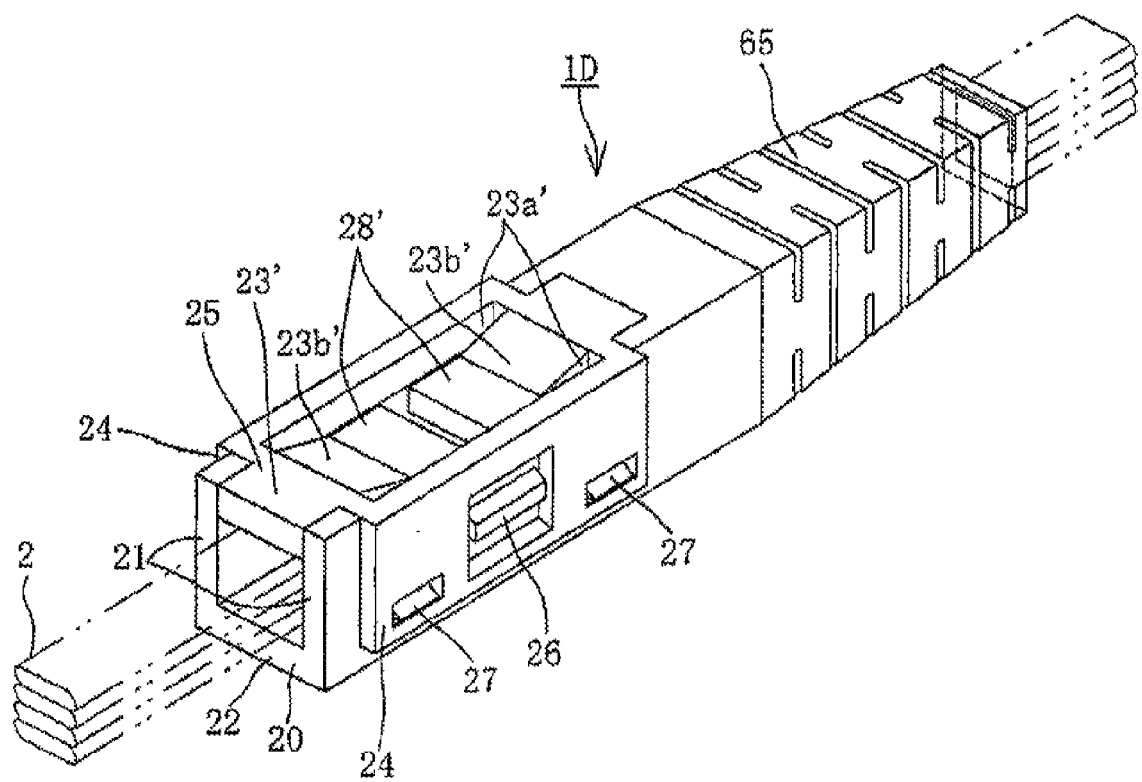
FIG. 25 is a perspective view of the optical fiber ribbon holding member which illustrating other example of a ribbon pressing portion in the optical fiber ribbon holding member shown in FIG. 13A.
Figure 26:
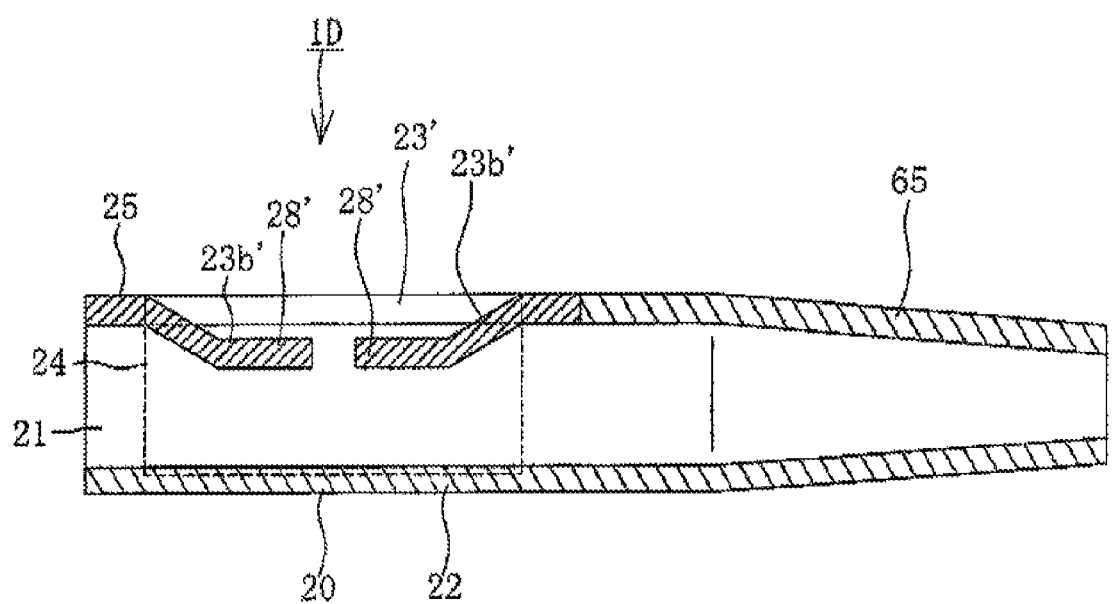
FIG. 26 is a vertical cross section view of the optical fiber ribbon holding member shown in FIG. 25.

An optical fiber ribbon holding member 1D that is a modified example of the optical fiber ribbon holding member shown in FIGS. 13A and 13B is illustrated in FIGS. 25 and 26.

The optical fiber ribbon holding member 1D has the structure of the optical fiber ribbon holding member 1B shown in FIGS. 13A and 13B in which the structure of the optical fiber ribbon pressing portion 28 that is formed at the bottom portion 23 of the lid body 25 is changed.

In other words, in the optical fiber ribbon holding member 1D, the optical fiber ribbon pressing portions 28' that are formed at the bottom portion 23' of the lid body are common with FIGS. 13A and 13B at the points that the slits 23a' are formed at both sides of the bottom portion 23a' of the lid body 25 and the bottom portion 23' is formed as a plate spring shape. However, the center portion in the longitudinal direction of the pinched portion of both sides of the bottom portion 23' which is pinched at the slits 23a' is cut out, and the extension piece 23b' that is extended toward the center portion from both sides of the bottom portion 23' in a longitudinal direction is bent to the lower side and extended in a lateral direction, and then forms a cantilever plate spring.

Other configuration is the same as the optical fiber ribbon holding member 1B of the second embodiment.

Figure 27A:
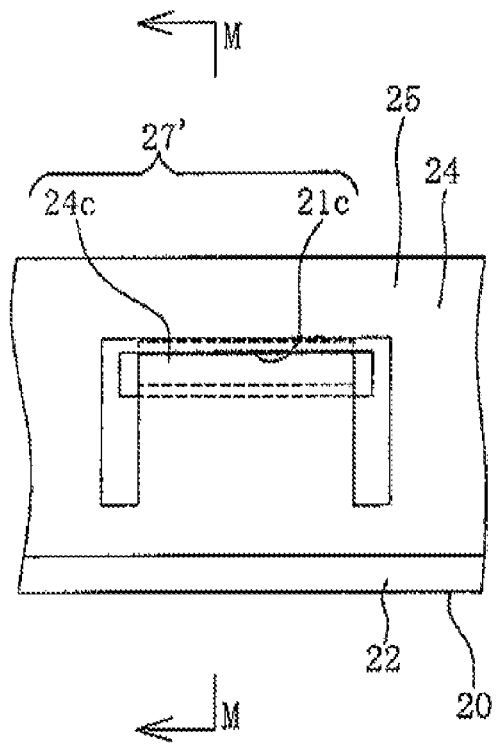
FIG. 27A is an enlarged view illustrating a main portion of the optical fiber ribbon holding member which illustrating another example of the latch structure portion in the optical fiber ribbon holding member shown in FIG. 13A.
Figure 27B:
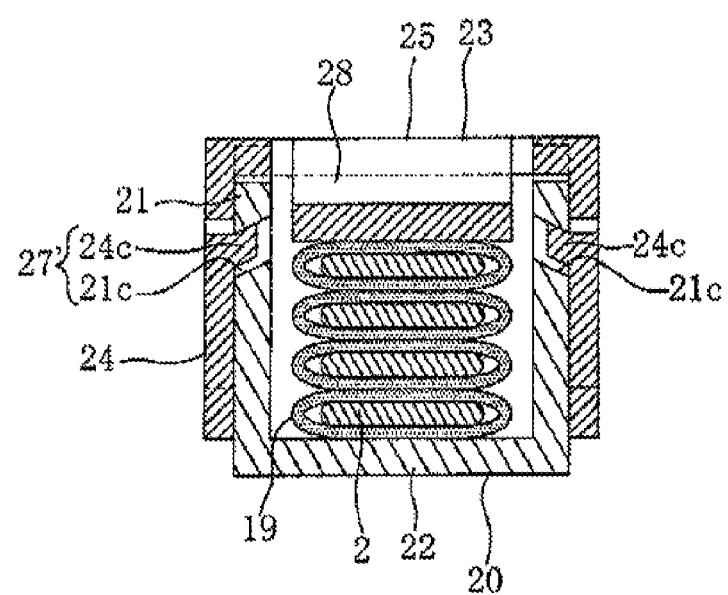
FIG. 27B is a cross section view taken along M-M of FIG. 27A.

In each of the above-described embodiments, the latch structure for tightly holding the lid body 25 to the holding member main body 22 includes the engaging clicks 21b that are provided at the wall portions 21 of the holding member main body 22, and the engaging recesses 24b that are provided at the wall portions 24 of the lid body 25. However as the latch structure 27' as shown in FIGS. 27A and 27B, a latch structure may also be used in which engaging clicks 24c are provided at the both side wall portion 24 of the lid body 25 and engaging recesses 21c are provided at the both side wall portions 21 of the holding member main body 22.

The optical fiber ribbon holding members 1B, 1C and 1D shown in FIGS. 13A, 13B, 24 and 25, have the projecting portion 21d that is projected upward at both end portions in the longitudinal direction of the both side wall portions 21 of the holding member main body 22, so as not to interfere with the bottom portion 23 of the lid body 25. However, the projecting portion 21d may be omitted.

Figure 28A:
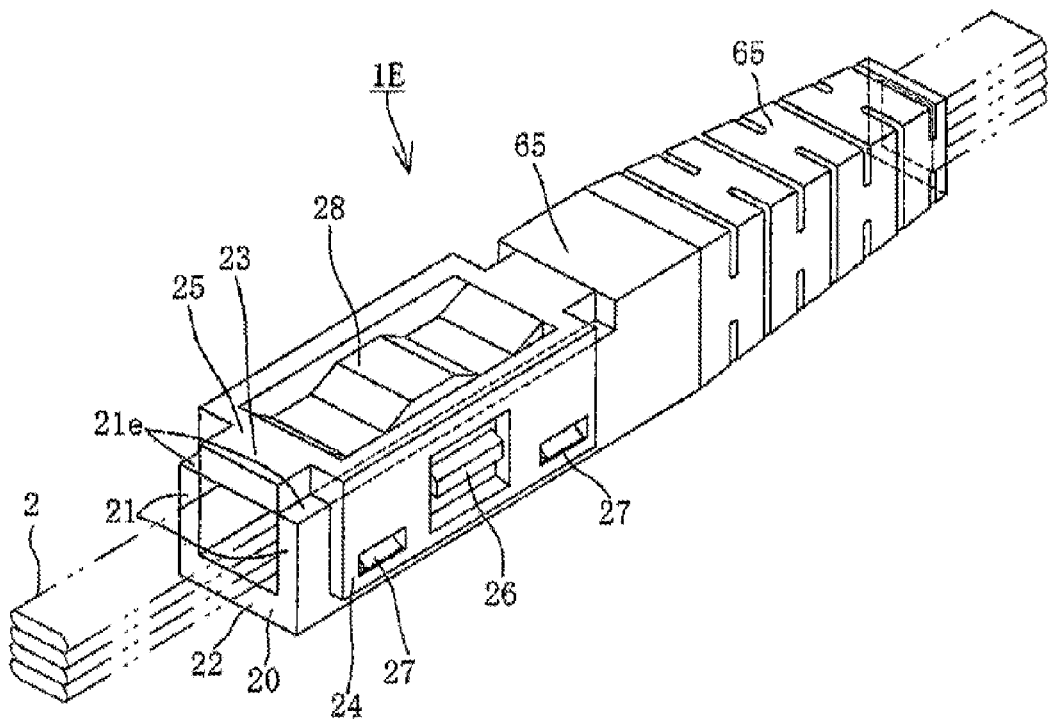
FIG. 28A is a perspective view illustrating the optical fiber ribbon holding member of an example in which a projection is not arranged on the wall portion of the holding member main body in the optical fiber ribbon holding member shown in FIG. 13A.
Figure 28B:
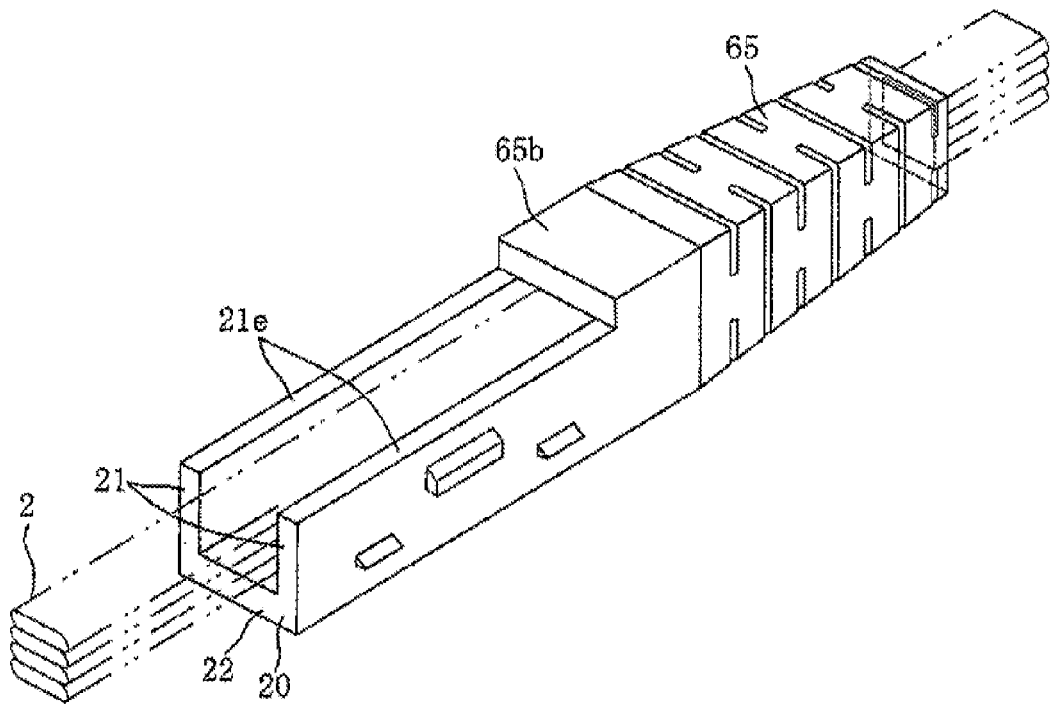
FIG. 28B is a drawing of a state in which the lid body is removed in FIG. 28A.
Figure 29A:
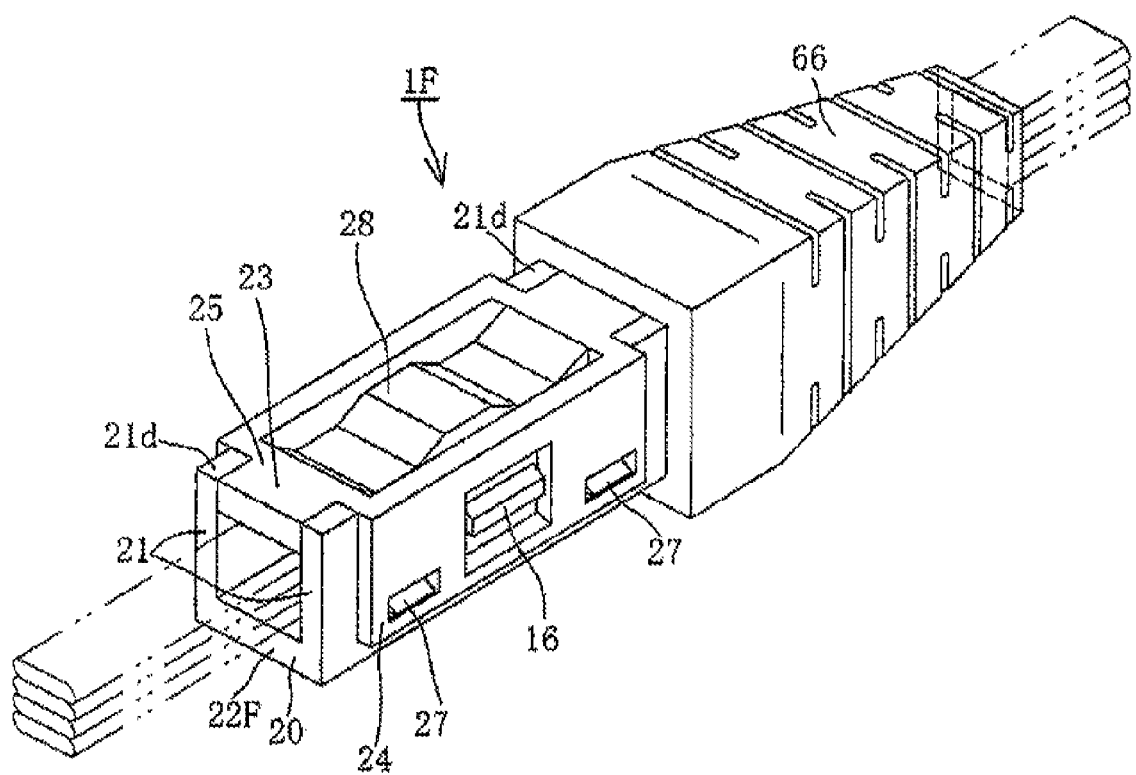
FIG. 29A is a perspective view illustrating the optical fiber ribbon holding member of an example in which a protecting boot is arranged separately from the holding member main body in the optical fiber ribbon holding member shown in FIG. 13A.
Figure 29B:
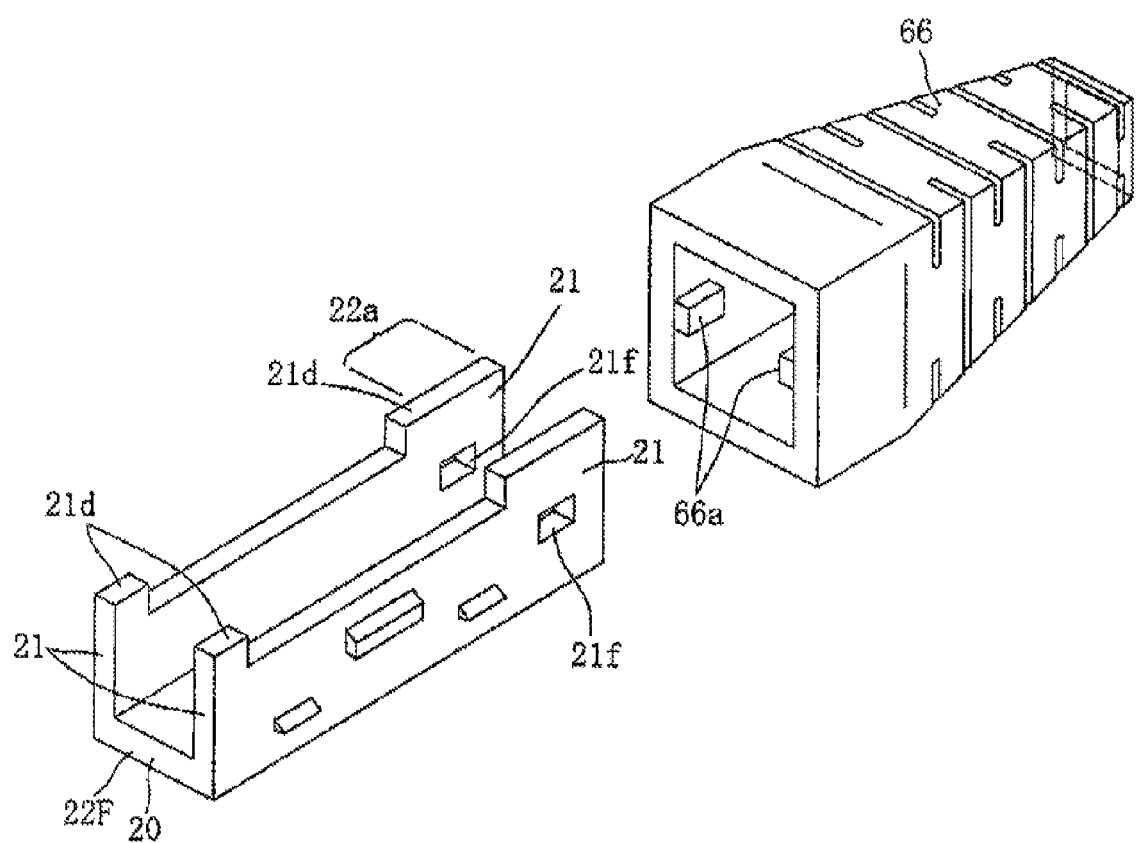
FIG. 29B is a drawing of a state in which the protecting boot is separated from the holding member main body and the lid body is removed in FIG. 29A.
Figure 30A:
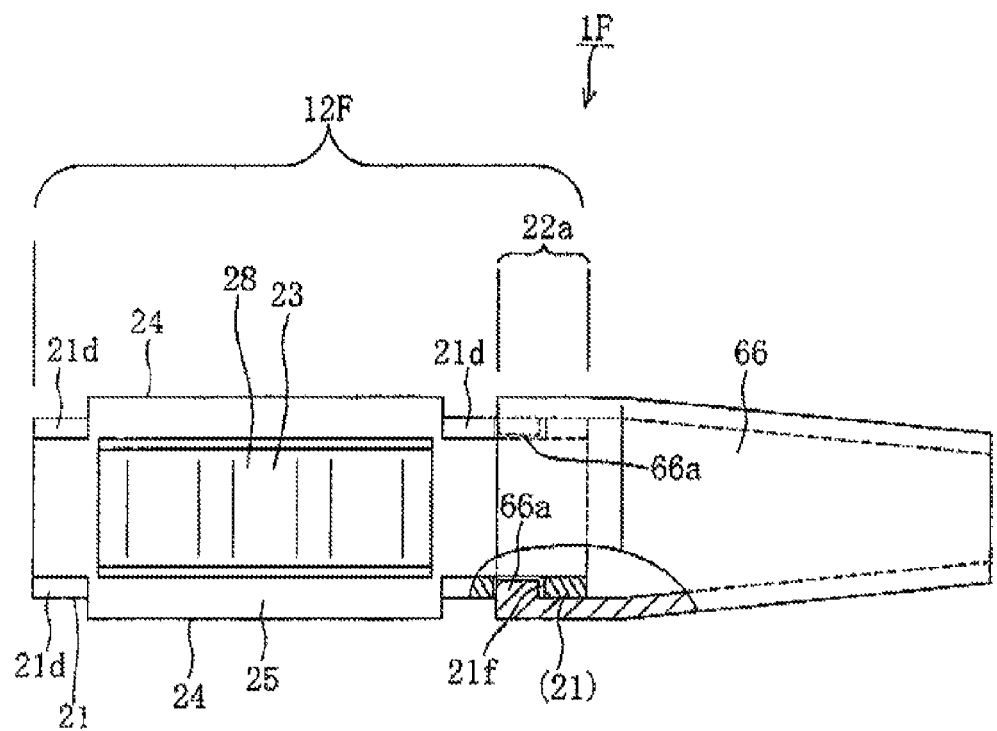
FIG. 30A is a plan view of the optical fiber ribbon holding member shown in FIG. 29A with a portion being notched (cutout).
Figure 30B:
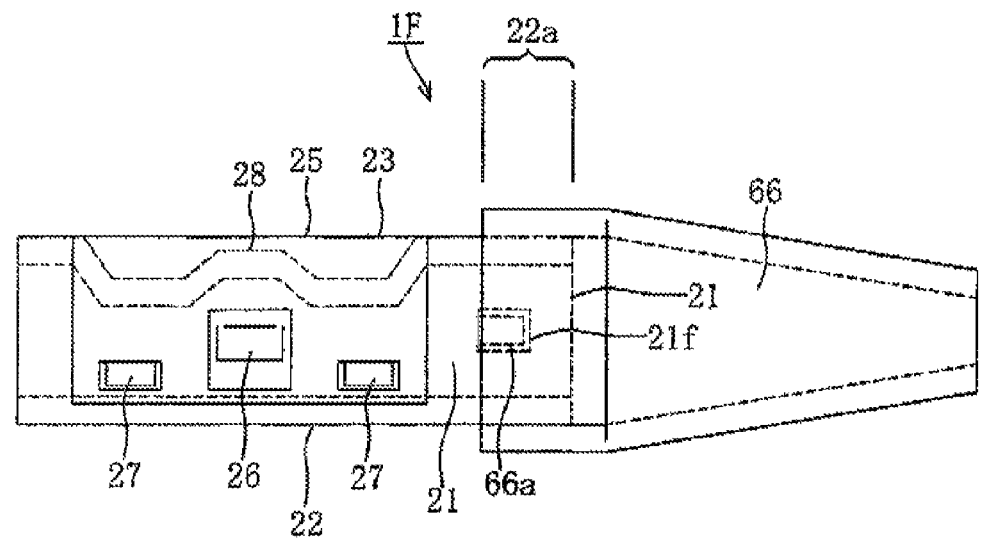
FIG. 30B is a side view of the optical fiber ribbon holding member shown in FIG. 29A.

In other words, as an optical fiber ribbon holding member 1E shown in FIGS. 28A and 28B, upper end surfaces 21e of the wall portions 21 of the holding member main body 22 is flat and may be the same height as that of the surface on which the bottom portion 23 of the lid body 25 is loaded through the overall longitudinal direction.

This configuration may be employed in a case where the uppermost optical fiber ribbon is not laterally varied and not falling out to the outside from the holding member main body 22, while considering the relation between the dimension of the depth of the holding member main body 22 having an upward U shaped cross section, and the number of the optical fiber ribbons 2 being held, or the size of the rubber tube 19 covering the optical fiber ribbon 2 or whether the rubber tubes 19 cover all of the optical fiber ribbons 2 or some of the optical fiber ribbons 2.

In each of embodiments shown in FIGS. 13A to 28B, the protecting boot 65 is integrally resin molded with the holding member main body 22. However, as an optical fiber ribbon holding member 1F shown in FIGS. 29A, 29B, 30A and 30B, a protecting boot 66 may be detachably mounted to the rear end of a holding member main body 22F which is a separate member.

In this embodiment, the rear portion of the holding member main body 22 shown in FIGS. 13A to 15 is extended and the front portion of the protecting boot 66 detachably covers the extended portion 22a. Engaging projections 66a are provided at the inner surface of the side wall of the protecting boot 66 and engaging holes 21f in which the engaging projections 66a are engaged are provided at the wall portions 21 of the extended portion 22a of the holding member main body, so that the protecting boot 66 is detachably mounted to the rear portion of the holding member main body 22F. The holding member main body 22F is the same as the holding member main body 22 shown in FIGS. 13A to 15 except the extended portion 22a. The lid body 25 is the same as the lid body 25 shown in FIGS. 13A to 15.

Regarding the attaching structure in which the protecting boot is detachably mounted to the holding member main body, the illustrated attaching structure is only an example and may be variously changed in design.

The material of the protecting boot 66 may be a material having a lower hardness than that of the lid body 25 or the holding member main body 22F. The material of the holding member main body 22F may be resin or metal.

As the optical fiber ribbon holding member 1F, in a configuration in which the protecting boot 66 is detachably mounted to the holding member main body 22F, the protecting boot can be made in a proper shape or dimensions, or can be made of proper material according to the usage environment, and also can correspond to a case where the protecting boot is not required.

Figure 31A:
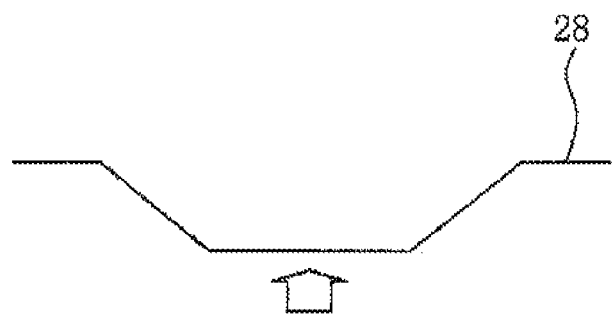
FIG. 31A is a view for describing a difference of the operation effect according to the cross section shape of the ribbon pressing portion regarding the case of FIGS. 13A and 25 that configure the ribbon pressing portion as the bottom portion of the lid body is a plate spring shape.
Figure 31B:
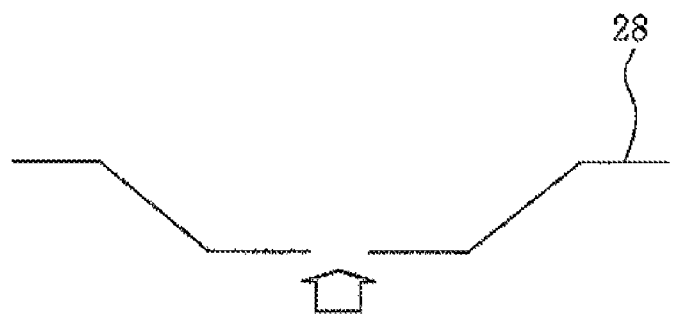
FIG. 31B is a view for describing a difference of the operation effect according to the cross section shape of the ribbon pressing portion regarding the case of FIGS. 13A and 25 that configure the ribbon pressing portion as the bottom portion of the lid body is a plate spring shape.
Figure 31C:
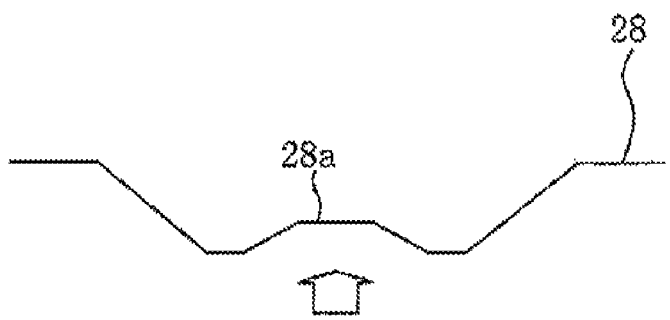
FIG. 31C is a view for describing a difference of the operation effect according to the cross section shape of the ribbon pressing portion regarding the case of FIGS. 13A and 25 that configure the ribbon pressing portion as the bottom portion of the lid body is a plate spring shape.

As the optical fiber ribbon pressing portion 28 that is provided at the lid body 25, when the bottom portion 23 is configured of the plate spring shape, the cross section shape shown in FIG. 31A, the cross section shape (the embodiment of FIG. 25) shown in FIG. 31B, the cross section shape (substantially the embodiment of FIG. 13A) shown in FIG. 31C, and other shapes may be considered as the cross section shape thereof. The cross section shape shown in FIG. 31C may be preferable.

In other words, in a case of FIG. 31A, when the optical fiber ribbon pressing portion 28 is deformed, there is no place to which the force escapes, the deformation is concentrated on the root portion and there is concern that the material will be plastically deformed. The arrow illustrates the force that is applied.

In a case of FIG. 31B, there is the place in which the force escapes and the material is elastically deformed so that the spring function can be maintained; however, so large pressing force may not be obtained.

In a case of FIG. 31C, the portion of the mount 28a in the center portion is elastically deformed and there is a place in which the force escapes so that the spring function can be maintained without plastic deformation. In addition, large pressing force can be further obtained compared to the case of the cross section shape shown in FIG. 31B.

In each of the embodiments of FIGS. 1 to 30B, the case of a plurality of optical fiber ribbons being held has been described. However, the optical fiber ribbon holding member can be also applied to a case in which one optical fiber ribbon is held. In this case, the spacers 17 and 18 are thick, the bottom portion of the holding member main body is raised or the like can be performed.

In a case of the exclusive optical fiber ribbon holding member in which one optical fiber ribbon is held, the bottom portion of the holding member main body may be raised or the overall height thereof may be lowered.

Third Embodiment

Figure 32:
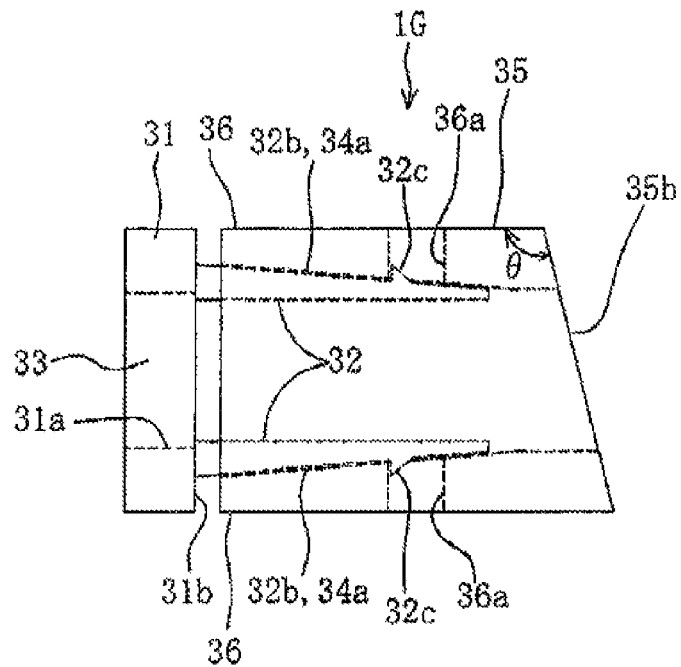
FIG. 32 is a side view of a third embodiment of the optical fiber ribbon holding member of the invention.
Figure 33:
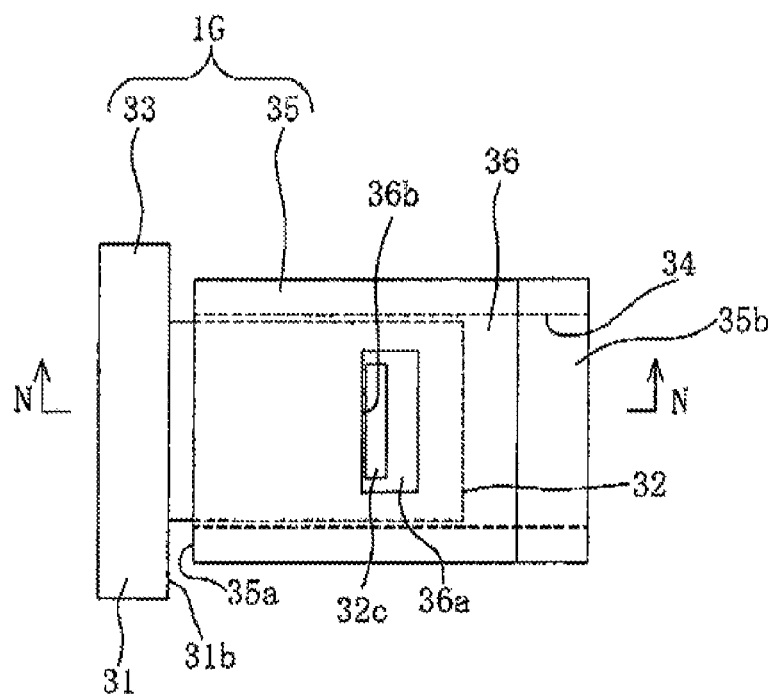
FIG. 33 is a plan view of the optical fiber ribbon holding member shown in FIG. 32.
Figure 34:
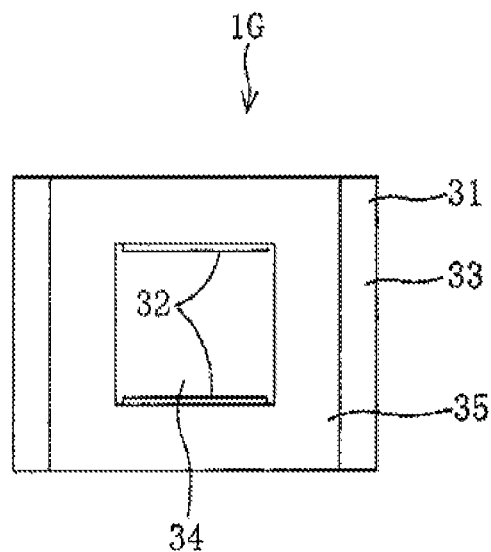
FIG. 34 is a right side view of the optical fiber ribbon holding member shown in FIG. 32.

FIG. 32 is a side view of an optical fiber ribbon holding member 1G of a third embodiment of the invention. FIG. 33 is a plan view of the optical fiber ribbon holding member 1G. FIG. 34 is a right side view of the optical fiber ribbon holding member 1G.

Figure 41:
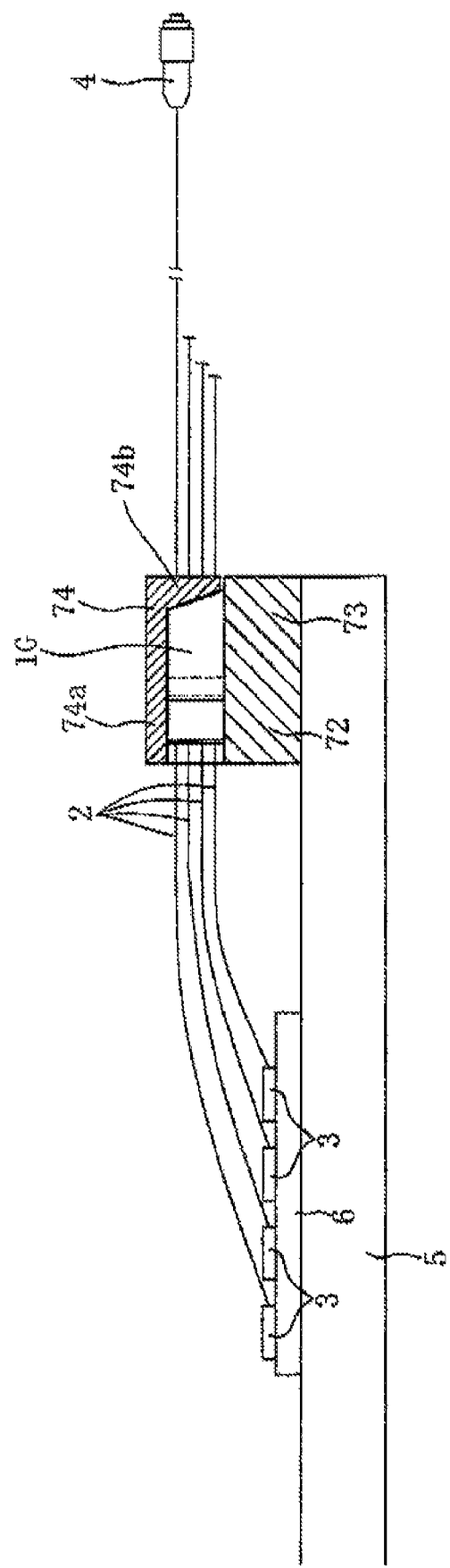
FIG. 41 is a drawing illustrating a state in which the optical fiber ribbon holding member shown in FIG. 32 that holds the laminated optical fiber ribbons is fixed to the holding member fixture for fixing the holding member that is fixed on a device bedplate.

As shown in FIG. 41, an optical path change type optical connector 3, that is mounted on an photoelectric composite substrate 6 at a device bedplate 5 in a computer device or the like, is attached to a tip (first end portion) of each of the optical fiber ribbons (optical fiber tape core wires) 2. The optical fiber ribbon holding member 1G holds four optical fiber ribbons 2 in a laminated state in the illustrated example, and in a state in which the positions of the optical connectors 3 of the tips of the optical fiber ribbons 2 are misaligned with each other in the longitudinal direction of the ribbon, and the optical fiber ribbon holding member 1G is fixed in a holding member fixture 72 for fixing the holding member that is fixed in a peripheral portion of the device bedplate 5.

The optical connector 3 changes the optical path and performs optical coupling between the optical fiber introduced parallel to the substrate 6 and optical element (not shown) mounted on the surface of the substrate.

In this embodiment, a so-called MPO optical connector 4 is attached to the other end (a second end portion) of each of the optical fiber ribbons 2. Reference numeral 73 is a base portion of the holding member fixture 72, and reference numeral 74 is a lid portion. The base portion 73 of the holding part fixture 72 is fixed to the device bedplate 5 with bolts (not shown).

As shown in FIGS. 32 to 34, FIG. 35 and FIG. 36, the optical fiber ribbon holding member 1G includes a slightly thin rectangular parallelepiped shape base portion 31, a first member 33, and a second member 35. The base portion 31 has an optical fiber ribbon passing through hole 31a to which a plurality of optical fiber ribbons 2 are passed through in the laminated state. The first member 33 includes a pair of upper and lower cantilever shape pinch pieces 32 having flexibility. The pinch pieces 32 extend from an upper and lower portions of a surface 31b of the base portion 31, in which the surface 31b is orthogonal to a passing through direction of the optical fiber ribbon (the right and left direction in FIG. 32), and the passing through laminated optical fiber ribbons 2 are pinched front upper side and lower side by the pinch pieces 32. The second member 35 includes a through hole 34 to which the pair of the pinch pieces 32 can be inserted.

Inner surfaces 32a that face to each other in vertically of the upper and lower pinch pieces 32 of the first member 33 are parallel to the passing through direction of the optical fiber ribbons, and outer (the upper side or the lower side) surfaces 32b of the pinch pieces 32 are tapered surfaces 32b in which thickness of the pinch pieces are gradually thinned toward the tip of the pinch pieces 32, and each of the tapered surfaces 32b has a click 32c that projects toward outside respectively.

The upper and lower surfaces 34a of the through hole 34 of the second member 35 is tapered surfaces 34a that can contact to the tapered surfaces 32b of the upper and lower pinch pieces 32 respectively. Engaging recesses 36a to which the clicks 32c of the upper and lower pinch pieces 32 are engaged are formed in upper and lower wall portions 36 of the second member 35. The click 32c of the pinch piece 32 and the engaging recess 36a of the wall portion 36 configure a latch structure. A right end portion of the upper and lower surfaces 34a of the through hole 34 in FIG. 35 is parallel to the inserting direction of the optical fiber ribbons not a tapered surfaces.

Figure 35:
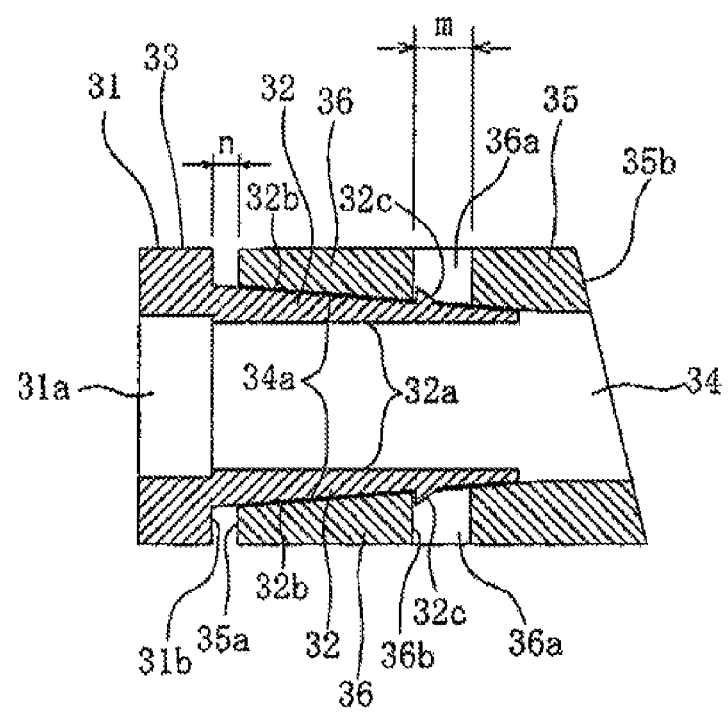
FIG. 35 is a cross section view taken along N-N in FIG. 33.
Figure 36:
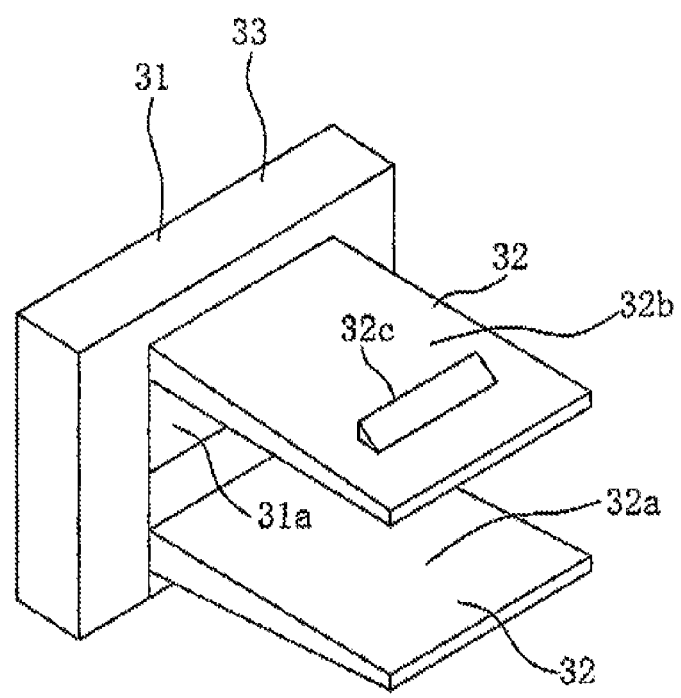
FIG. 36 is a perspective view of the first member in the optical fiber ribbon holding member shown in FIG. 32.

As shown in FIG. 35, the engaging recess 36a of the second member 35 has a length m in which the click 32c can be slightly movable in front and rear side of the extending direction (the right and left direction in FIG. 32 or the like) of the pinch piece. As shown in FIG. 35, when a small gap n is present between the surface 31b of the base portion 31 of the first member 33 and a surface 35a of the second member 35 which are facing to each other, the click 32c is near to a surface 36b of the base portion 31 at the engaging recess 36a side. The length m of the engaging recess 36a has a length such that the click 32c can be movable at least a length of n to the right side from the position shown in FIG. 35.

The engaging recess 36a in the illustrated embodiment is a hole. However, the engaging recess 36a may be a notch (a notch when seen from the upper surface) that is opened to the right end of the upper and lower wall portions 36 in FIG. 32 or the like.

In the second member 35, a surface 35b that is opposite the surface 35a at the base portion 31 side of the first member 33 is a declined surface (downward decline surface) that is inclined to the lower direction (the inclined surface in which an angle θ in the upper and lower direction is an obtuse angle).

Both of the first member 33 and the second member 35 are resin molded products.

The description regarding the operation for holding four laminated optical fiber ribbons 2 with the optical fiber ribbon holding member 1G shown in FIGS. 32 to 36 will be given with respect to FIGS. 37A to 40. In this embodiment, each of the optical fiber ribbons 2 is covered by the rubber tube 19 as described below.

Figure 37A:
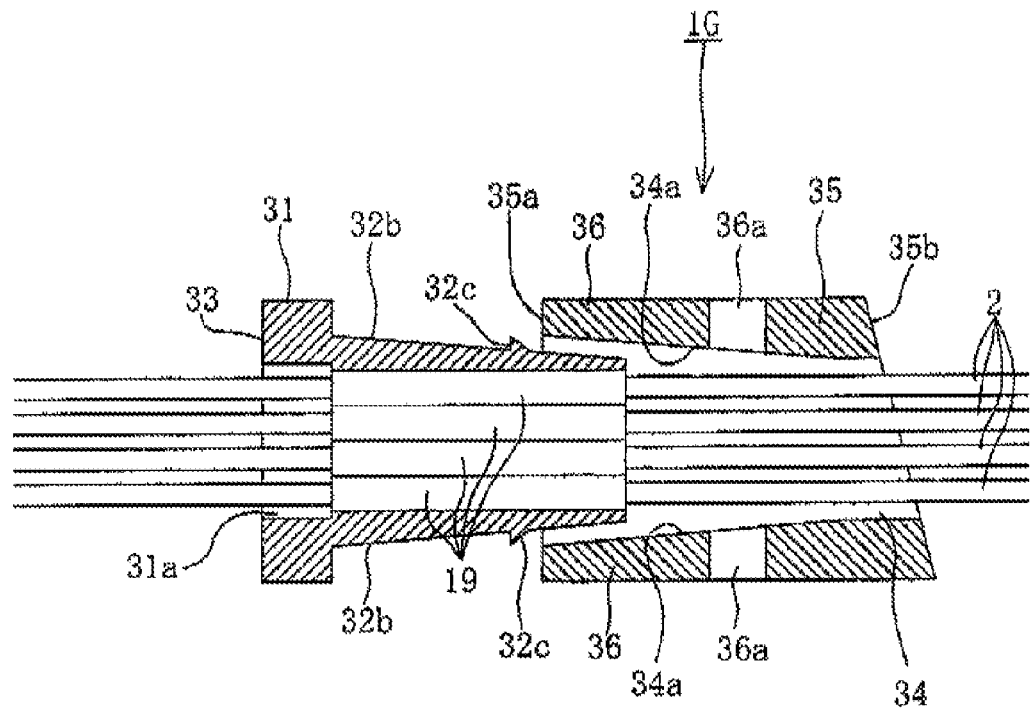
FIG. 37A is a view for describing an operation for holding the laminated optical fiber ribbons by the optical fiber ribbon holding member shown in FIG. 32, and is a view illustrating a state before the first member is inserted in the second member.

As shown in FIG. 37A, the optical fiber ribbons 2 are inserted to the through hole 34 of the second member 35 from the right side in FIG. 37A and inserted into the optical fiber ribbon passing through hole 31a of the first member 33 and through between the upper and lower pinch pieces 32. At this time, the rubber tube 19 substantially covers the correct position of the optical fiber ribbon 2 and the rubber tube 19 is positioned so as to being pinched with the upper and lower pinch pieces 32 of the first member 33. The optical connectors 3 (see FIG. 41) are attached to the tip (first end portion) of the optical fiber ribbons 2 in the left side of FIG. 37A.

Figure 37B:
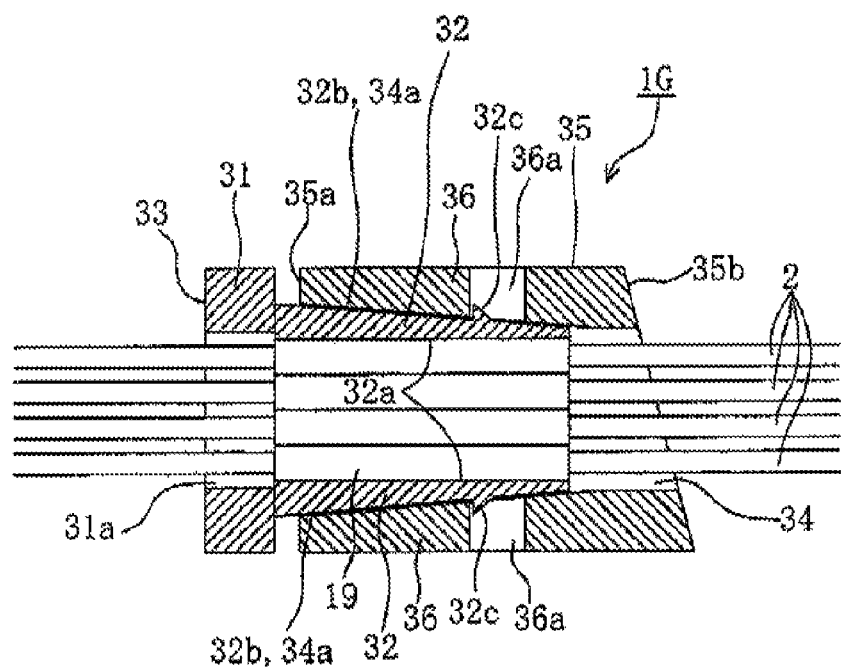
FIG. 37B is a view illustrating a state in which the second member moves from a state of FIG. 37A to the first member side, and the first member and the second member are engaged.
Figure 38:
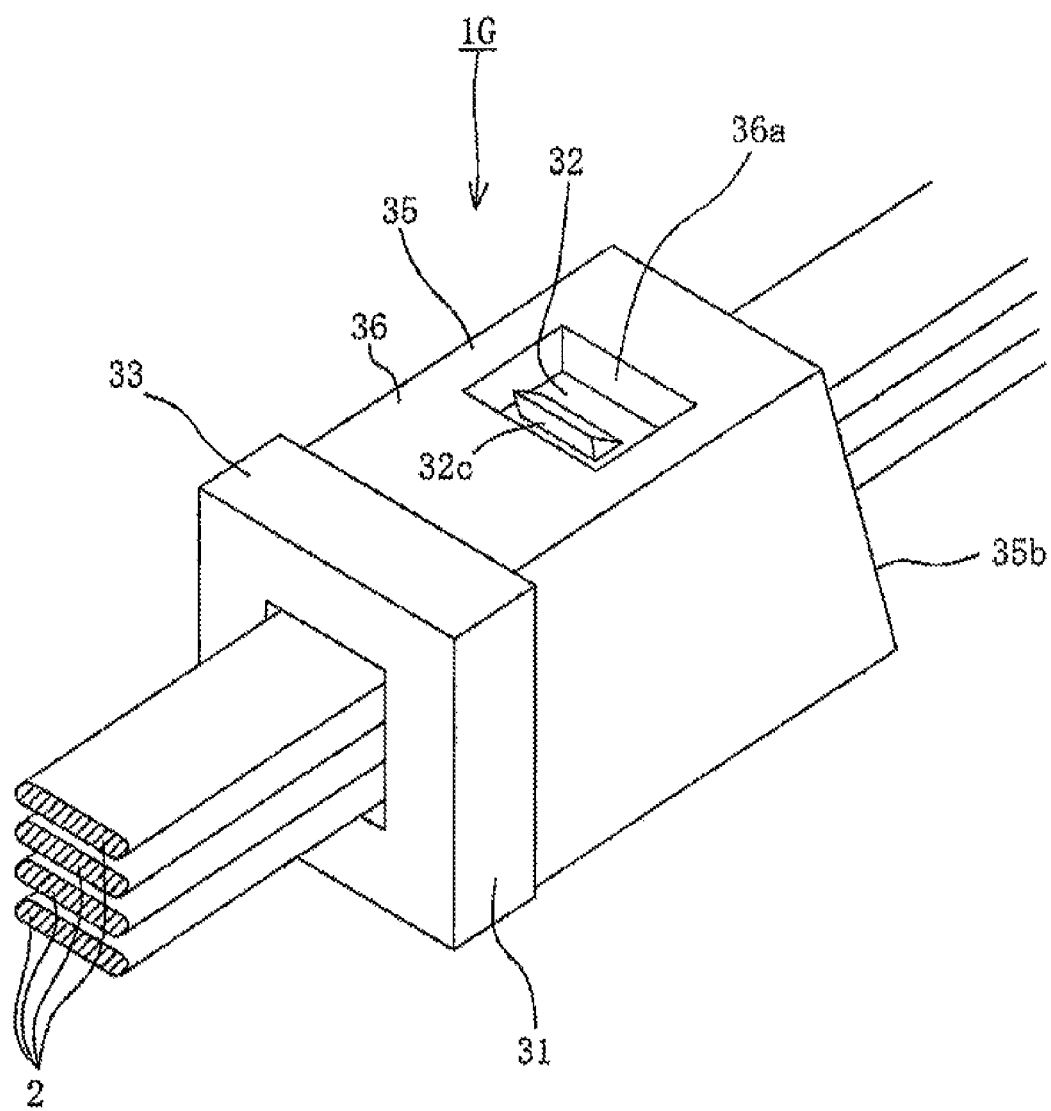
FIG. 38 is a perspective view illustrating the optical fiber ribbon holding member in a state of FIG. 37B.

Next, when the second member 35 is moved (moved to the left side in the drawing) to the base portion 31 side of the first member 33, the upper and tower pinch pieces 32 of the first member 33 are inserted into the through hole 34 as shown in FIG. 37B, and each of the clicks 32c of the upper and lower of the pinch pieces 32 is inserted into the engaging recess 36a of the upper and lower wall portions 36 of the second member 35. As a result, the first member 33 engages with the second member 35 and becomes a state that is not moveable, and the laminated optical fiber ribbons 2 are maintained in a state of being lightly pinched with the upper and lower pinch pieces 32.

In this case, when the second member 35 moves to the base portion 31 side of the first member 33, the upper and lower tapered surfaces 34a of the through hole 34 of the second member 35 move so as to slide on the upper and lower outsides tapered surface 32c of the pinch pieces 32 of the first member 33. Thus, the upper and lower pinch pieces 32 are inwardly bent respectively by a wedge operation force according to the movement of the upper and lower tapered surface 34a of the through hole 34, and the optical fiber ribbons 2 are lightly pinched and held from both of the upper and lower sides.

In this state, the laminated optical fiber ribbons 2 are held so as to not be widely misaligned, and are loosely held in the optical fiber ribbon holding member 1G in a degree that the adjustment of the position of the optical fiber ribbons 2 can be performed.

Figure 40:
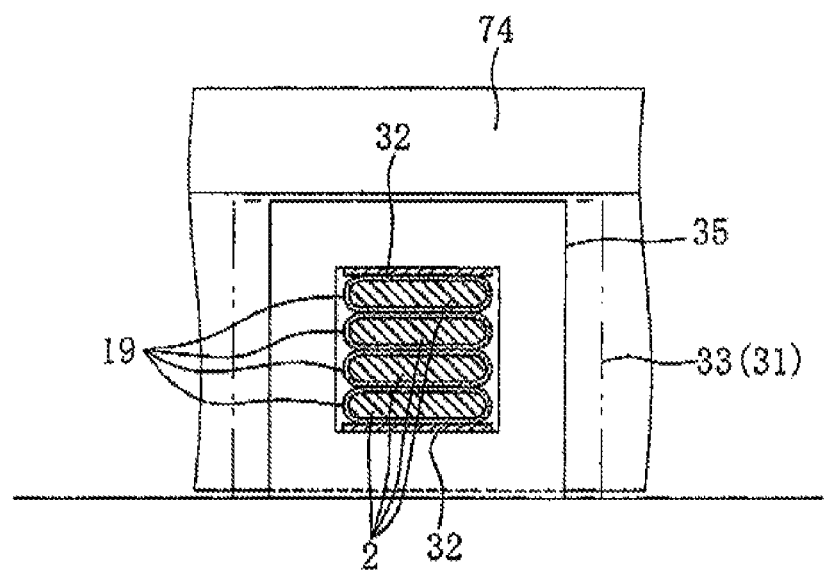
FIG. 40 is a cross section view taken along P-P of FIG. 39B.

In this embodiment, as shown in the cross section view of FIG. 40, the above-described rubber tube 19 covers each of the optical fiber ribbons 2. The rubber tube 19 has an anti-slip function between the optical fiber ribbons 2, and between the lowermost optical fiber ribbon (the optical fiber ribbon that is accommodated nearest to the lower side pinch piece 32) 2 and the inner surface 32a of the lower side pinch piece 32, and between the uppermost optical fiber ribbon (the optical fiber ribbon that is accommodated nearest to the upper side pinch piece 32) 2 and the inner surface 32a of the upper side pinch piece 32.

In the illustrated embodiment, the rubber tubes 19 cover all of the optical fiber ribbons 2. However, when one of the optical fiber ribbons 2 that are vertically adjacent is covered by the rubber tube 19 with respect to the middle optical fiber ribbon 2 except the uppermost and the lowermost optical fiber ribbons, the anti-slip function is effectively operated, so that the rubber tube 19 can be omitted alternately.

Also, the invention is not limited to the rubber tube. Rubber material such as a simple rubber sheet may be inserted between the optical fiber ribbons, or between the lowermost layer or the uppermost layer of the optical fiber ribbon 2 and the inner side surface 32a of the pinch piece 32.

Detailed description of the above-described holding member fixture 72 at which the optical fiber ribbon holding member 1G is fixed will be given with reference to FIGS. 39A, 39B, 41 to 45.

As shown in FIG. 41, the holding member fixture 72 is fixed at the periphery portion of the device bedplate 5.

Figure 39A:
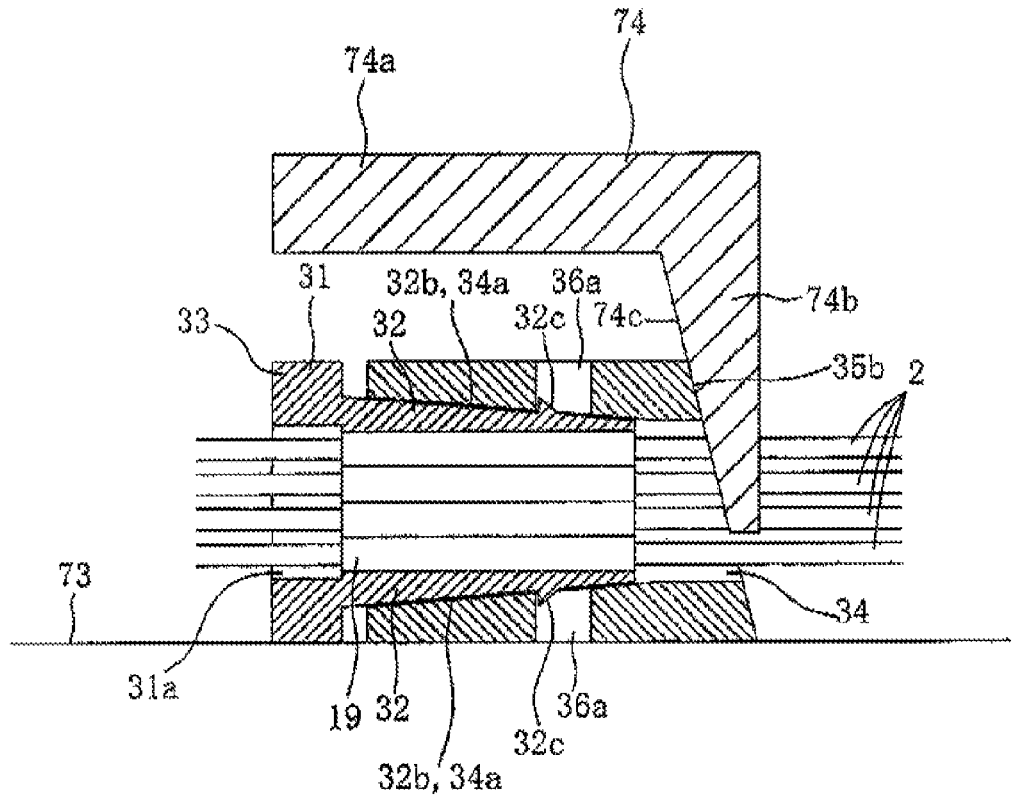
FIG. 39A is a view for describing an operation for fixing the optical fiber ribbon holding member in a state of FIG. 37B by the lid portion of the holding member fixture for fixing the holding member, and is a vertical cross section view illustrating a state before fixing by the lid portion of the holding member fixture.
Figure 39B:
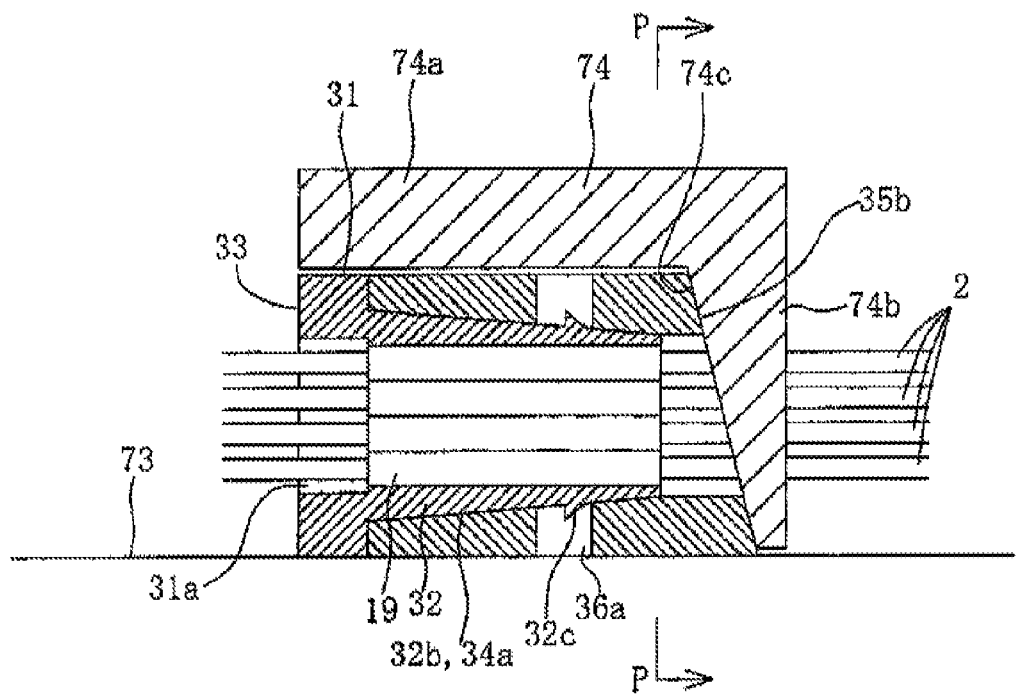
FIG. 39B is a view for describing an operation for fixing the optical fiber ribbon holding member in a state of FIG. 37B by the lid portion of the holding member fixture for fixing the holding member, and is a vertical cross section view illustrating a state after fixing by the lid portion of the holding member fixture.

The holding member fixture 72 includes a base portion 73 and a lid portion 74. The base portion 73 has a holding member mounting portion 73a that positions and arranges the optical fiber ribbon holding member 1G in a state in which the base portion 31 of the first member 33 is restrained. The lid portion 74 is tightened by screws and fixed to the base portion 73 side so as to push down the second member 35 of the optical fiber ribbon holding member 1G. As also shown in FIGS. 39A and 39B, the lid portion 74 includes a lateral portion 74a and a vertical portion 74b, thus forms a substantially L shape. The lateral portion 74a is parallel to the upper surface of the second member 35 and can be tightened by strews and fixed to the lid fixture portion 73c of the base portion 73. The vertical portion 74b has a declined surface 74c that is contactable to the declined surface 35b of the second member 35.

A plurality of the ribs 77 are formed in the base portion 73 with gaps in the width direction of the base portion. The rib 77 has grooves 77a at both surfaces of the base portion in the width direction (the upper and lower direction in FIG. 43A), wherein the grooves 77a are engaged with the base portion 31 of the first member 33 of the optical fiber ribbon holding member 1G. The holding member mounting portion 73a are formed between adjacent ribs 77, and both end portions of the base portion 31 of the first member 33 in the width direction are engaged in the groove 77a so that the optical fiber ribbon holding member 1G is positioned at the base portion 73.

Shipment is performed in a state of FIG. 37B when shipping. In the holding state at this time, the optical fiber ribbons 2 are loosely held to such a degree that the optical fiber ribbons 2 can be adjusted as described above. Accordingly, a user can readjust the position of the whole laminated optical fiber ribbons 2 or an individual laminated optical fiber ribbon 2.

Figure 42:
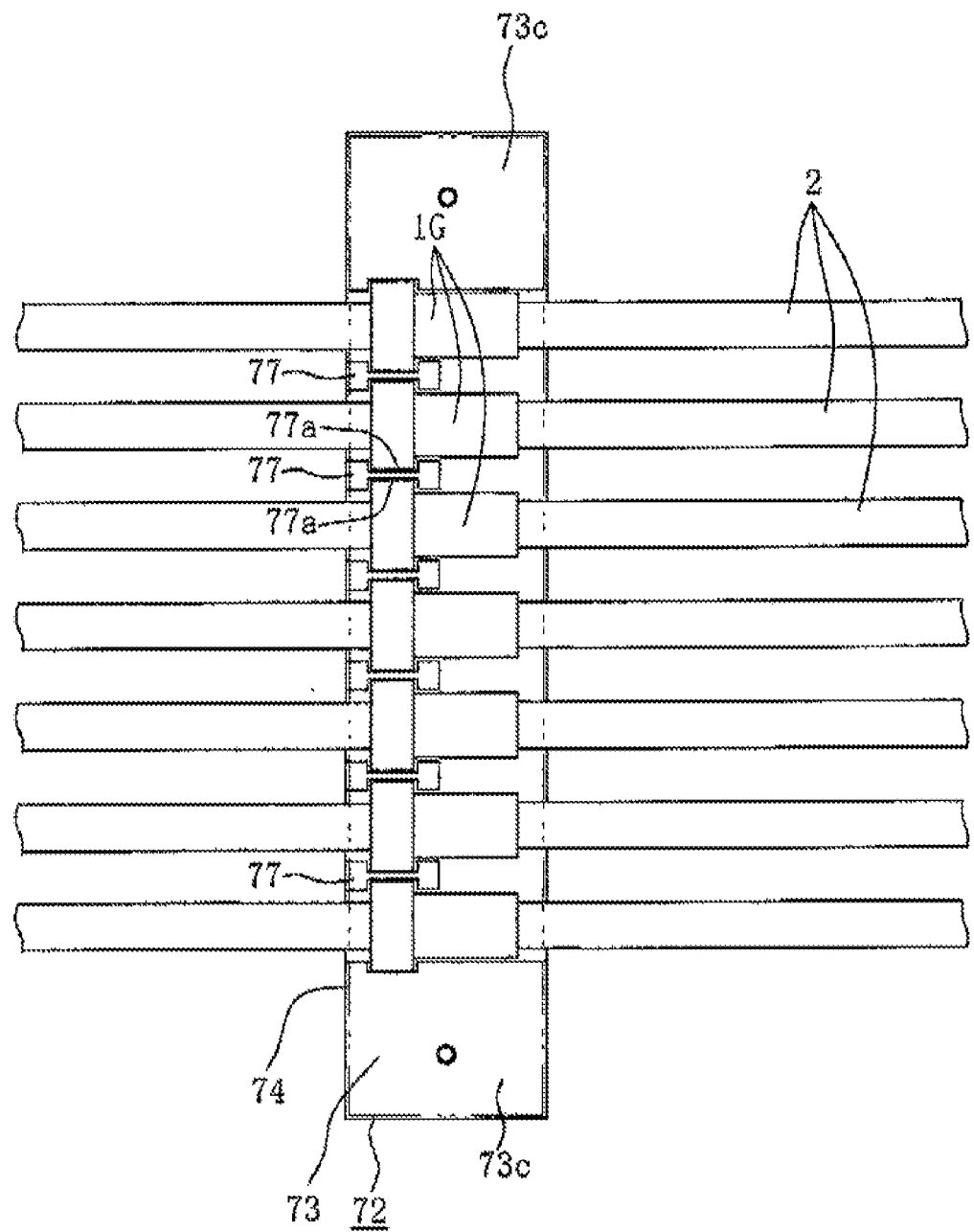
FIG. 42 is an enlarged plan view of a portion of the holding member fixture shown in FIG. 41.
Figure 43A:
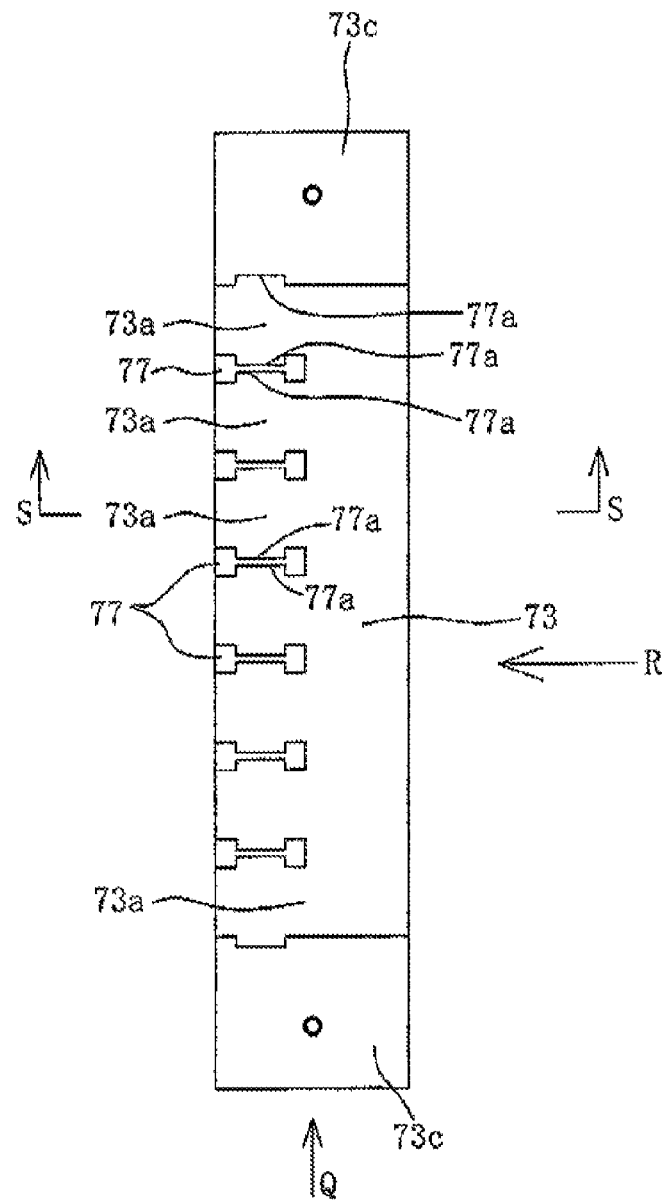
FIG. 43A is a plan view of the holding member fixture shown in FIGS. 41 and 42.
Figure 43B:
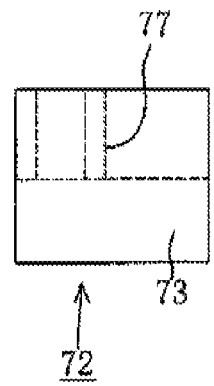
FIG. 43B is a drawing seen from arrow mark Q of FIG. 43A.
Figure 44:
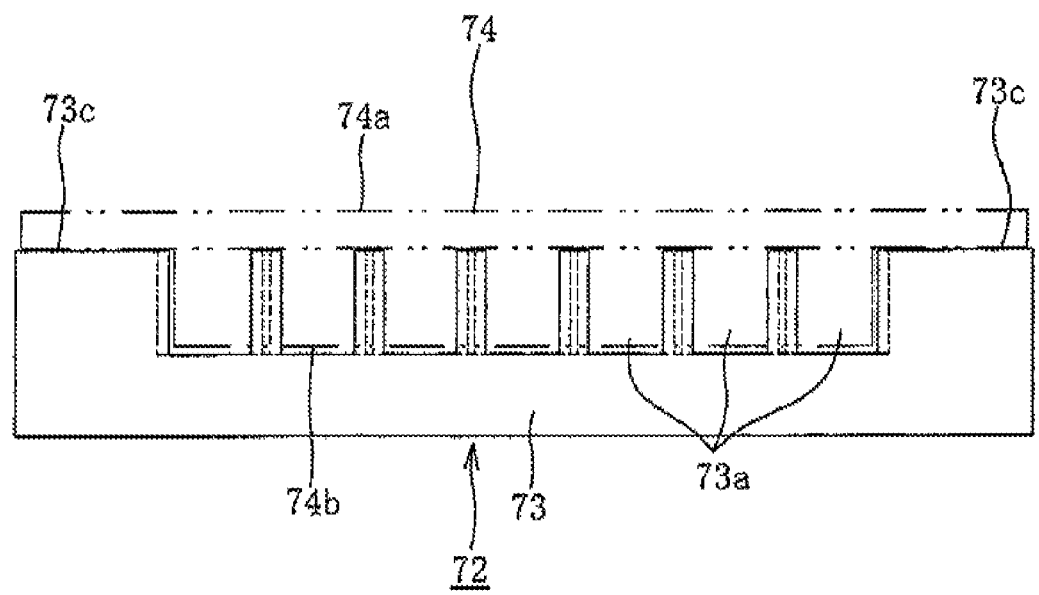
FIG. 44 is a drawing seen from arrow mark R of FIG. 43A.
Figure 45:
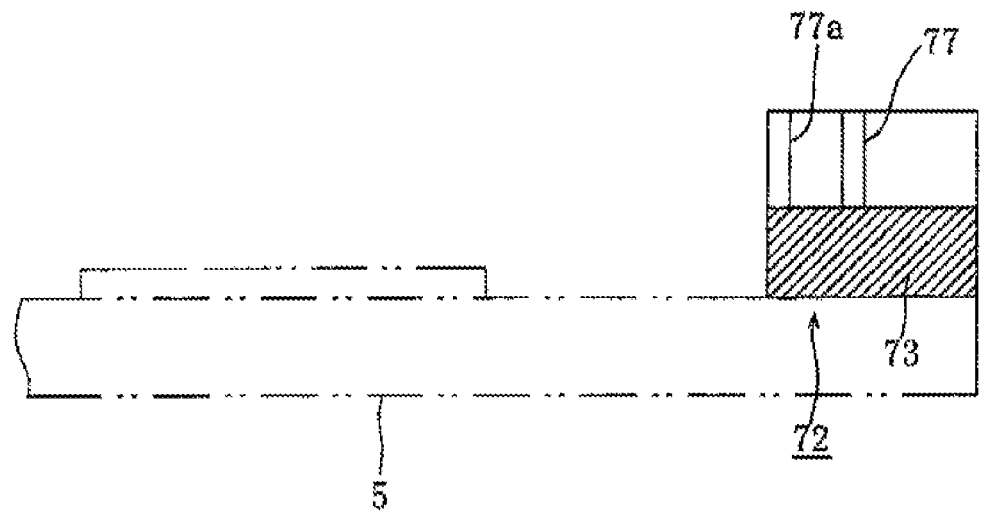
FIG. 45 is a cross section view taken along S-S of FIG. 43A.

When a user fixes the optical fiber ribbon holding member 1G, in which the laminated optical fiber ribbons 2 are held in a completely positioned state, to the holding member fixture 72 that is fixed on the device bedplate 5, each of the optical fiber ribbon holding members 1G is set to the holding member mounting portion 73a that is arranged at the base portion 73 of the holding member fixture 72 as shown in FIGS. 41 and 42. In this case, when both end portions of the base portion 31 of the first member 33 of the optical fiber ribbon holding member 1G in the width direction are engaged with the grooves 77a of the both side ribs 77, the optical fiber ribbon holding member 1G is correctly positioned to the holding member mounting portion 73a on the base portion 73 by the grooves 77a of the ribs 77.

When the optical fiber ribbon holding member 1G is set to the holding member mounting portion 73a, in a case where the position of the optical connector 3 is misaligned from the position to be mounted, if the optical fiber ribbon holding member 1G is removed from the holding member fixture 72, as described above, the holding state is loosely maintained by the pinch piece 32, so that the position of the optical fiber ribbons 2 can be readjusted.

Next, the lid portion. 74 of the holding member fixture 72 is tightened by screws to the lid fixture portion 73c of the base portion 73, so that the optical fiber ribbon holding member 1G is fixed to the holding member fixture 72.

At this time, the laminated optical fiber ribbons 2 that are lightly held with the optical fiber ribbon holding member 1G are tightly held as described below.

In other words, when the lid portion 74 of the holding member fixture 72 is tightened by screws and fixed to the lid fixture portion 73c of the base portion 73, the lid portion 74 descends while the declined surface 74c of the vertical portion 74b slides down along the declined surface 35b of the second member 35 of the optical fiber ribbon holding member 1G. Accordingly, the second member 35 moves toward the base portion 31 side of the first member 33 with the wedge operation force due to the descending of the declined surface 74c of the lid portion 74.

When the second member 35 moves to the base portion 31 side of the first member 33, the upper and lower tapered surfaces 34a of the through hole 34 of the second member 35 move and slide along the upper and lower outside tapered surfaces 32b of the upper and lower pinch pieces 32 of the first member 33. Accordingly, the upper and lower pinch pieces 32 are bent inwardly respectively with the wedge operation force due to the movement of the upper and lower tapered surfaces 34a of the through hole 34, and the pinched optical fiber ribbons 2 are tightened from both the upper and lower sides, so that the optical fiber ribbons 2 are tightly fixed.

The operation for tightening and fixing the lid portion 74 to the base portion 73 side has no relationship to the position of the pinch piece 32 of the first member 33, so that the position of the optical fiber ribbons 2 are not misaligned by the operation.

Figure 46:
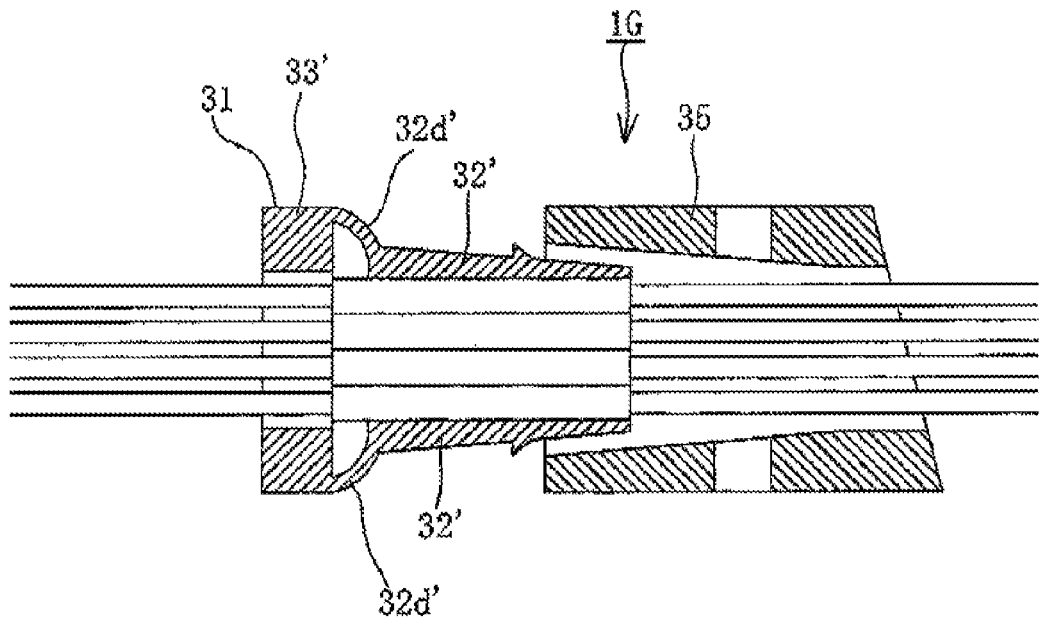
FIG. 46 is a cross section view (corresponding to FIG. 37A) of the optical fiber ribbon holding member which illustrating an example in which a root portion of holding pieces of the first member in the optical fiber ribbon holding member shown in FIG. 32 is formed as a curved thin-wall shape.

In the embodiment shown in FIGS. 32 to 45, the root portion of the pinch piece 32 in the first member 33 of the optical fiber ribbon holding member 1G is contacted to surface 31b of the base portion 31 with the thickness thereof being unchanged. However, as a first member 33' shown in FIG. 46, the root portion of pinch pieces 32' may be curved in a thin-walled shape in the first member 33' of the optical fiber ribbon holding member 1G. The pinch piece 32' can be softly flexibly deformed by the curved thin-walled portion 32d' and the operation for holding the laminated optical fiber ribbons 2 is performed smoothly.

Other portions are the same as the above-described embodiment.

The optical fiber ribbon holding member 1G of the embodiment shown in FIGS. 32 to 46 is configured such that the second member 35 has the declined surface 35b and the tapered surface is pressed by the declined surface 74c of the L shape lid portion 74 of the holding member fixture 72 and then moves to the base portion 31 side of the first member 33. However, a structure may be employed in which the second member 35 does not have the declined surface 35b as an optical fiber ribbon holding member 1H shown in FIG. 47.

Figure 47:
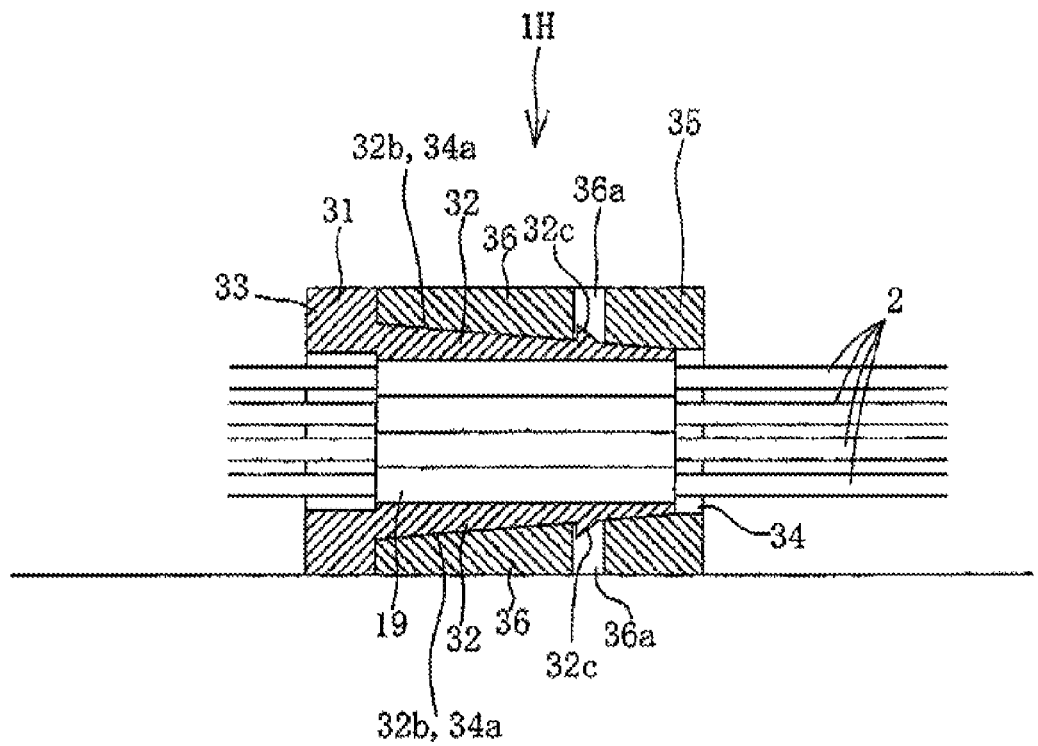
FIG. 47 is a cross section view (corresponding to FIG. 37B) of the optical fiber ribbon holding member which illustrating another embodiment of a latch structure in the optical fiber ribbon holding member shown in FIG. 32.

In this ease, as shown in FIG. 47, a dimensional relation may be employed in which the upper and lower pinch pieces 32 tightly hold the laminated optical fiber ribbons 2, when the pinch piece 32 of the first member 33 is inserted into the through hole 34 of the second member 35, and the click 32c is engaged with the engaging recess 36a.

In this case, the lid portion 74 of the holding member fixture 72 may be simply a planar shape.

In this ease, when the readjustment of the position of the optical fiber ribbons in the longitudinal direction is required, the engagement between the click 32c of the pinch piece 32 of the first member 33 and the engaging recess 36a of the second member 35 is released, the second member 35 is removed from the first member 33, and the readjustment of the position of the optical fiber ribbons is performed.

In each of embodiments shown in FIGS. 32 to 47, both upper and lower pinch pieces 32 of the first member 33 have flexibility. However, only one of the pinch pieces may have flexibility. In this case, the surface of the pinch piece having flexibility at the side for pinching the optical fiber ribbons is parallel to the passing through direction of the optical fiber ribbons, and the surface opposite to the pinch side is a tapered surface so that the thickness of the pinch piece becomes thinner toward the tip of the pinch piece. In addition, both surfaces of the pinch piece that does not have flexibility are parallel to the passing through direction of the optical fiber ribbons. The surface of the second member facing the pinch piece that does not have flexibility is a parallel surface.

The case of a plurality of optical fiber ribbons being held is described in each of embodiments shown in FIGS. 32 to 47. However, the optical fiber ribbon holding member of the invention may be applied even in a case of one optical fiber ribbon being held. In the case of the exclusive optical fiber ribbon holding member that holds one optical fiber ribbon, the gap between the upper and lower pinch pieces 32 may be properly narrowed. Also, in the case where the optical fiber ribbon holding members 1G and 1H having the same size as that of the embodiments are used, spacers may be inserted at the upper and lower sides of the optical fiber ribbons.

Fourth Embodiment

Figure 48:
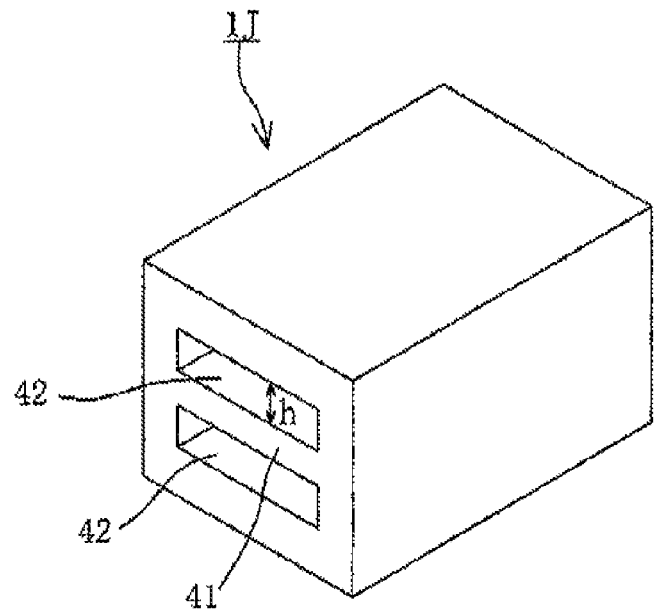
FIG. 48 is a perspective view illustrating the optical fiber ribbon holding member of a fourth embodiment of the invention.

FIG. 48 is a perspective view illustrating an optical fiber ribbon holding member 1J of the fourth embodiment of the invention.

Figure 51:
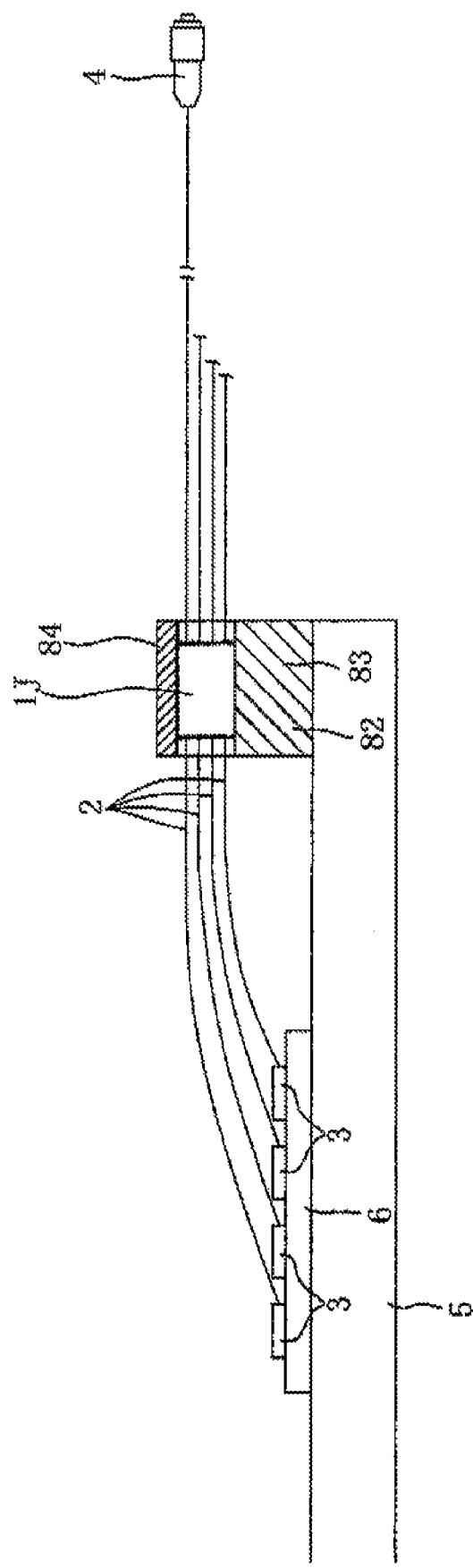
FIG. 51 is a drawing illustrating a state in which the optical fiber ribbon holding member shown in FIG. 48 that holds the optical fiber ribbons is fixed to the holding member fixture for fixing the holding member that is fixed on the device bedplate.

As shown in FIG. 51, the optical path change type optical connector 3, that is mounted on the photoelectric composite substrate 6 on the device bedplate 5 in a computer device or the like, is attached to a tip (first end portion) of the optical fiber ribbons (optical fiber tape core wires) 2. The optical fiber ribbon holding member 1J holds a plurality of optical fiber ribbons 2 in a state in which the positions of the optical connectors 3 of the tips of the optical fiber ribbons 2 are misaligned with each other in the longitudinal direction of the ribbon, and the optical fiber ribbon holding member 1J is fixed in a holding member fixture N for fixing the holding member that is fixed in a peripheral portion of the device bedplate 5.

The optical connector 3 changes the optical path and performs optical coupling by a reflecting surface that is mounted in the inside of the connector and inclined 45 degrees, between the optical fiber that is introduced parallel to the substrate 6 and optical element (not shown) that is mounted on the surface of the substrate 6 in which the optic axis thereof is orthogonal to the substrate surface.

In this embodiment, a so-called MPO optical connector 4 is attached to the other end (a second end portion) of each of the optical fiber ribbons 2. Reference numeral 83 is a base portion of a holding member fixture 82, and reference numeral 84 is a lid portion. The base portion 83 of the holding part fixture 82 is fixed to the device bedplate 5 with bolts (not shown).

The overall outline of the optical fiber ribbon holding member 1J is a rectangular parallelepiped shape and the optical fiber ribbon holding member 1J is a rubber integral molded product having a cross section with two upper and lower laterally long rectangular holes 42 in which a partition plate portion 41 is inserted therebetween. Each of the upper and lower laterally long rectangular holes 42 becomes the optical fiber ribbon passing through portions. The optical fiber ribbons passing through portions (laterally long rectangular holes) 42 divides a plurality of optical fiber ribbons in two groups. Each of the optical fiber ribbons passing through portions 42 has height dimension h in which the optical fiber ribbons of each of the groups are fitted in a fitting state for generating a light friction force.

As the rubber material, for example, silicon rubber may be used. The other various types of rubber materials also can be used.

Figure 49:
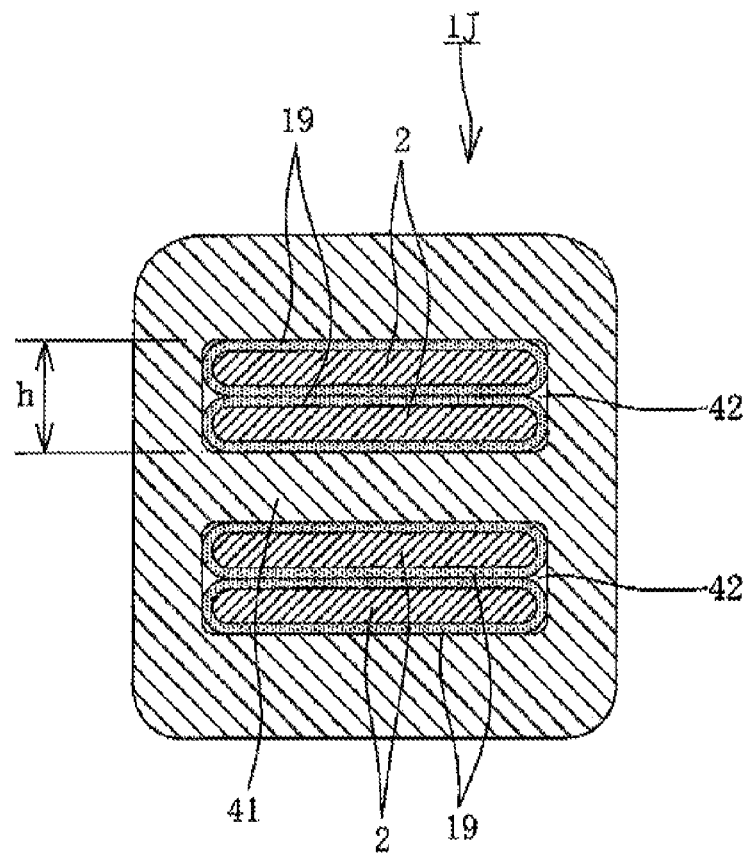
FIG. 49 is a cross section view illustrating a state in which the optical fiber ribbon holding member shown in FIG. 48 holds the optical fiber ribbons.
Figure 50:
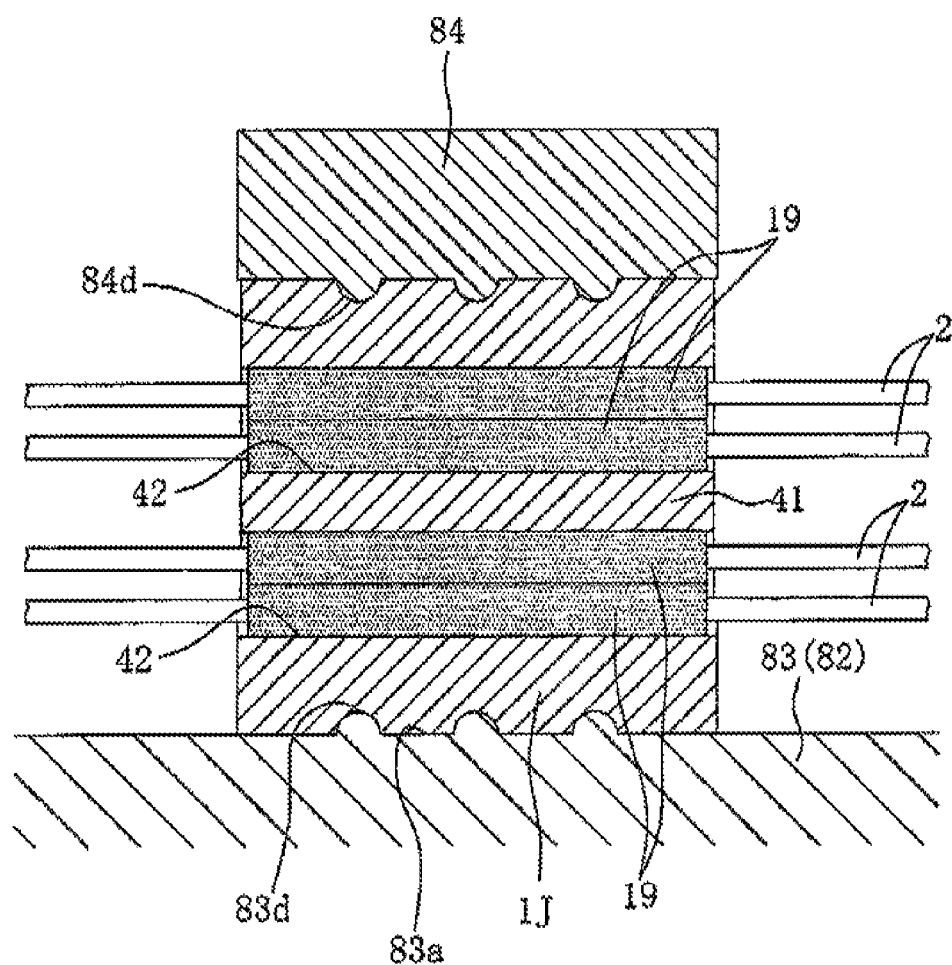
FIG. 50 is a vertical cross section view illustrating a state in which the optical fiber ribbon holding member shown in FIG. 48 that holds the optical fiber ribbons is positioned on the base portion of the holding member fixture for fixing the holding member, and pressed by the lid portion.

In this embodiment, as shown in FIGS. 49 and 50, four optical fiber ribbons 2 are held and these four optical fiber ribbons 2 are divided in half, in other words, divided in two groups in which one group has two. Each two optical fiber ribbons 2 are overlapped and pass through the optical fiber ribbons passing through portions (laterally long rectangular holes) 42.

In the embodiment, the rubber tube 19 covers each of the optical fiber ribbons 2. The rubber tube 19 has an anti-slip function between the optical fiber ribbons 2. The rubber tube 19 covers each of the optical fiber ribbons 2, so that the height h of the optical fiber ribbons passing through portions (laterally long rectangular holes) 42 is a height dimension h in which the two optical fiber ribbons 2 covered by the rubber tube 19 are fitted in a fitting state for generating a light friction force. In other words, the height h of the optical fiber ribbons passing through portions 42 is a height dimension which can loosely hold the laminated optical fiber ribbons 2 in a degree that they are not widely misaligned.

Also the invention is not limited to the rubber tube, and rubber material such as a simple rubber sheet may also be inserted between the optical fiber ribbons.

In a case where the rubber tube 19 is not covered or a simple rubber sheet is inserted between the optical fiber ribbons 2, the height h of the optical fiber ribbons passing through portions (laterally long rectangular holes) 42 has a height dimension (a height dimension for fitting in a state for generating a light friction force) according to the case.

Figure 53A:
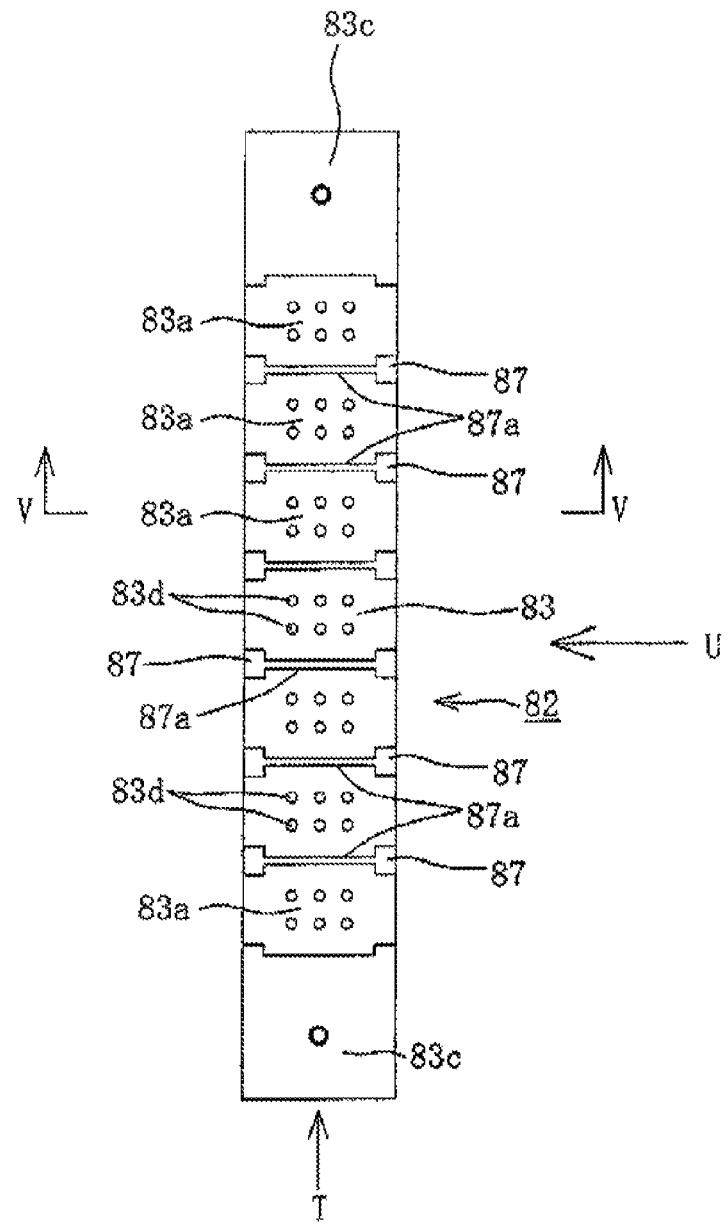
FIG. 53A is a plan view illustrating the holding member fixture shown in FIGS. 51 and 52.
Figure 53B:
FIG. 53B is a drawing seen from arrow mark T of FIG. 53A.
Figure 54:
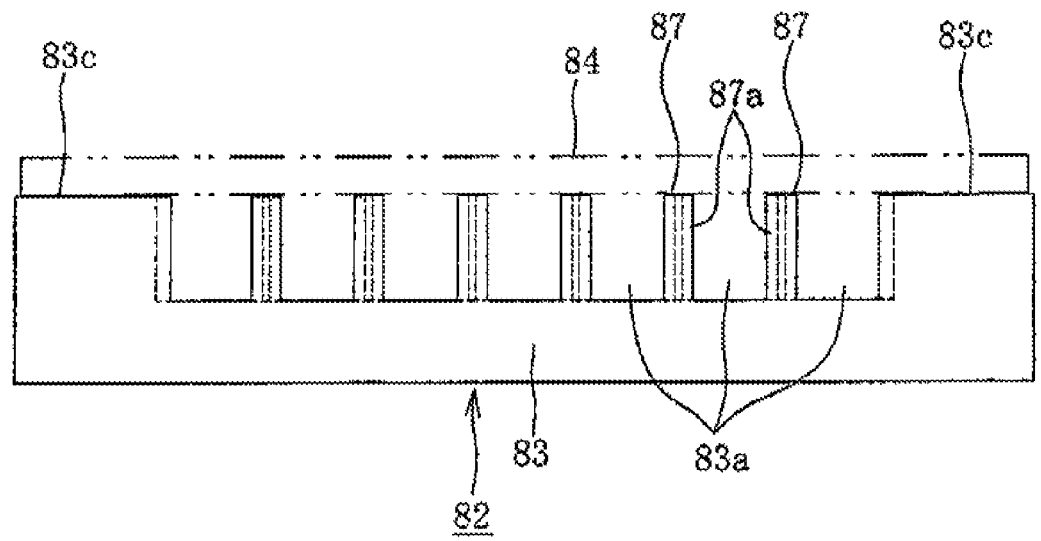
FIG. 54 is a drawing seen from arrow mark U of FIG. 53A.
Figure 55:
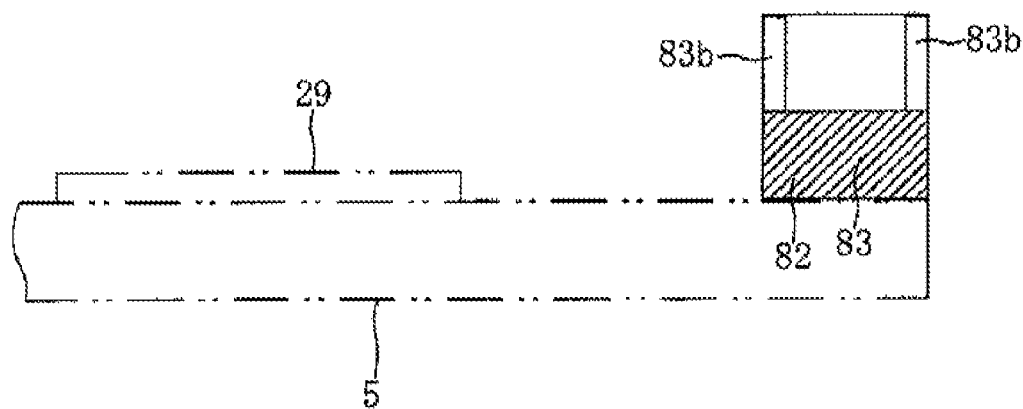
FIG. 55 is a cross section view taken along V-V of FIG. 53A.

In the base portion 83 of the holding member fixture 82, a plurality of ribs 87 is arranged at intervals in the width direction of the base portion, wherein ribs 87 have the grooves 87a that are engaged with the side surface portion of the optical fiber ribbon holding member 1J at both surfaces in the base portion width direction (the upper and lower direction in FIG. 53A). The space that is formed between adjacent ribs 87 becomes a holding member mounting portion 83a.

As shown in FIGS. 50 and 53A, in the upper surface of the base portion 83 and the lower surface of the lid portion 84, a plurality of small projections 83d and 84d for anti-slip is arranged so as to prevent sliding of the optical fiber ribbon holding member 1J.

Shipment is performed in a state of FIG. 49 when shipping. As described above, in this state, the optical fiber ribbons 2 are held by the optical fiber ribbon holding member 1J that is made from rubber material. However, the optical fiber ribbons 2 are fitted to such a degree that light friction force can be generated and the optical fiber ribbons 2 are loosely held to such a degree that the position of the optical fiber ribbons 2 can be adjusted.

Figure 52:
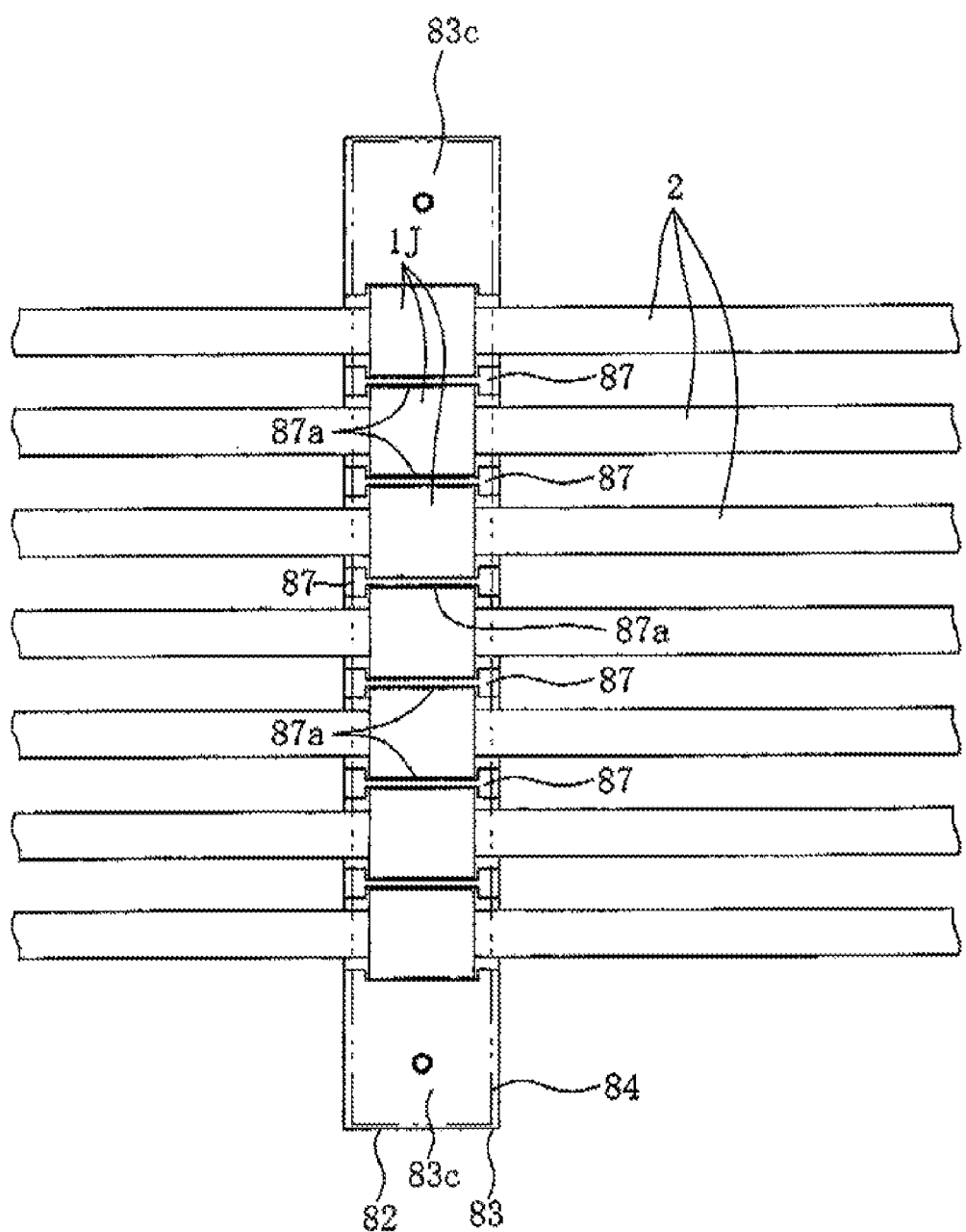
FIG. 52 is an enlarged plan view of a portion of the holding member fixture shown in FIG. 51.

When a user fixes the optical fiber ribbon holding member 1J in which the laminated optical fiber ribbons 2 are held to the holding member fixture 82 that is fixed on the device bedplate 5, each of optical fiber ribbon holding members 1J is set to a holding member mounting portion 83a that is arranged to the base portion 83 of the holding member fixture 82 as shown in FIGS. 50 to 52.

Both side surfaces of the optical fiber ribbon holding member 1J are engaged with the grooves 87a of the ribs 87, so the optical fiber ribbon holding member 1J is positioned to the base portion 32.

Next, when the lid portion 84 of the holding member fixture 82 is tightened by screws to the lid fixture portion 83c of the base portion 83, the optical fiber ribbon holding member 1J of the rubber material as shown in FIG. 50 is pressed by the lid portion 84 so that two optical fiber ribbons 2 that are overlapped within each of the optical fiber ribbons passing through portions 42 are pressed at the upper and lower surfaces of the optical fiber ribbons passing through portions (laterally long rectangular holes) 42, the optical fiber ribbons 2 are tightly held, and the optical fiber ribbon holding member 1J is fixed to the holding member fixture 82.

At this time, the optical connector 1 that is attached to the optical fiber ribbons 2 that are held by the optical fiber ribbon holding member 1J can be precisely positioned and arranged on the position to be mounded at the substrate 6 on the device bedplate 5.

Furthermore, in a case where the position of the optical connector 3 is misaligned from the position to be mounted, since the optical fiber ribbon holding member 1J loosely hold the optical fiber ribbons 2 that the optical fiber ribbons 2 can be adjustable, so that the optical fiber ribbon holding member 1J is removed from the holding member fixture 82, and then the position of each of the optical fiber ribbons 2 is readjusted.

As described above, when the lid portion 84 is fixed to the base portion 83 side, the optical fiber ribbon holding member 1J is fixed to the holding member fixture 82. However, small projections 33d and 34d of the upper surface of the base portion 83 and the lower surface of the lid portion 84 are wedged into the upper surface and the lower surface of the optical fiber ribbon holding member 1J that is made from rubber, so that the optical fiber ribbon holding member 1J can be prevented from sliding with respect to the base portion 83 and the lid portion 84.

When the lid portion 84 is tightened by screws and fixed to the base portion 83 side, the fixing by the small projections 33d and 34d is usually performed after the optical connector 3 is correctly positioned on the substrate 6, so that the positioning by the rib 87 need not be strict. If the fixing by the small projections 33d and 34d is sufficiently strong, the ribs 87 can be omitted in some cases.

In this embodiment, a plurality of the small projections 33d and 34d for anti-slip of the optical fiber ribbon holding member 1J is arranged at the upper surface of the base portion 83 and the lower surface of the lid portion 84. However, the invention is not limited to the small projections, and various types of projections such as furrow shape projections having a length can be employed.

As described above, according to the optical fiber ribbon holding member 1J, holding of the optical fiber ribbons 2 can be performed only by the simple operation for passing the optical fiber ribbons 2 through the optical fiber ribbons passing through portions 42, so that the operation of holding of the optical fiber ribbons 2 is easily performed.

Also, the optical fiber ribbons 2 are held to such a degree that light friction force can be generated and the position of the optical fiber ribbons 2 can be readjusted as the optical fiber ribbons 2 are passed through the optical fiber ribbons passing through portions 42, so that readjustment operation of the optical fiber ribbons is easily performed.

The heating operation is not required unlike the conventional heat shrinkable tube, so that the operation is easily performed. The holding by the optical fiber ribbon holding member 1J loose and the readjustment of the position of the optical fiber ribbons can be performed, so that the user easily and precisely positions and holds the optical fiber ribbons even though the positioning is not precisely performed when the products are shipped.

The structure of the optical fiber ribbon holding member 1J is simple and the optical fiber ribbon holding member with the above described effects can be produced in extremely simple and in low cost.

Fifth Embodiment

Figure 56:
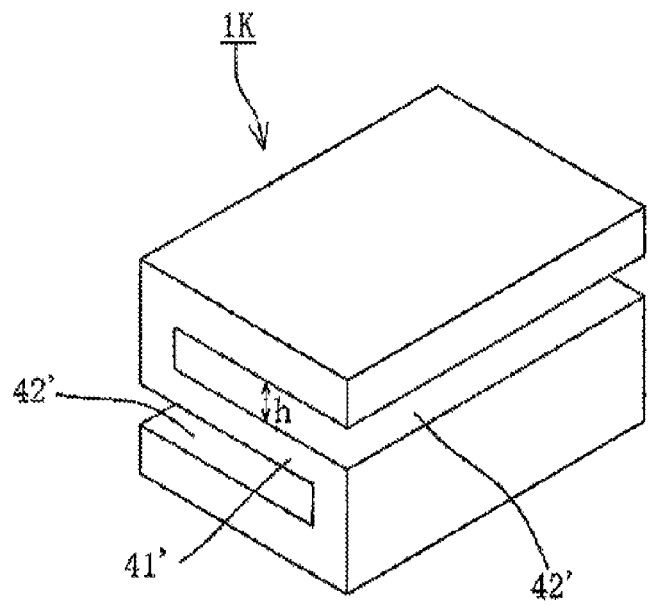
FIG. 56 is a perspective view illustrating the optical fiber ribbon holding member of a fifth embodiment of the invention.
Figure 57:
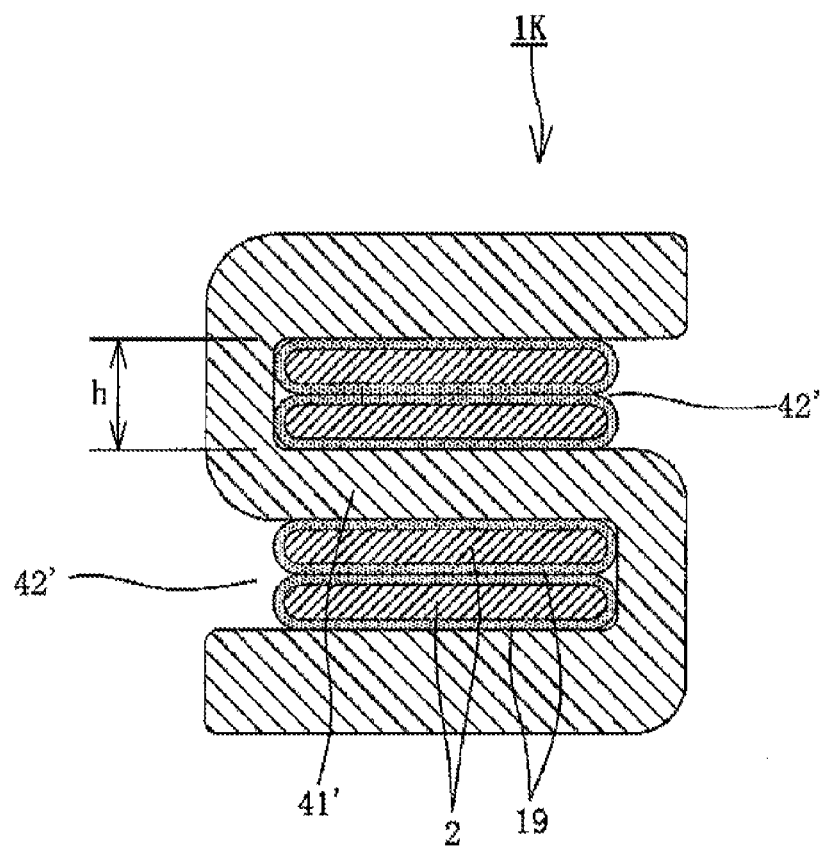
FIG. 57 is a cross section view illustrating a state in which the optical fiber ribbon holding member shown in FIG. 56 holds the optical fiber ribbons.

FIG. 56 is a perspective view illustrating an optical fiber ribbon holding member 1K of a fifth embodiment of the invention. FIG. 57 is a cross section view illustrating the optical fiber ribbon holding member 1K in a state of holding the optical fiber ribbons 2.

The overall outline of the optical fiber ribbon holding member 1K is a substantially rectangular parallelepiped shape, and the optical fiber ribbon holding member 1K is a rubber integral molded product having a substantially S-shaped cross section. The optical fiber ribbon holding member 1K has two upper and lower laterally long U-shaped grooves 42' in which a partition plate portion 41' is interposed therebetween, and opening surfaces of the two U-shaped grooves 42' are reverse to each other. Each of the laterally long U-shaped grooves 42' becomes the optical fiber ribbon passing through portion.

Each of the optical fiber ribbons passing through portion (laterally long rectangular holes) 42' divides the plurality of optical fiber ribbons in two groups. The optical fiber ribbons of each of the groups have a height dimension h in which the optical fiber ribbons are fitted so that light friction force can be generated. In other words, the optical fiber ribbons have the height dimension so that the laminated optical fiber ribbons are not widely misaligned, and so that the laminated optical fiber ribbons do not easily escape to the opening side of the grooves.

The rubber tubes 19 also cover the optical fiber ribbons 2 in the embodiment.

The optical fiber ribbon holding member 1K is also used in the same manner as the optical fiber ribbon holding member 1J of the fourth embodiment.

In this embodiment, the optical fiber ribbons passing through portions 42' are grooves (laterally long U-shaped grooves), so that the optical fiber ribbons 2 can be received from the side and passed through the optical fiber ribbons passing through portions 42', and thus the receiving operation of the optical fiber ribbons is easily performed.

The upper side portion and the lower side portion of the S shape have a cantilever beam shape, so that the upper side portion and the lower side portion are easily bent, and when the optical fiber ribbons passing through portions 42' are pressed by the lid portion 84 of the holding member fixture 82 in the same manner as FIG. 50, the optical fiber ribbons 2 can be further strongly pressed at the upper and lower surfaces of the optical fiber ribbons passing through portions 42'.

Sixth Embodiment

Figure 58:
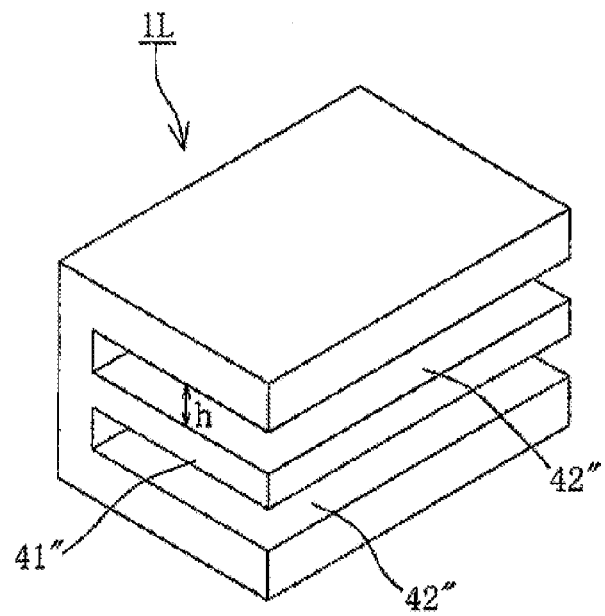
FIG. 58 is a perspective view illustrating the optical fiber ribbon holding member of a sixth embodiment of the invention.
Figure 59:
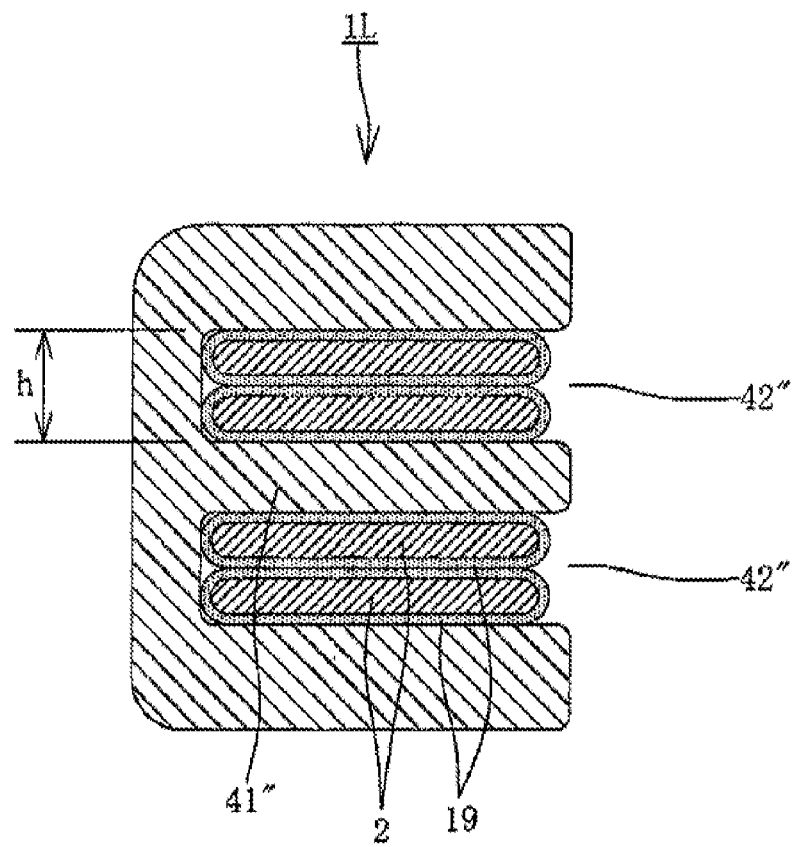
FIG. 59 is a cross section view illustrating a state in which the optical fiber ribbon holding member shown in FIG. 58 holds the optic fiber optical fiber ribbons.

FIG. 58 is a perspective view illustrating the optical fiber ribbon holding member 1L of a sixth embodiment of the invention. FIG. 59 is a cross section view illustrating the optical fiber ribbon holding member 1L in a state of holding the optical fiber ribbons 2.

The overall outline of the optical fiber ribbon holding member 1L is a substantially rectangular parallelepiped shape, and the optical fiber ribbon holding member 1L is a rubber integral molded product having a substantially E shape cross section. The optical fiber ribbon holding member 1L has two upper and lower laterally long U-shaped grooves 42" in which a partition plate portion 41" is interposed therebetween, and opening surfaces of the two U-shaped grooves 42" has the same direction. Each of the laterally long U-shaped grooves 42" becomes the optical fiber ribbon passing through portion.

Each of the optical fiber ribbons passing through portion (the laterally long rectangular shape groove) 42" divides the plurality of optical fiber ribbons in two groups. The optical fiber ribbons of each of the groups have a height dimension h in which the optical fiber ribbons are fitted so that light friction force can be generated. In other words, the optical fiber ribbons have the height dimension so that the laminated optical fiber ribbons are not widely misaligned, and the laminated optical fiber ribbons do not easily escape to the opening of the grooves.

The rubber tubes 19 also cover the optical fiber ribbons 2 in this embodiment.

The optical fiber ribbon holding member 1L is also used in the same manner as the optical fiber ribbon holding members 1J and 1K of the fourth and the fifth embodiments.

Even in this embodiment, the optical fiber ribbons passing through portions 42" are grooves (laterally long U-shaped grooves), so that the optical fiber ribbons 2 can be received from the side and passed through the optical fiber ribbons passing through portions 42", and thus the receiving operation of the optical fiber ribbons is easily performed.

The upper side portion and the lower side portion of the E shape have a cantilever beam shape, so that the upper side portion and the lower side portion are easily bent, and when the optical fiber ribbons passing through portions 42" are pressed by the lid portion 84 of the holding member fixture 82 in the same manner as FIG. 50, the optical fiber ribbons 2 can be further strongly pressed at the upper and lower surfaces of the optical fiber ribbons passing through portions 42".

In the optical fiber ribbon which is an object of the optical fiber ribbon holding member of the invention, the optical connector that is attached to the tip may be not the optic path change type and may be a general optical connector. Furthermore, the invention is not essentially limited to the case where the optical connector is attached.

Also, the optical fiber ribbon holding member of the invention is not limited to those that are fixed to the holding member fixture for fixing the holding member that is fixed on the device bedplate.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

According to the optical fiber ribbon holding member of the embodiments, when a plurality of optical fiber ribbons are laminated and accommodated in the holding member main body, and pressed by covering the lid body, the optical fiber ribbons in a laminated state are pressed by the lid body that is engaged to the holding member main body by the latch structure, so that the optical fiber ribbons are held.

As described above, the holding of the optical fiber ribbons can be performed simply by a covering operation of the lid body, so that the operation of laminating and holding of the optical fiber ribbons is easily performed. In addition, the lid body can be easily removed, and the optical fiber ribbons can be moved so that the position of the optical fiber ribbon in the longitudinal direction thereof can be readjusted.

The heating operation is not required so that the operation is easily performed unlike the conventional heat shrinkable tube. The lid body is detachably mounted and the position of the optical fiber ribbons can be readjusted, so that even though the positioning is not performed with high precision when shipping, the user may easily perform positioning with high precision, so that the optical fiber ribbons can be laminated and held.

According to the embodiments, the optical fiber ribbons being held in the longitudinal direction of the optical fiber ribbons can be moved and adjusted with the lid body being covered, so that the readjustment of the position of the optical fiber ribbons in the longitudinal direction thereof can be easily performed.

According to the embodiments, since the protecting boot is arranged at the rear portion of the holding member main body, when the optical fiber ribbons are handled at the rear portion of the optical fiber ribbon holding member after the optical fiber ribbon holding member is fixed by the holding member fixture, the optical fiber ribbons can be prevented from bending sharply.

According to the structure in which the protecting boot is integrally resin molded with the holding member main body as described in the embodiments, the operation in which the optical fiber ribbons that are held by the optical fiber holding member are fixed to the holding member fixture can be easily and effectively performed so that increasing of the damage on the optical loss of the optical fiber cannot occur. In this case, as described in the embodiments, the holding member main body and the protecting boot may be made of a material of which the hardness is lower than that of the lid body.

According to the embodiments, when the protecting boot is detachably attached to the holding member main body, the protecting boot can be a proper shape, dimensions and material according to the usage environment, and the optical fiber ribbon holding member can correspond to a case where the protecting boot is not required.

According to the optical fiber ribbon holding member of the embodiments, the optical fiber ribbons pass through the through hole of the second member and pass through the optical fiber ribbon passing through hole of the first member via between the upper and lower pinch pieces. Next, the first member and the second member are engaged by the latch structure with the operation in which the second member moves to the base portion side of the first member and then the optical fiber ribbons can be held in a laminated state.

With the simple operation as described above, the holding of the optical fiber ribbons can be performed so that the operation of the laminating and holding of the optical fiber ribbons can be easily performed.

The engaging of the first member and the second member can be easily released and the optical fiber ribbons can be moved so that the readjustment of the position of the optical fiber ribbons in the longitudinal direction thereof can be performed.

The heating operation is not required so that the operation is easily performed unlike the conventional heat shrinkable tube. The first member and the second member can be engaged and released so that the readjustment of the position of the optical fiber ribbons can be performed, and even though the positioning is not performed with high precision when shipping, the user may easily perform positioning with high precision so that the optical fiber ribbons can be laminated and held.

The optical fiber ribbon holding member according to the embodiments is not limited to a case where the optical fiber ribbon holding member is fixed to the device bedplate on which the substrate is attached and the optical connector is mounted. In the case where the optical fiber ribbons are required to be held, the optical fiber ribbons are properly held by the optical fiber ribbon holding member regardless of whether the number of the optical fiber ribbon is one or plural.

According to the optical fiber ribbon holding member in the embodiments, when optical fiber ribbons are passed through the two the optical fiber ribbon passing through portions respectively, the height dimension h of each of the optical fiber ribbon passing through portions becomes the height dimension in which the optical fiber ribbons that are passed through the optical fiber ribbon passing through portions are engaged to such a degree that light friction force can be generated. Thus, the optical fiber ribbons can be held by the optical fiber ribbon holding member.

As described above, the optical fiber ribbons can be held simply by an operation in which the optical fiber ribbons pass through the optical fiber ribbon passing through portions, so that the holding operation of the optical fiber ribbons is easily performed.

Also, the holding is performed to such a degree that light friction force is generated and the optical fiber ribbon can move with respect to the optical fiber ribbon holding member so that the readjustment of the position of the optical fiber ribbons in the longitudinal direction thereof can be performed.

The heating operation is not required so that the operation is easily performed unlike the existing heat shrinkable tube. The readjustment of the position of the optical fiber ribbons can be performed so that even though the positioning is not performed with high precision when shipping, the user may easily perform positioning with high precision so that the optical fiber ribbons can be held.

The optical fiber ribbon holding member of which the structure is simple and the above effect is present can be made in extremely easily and at low cost.

According to the optical fiber ribbon holding member in the embodiments, the optical fiber ribbon passing through portion is the laterally long U-shaped groove and the optical fiber ribbons are received and passed through the laterally long U-shaped groove from the side, so that the operation of the holding of the optical fiber ribbons is further easily performed.

According to the optical fiber ribbon holding method in the embodiments, the rubber or the rubber tube has the anti-slip function between the optical fiber ribbon and the optical fiber ribbon holding member and between the optical fiber ribbons, and the variation of the position of the optical fiber ribbons is effectively prevented.

According to the optical fiber ribbon bundle in the embodiments, the workability of the work that is performed by the user who receives the product can be greatly enhanced.

In the holding member fixture of the embodiments, when the lid portion of the holding member fixture is fixed to the base portion, the lid portion descends while the declined surface of the vertical portion slides along the declined surface of the second member of the optical fiber ribbon holding member. Accordingly, the second member moves toward the base portion side of the first member with the wedge operation force due to the descending of the declined surface of the lid portion. When the second member moves toward the base portion side of the first member, the upper and lower tapered surfaces of the through hole of the second member slide and move on the upper and lower of the outside tapered surfaces of the pinch pieces of the first member respectively. Accordingly, the upper and lower pinch pieces are bent inwardly with the wedge operation force by the movement of the upper and lower surfaces of the through hole and the pinched optic fiber ribbons are tightened from both the upper and lower sides so that the optic fiber ribbons are tightly fixed.

According to the holding member fixture in the embodiments, when the optical fiber ribbon holding member that is positioned on the base portion of the holding member fixture is pressed by the lid portion and the optical fiber ribbon holding member is fixed on the base portion, the projections of the upper surface of the base portion and the lower surface of the lid portion have the anti-slip function that prevents the sliding with respect to the lid portion or the base portion of the optical fiber ribbon holding member

What is claimed is:

1. An optical fiber ribbon holding member that holds a plurality of optical fiber ribbons, in which an optical connector mounted on a substrate is attached at a tip of each optical fiber ribbon, in a laminated state and in a state in which a position of an optical connector at a tip of an optical fiber ribbon is misaligned in a longitudinal direction of a ribbon, and is fixed to a holding member fixture for fixing a holding member that is fixed to a device bedplate on which the substrate is attached, the optical fiber ribbon holding member comprising:

a first member that has a base portion having an optical fiber ribbon passing through hole to which a plurality of optical fiber ribbons are passed through in a laminated state, and a pair of upper and lower cantilever shape pinch pieces that are extended from an upper portion and a lower portion of a surface of the base portion that is orthogonal to a passing through direction of an optical fiber ribbon respectively and that pinch an inserted optical fiber ribbon from an upper and lower side; and a second member that has a through hole to which a pair of the pinch pieces is inserted, wherein at least one of a pair of the pinch pieces is a flexible pinch piece;

a first surface of the flexible pinch piece at a side for pinching an optical fiber ribbons is a surface parallel with a passing through direction of an optical fiber ribbon, and a second surface at an opposite side to the first surface is a tapered surface in which a thickness of a pinch piece becomes thinner toward a tip of a pinch piece an inner surface of the through hole is a tapered surface to which a tapered surface of the flexible pinch piece is contacted; and a latch structure is provided at the flexible pinch piece and an inner surface of the through hole, and an engaging click and an engaging recess engage to each other when a pinch piece is inserted in a through hole.

2. An optical fiber ribbon holding member comprising:

a first member that has a base portion having an optical fiber ribbon passing through hole to which an optical fiber ribbon is passed through, and a pair of upper and lower cantilever shape pinch pieces that are extended from an upper portion and a lower portion of a surface of the base portion that is orthogonal to a passing through direction of an optical fiber ribbon respectively and that pinch an inserted optical fiber ribbon from an upper and lower side; and a second member that has a through hole to which a pair of the pinch pieces is inserted, wherein at least one of a pair of the pinch pieces is a flexible pinch piece;

a first surface of the flexible pinch piece at a side for pinching an optical fiber ribbon is a surface parallel with a passing through direction of an optical fiber ribbon, and a second surface at an opposite side to the first surface is a tapered surface in which a thickness of a pinch piece becomes thinner toward a tip of a pinch piece;

an inner surface of the through hole is a tapered surface to which a tapered surface of the flexible pinch piece is contacted; and a latch structure is provided at the flexible pinch piece and an inner surface of the through hole, and an engaging click and an engaging recess engage to each other when a pinch piece is inserted in a through hole.

3. The optical fiber ribbon holding member according to claim 1 or 2, wherein a lateral surface of the second member in which the lateral surface is opposite to a lateral surface of the first member at the base portion side is a downward decline surface.

4. An optical fiber ribbon holding method that holds an optical fiber ribbon using an optical fiber ribbon holding member of claim 1 or 2, wherein when an optical fiber ribbon is held by an optical fiber ribbon holding member, soft rubber members are inserted between an optical fiber ribbon that is accommodated nearest to a lower side pinch piece of a first member and the lower side pinch piece, between an optical fiber ribbon that is accommodated nearest to an upper side pinch piece of a first member and the upper side pinch piece, and between the optic l fiber a ribbons.

5. An optical fiber ribbon bundle that is held by an optical fiber ribbon holding member according to claim 1 or 2, and includes a plurality of optical fiber ribbons having an optical connector which is attached to a tip of an optical fiber ribbon.

6. The optical fiber ribbon bundle according to claim 5, when an optical fiber ribbon is held by an optical fiber ribbon holding member, soft rubber members are inserted between an optical fiber ribbon that is accommodated nearest to a lower side pinch piece of a first member and the lower side pinch piece, between an optical fiber ribbon that is accommodated nearest to an upper side pinch piece of a first member and the upper side pinch piece, and between the optical fiber ribbons.

* * * * *